US012771775B2

(12) United States Patent
Kyung et al.

(10) Patent No.: US 12,771,775 B2
(45) Date of Patent: Oct. 20, 2026

(54) ELECTRONIC DEVICE AND METHOD FOR CONTROLLING SCREEN ACCORDING TO USER INTERACTION USING THE SAME

(71) Applicant: SAMSUNG ELECTRONICS CO., LTD., Suwon-si (KR)

(72) Inventors: Sunghyun Kyung, Suwon-si (KR); Sangheon Kim, Suwon-si (KR); Kwangtak Lee, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 18/384,236

(22) Filed: Oct. 26, 2023

(65) Prior Publication Data

US 2024/0121335 A1 Apr. 11, 2024

Related U.S. Application Data

(63) Continuation of application No. PCT/KR2023/014270, filed on Sep. 20, 2023.

(30) Foreign Application Priority Data

Oct. 11, 2022 (KR) ........................ 10-2022-0130033
Dec. 20, 2022 (KR) ........................ 10-2022-0179504

(51) Int. Cl.
*H04M 1/72403* (2021.01)
*G06F 3/041* (2006.01)
*H04M 1/02* (2006.01)

(52) U.S. Cl.
CPC .... *H04M 1/72403* (2021.01); *G06F 3/04162* (2019.05); *H04M 1/0245* (2013.01);
(Continued)

(58) Field of Classification Search
CPC ............. H04M 1/0206; H04M 1/0208; H04M 1/0214; H04M 1/026; H04M 1/0245;
(Continued)

(56) References Cited

U.S. PATENT DOCUMENTS 9,060,068 B2 6/2015 Lee et al.
9,448,587 B2 9/2016 Park
(Continued)

FOREIGN PATENT DOCUMENTS

KR 10-0668341 B1 1/2007
KR 10-2010-0133259 A 12/2010
(Continued)

OTHER PUBLICATIONS

Extended European Search Report issued Sep. 29, 2025 by the European Patent Office for EP Patent Application No. 23877539.9.
(Continued)

*Primary Examiner* — Quochien B Vuong
(74) *Attorney, Agent, or Firm* — Sughrue Mion, PLLC

(57) ABSTRACT

An electronic device is provided, which includes a first housing having a first surface, a second surface facing an opposite direction to the first surface, and a first lateral member surrounding a first space between the first surface and the second surface and a second housing, which is connected to the first housing to be foldable about a folding axis by using a hinge structure, and having, in an unfolded state, a third surface facing same direction as the first surface, a fourth surface facing an opposite direction to the third surface, and a second lateral member surrounding a second space between the third surface and the fourth surface. The electronic device includes a first display provided on at least a portion of the first surface and at least a portion of the third surface.

20 Claims, 57 Drawing Sheets

(52) U.S. Cl.
CPC . *H04M 1/0268* (2013.01); *G06F 2203/04102* (2013.01); *H04M 1/0216* (2013.01); *H04M 2250/22* (2013.01)

(58) Field of Classification Search
CPC .. H04M 1/0266; H04M 1/0268; H04M 1/724; H04M 1/72403; H04M 2250/16; H04M 2250/22; G06F 3/041; G06F 3/0412; G06F 3/0414; G06F 3/0416; G06F 3/04162; G06F 3/0482; G06F 3/04886; G06F 2203/04803; G06F 2203/04808
See application file for complete search history.

(56) References Cited

U.S. PATENT DOCUMENTS

| | | | |
|---|---|---|---|
| 10,666,780 | B2 | 5/2020 | Cho et al. |
| 10,768,804 | B2 | 9/2020 | Klein et al. |
| 11,009,912 | B2 * | 5/2021 | Kim ....................... G06F 3/0412 |
| 11,138,912 | B2 * | 10/2021 | Klein .................. G06F 3/04886 |
| 11,934,651 | B2 * | 3/2024 | Ahn ....................... H04M 1/724 |
| 12,063,754 | B2 * | 8/2024 | Chun .................. H04M 1/0237 |
| 2007/0002016 | A1 | 1/2007 | Cho et al. |
| 2014/0375596 | A1 | 12/2014 | Kim et al. |
| 2016/0259514 | A1 | 9/2016 | Sang et al. |
| 2018/0330694 | A1 | 11/2018 | Klein et al. |
| 2019/0187758 | A1 | 6/2019 | Lee et al. |
| 2020/0125144 | A1 | 4/2020 | Chung et al. |
| 2022/0214725 | A1 | 7/2022 | Shah et al. |
| 2023/0205351 | A1 | 6/2023 | Kim et al. |

FOREIGN PATENT DOCUMENTS

| | | | |
|---|---|---|---|
| KR | 10-2014-0094958 | A | 7/2014 |
| KR | 10-1467513 | B1 | 12/2014 |
| KR | 10-2034584 | B1 | 10/2019 |
| KR | 10-2020-0045660 | A | 5/2020 |
| KR | 10-2120099 | B1 | 6/2020 |
| KR | 10-2022-0068093 | A | 5/2022 |
| KR | 10-2022-0068095 | A | 5/2022 |
| KR | 10-2434866 | B1 | 8/2022 |

OTHER PUBLICATIONS

International Search Report dated Dec. 26, 2023 in International Application No. PCT/KR2023/014270.

* cited by examiner (1510)

(1530)

(1560)

(1580)

ELECTRONIC DEVICE AND METHOD FOR CONTROLLING SCREEN ACCORDING TO USER INTERACTION USING THE SAME

CROSS-REFERENCE TO RELATED APPLICATION(S)

This application is a bypass continuation of International Application No. PCT/KR2023/014270, filed on Sep. 20, 2023, which is based on and claims priority to Korean Patent Application No. 10-2022-0130033, filed on Oct. 11, 2022, in the Korean Intellectual Property Office and Korean Patent Application No. 10-2022-0179504, filed on Dec. 20, 2022, in the Korean Intellectual Property Office, the disclosures of which are incorporated by reference herein in their entireties.

BACKGROUND

1. Field

Embodiments of the disclosure relate to an electronic device and a method for controlling a screen of the electronic device according to a user interaction.

2. Description of Related Art

Recently, electronic devices have been moving away from the standardized and/or fixed rectangular shape and undergoing transformations into various shapes. For example, an electronic device may have a deformable structure that allows a display to be resized and reshaped to satisfy the portability and usability of the electronic device. An electronic device having a deformable structure may include a slidable electronic device or a foldable electronic device which operates in such a manner that at least two housings are folded or unfolded relative to each other.

For example, an electronic device may provide screens of multiple applications through a display that is adjusted as the at least two housings are folded or unfolded relative to each other. In particular, the electronic device may provide a multiwindow function that allows information about multiple applications to be displayed simultaneously in one display area through a display. That is, the electronic device may divide the display into multiple areas and display information about multiple simultaneously running applications in the separate areas.

SUMMARY

An electronic device needs a method for controlling information about each of multiple applications displayed through a display.

According to an aspect of the disclosure, there is provided an electronic device including: a first housing including a first surface facing a first direction, a second surface facing a second direction opposite to the first surface, and a first lateral member surrounding a first space between the first surface and the second surface; a second housing connected to the first housing, and configured to be foldable about a folding axis, the second housing including a third surface facing the first direction in an unfolded state, a fourth surface facing the second direction in the unfolded state, and a second lateral member surrounding a second space between the third surface and the fourth surface; a first display provided on at least a portion of the first surface and at least a portion of the third surface; a sensor circuit; and a processor operatively connected to the first display and the sensor circuit, wherein the processor is configured to: display first information corresponding to a first application in a first area on the first display; display second information corresponding to a second application in a second area on the first display; acquire sensor information through the sensor circuit; identify whether a user input is detected on the second surface or the fourth surface based on the acquired sensor information; identify, based on the detected user input, a type of the user input and a location of the user input; change a display attribute of at least one of the first information corresponding to the first application and the second information corresponding to the second application, based on the type of the user input and the location of the user input; and display at least one of the first information and the second information on the first display, based on the changed display attribute.

According to another aspect of the disclosure, there is provided a method for controlling a screen according to a user interaction by an electronic device including a first housing having a first surface facing a first direction, a second surface facing a second direction opposite, and a second housing connected to the first housing in a foldable manner, and having a third surface facing the first direction in an unfolded state and a fourth surface facing the second direction in the unfolded state, the method including: displaying first information corresponding to a first application in a first area on a first display provided on at least a portion of the first surface and at least a portion of the third surface; displaying second information corresponding to a second application in a second area on the first display; acquiring sensor information through a sensor circuit; identifying whether a user input is detected on the second surface or the fourth surface based on the acquired sensor information; identifying, based on the detected user input, a type of the user input and a location of the user input; changing a display attribute of at least one of the first information corresponding the first application and the second information corresponding the second application, based on the type of the user input and the location of the user input; and displaying at least one of the first information and the second information on the first display, based on the changed display attribute.

The electronic device according to an embodiment of the disclosure may provide convenient usability to a user by changing a display attribute of application information displayed on a display based on a user interaction detected from the rear surface of the electronic device, in addition to a direct user input (e.g., a touch input) using the display, and displaying the application information.

DETAILED DESCRIPTION

Figure 1:
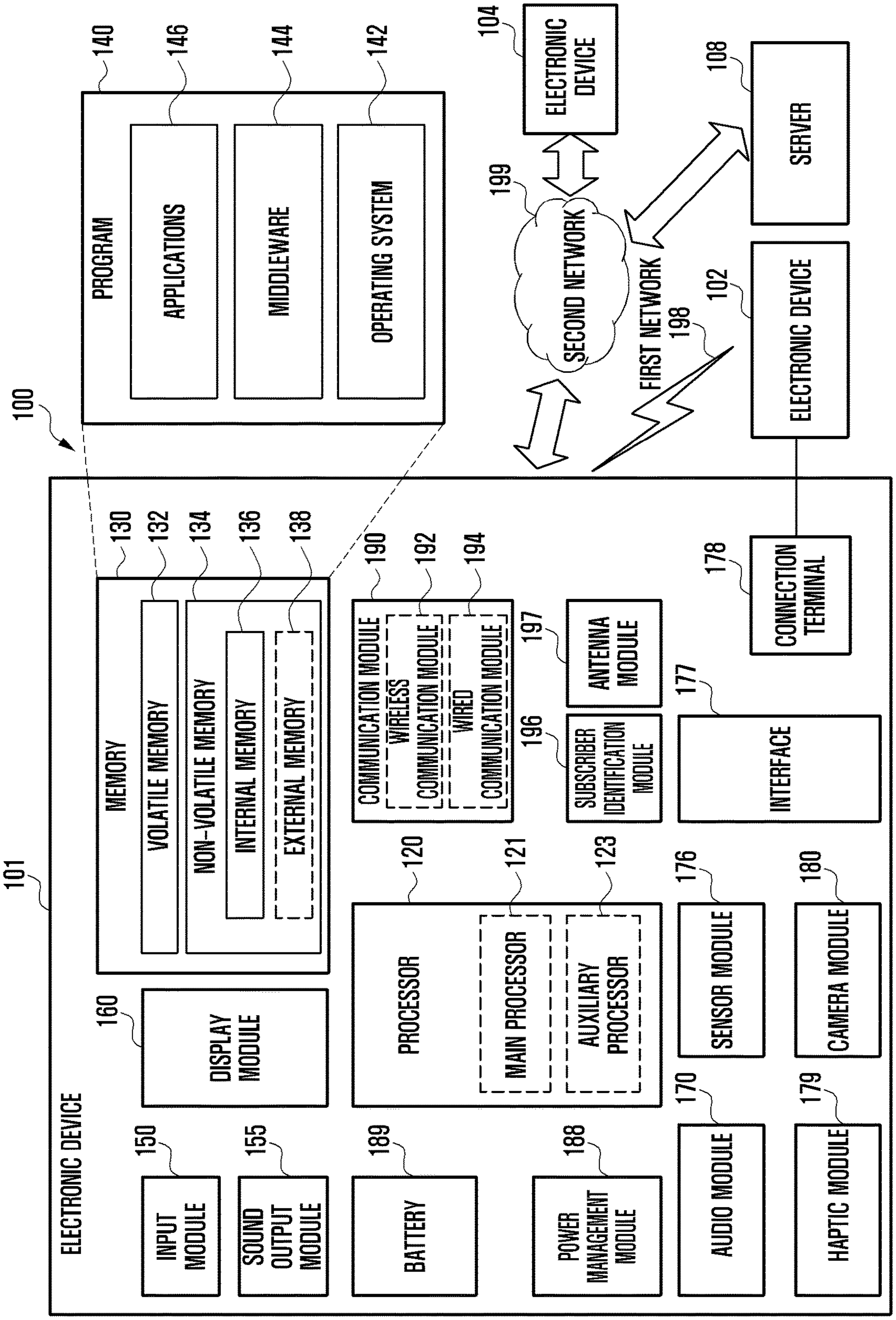
FIG. 1 is a block diagram of an electronic device in a network environment according to an embodiment of the disclosure.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
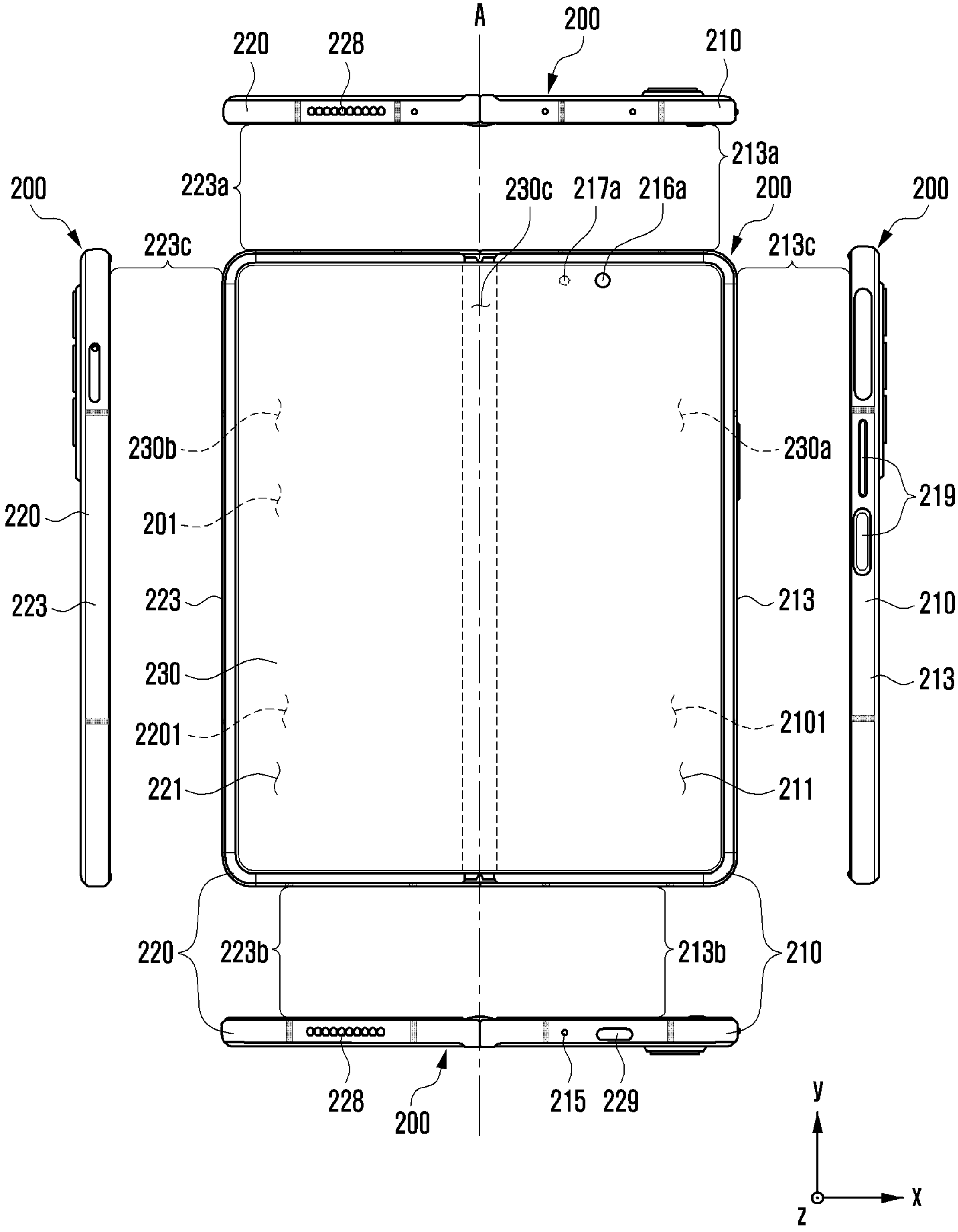
FIGS. 2A and 2B illustrate a foldable electronic device according to an embodiment of the disclosure, which is in an unfolded state and viewed from the front and the rear respectively.
Figure 2B:
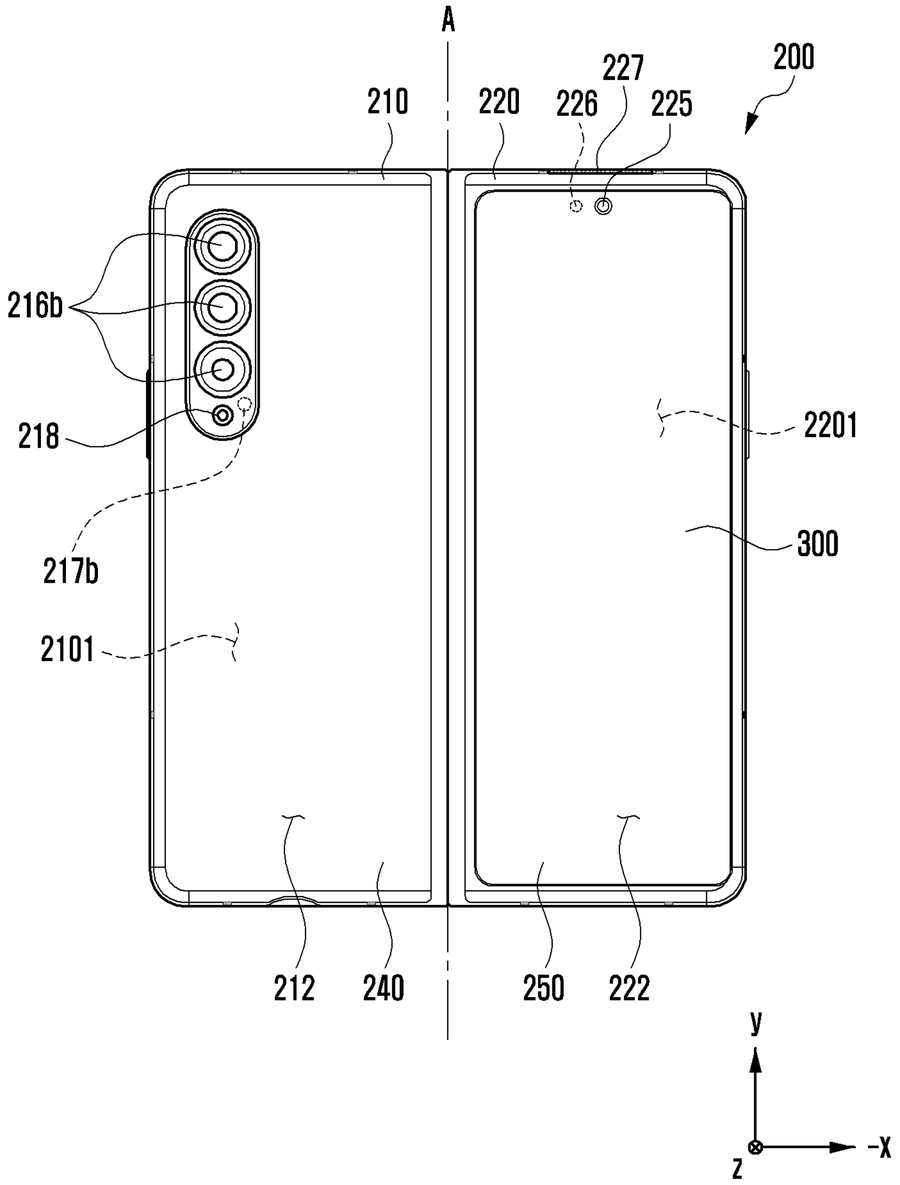
Figure 3A:
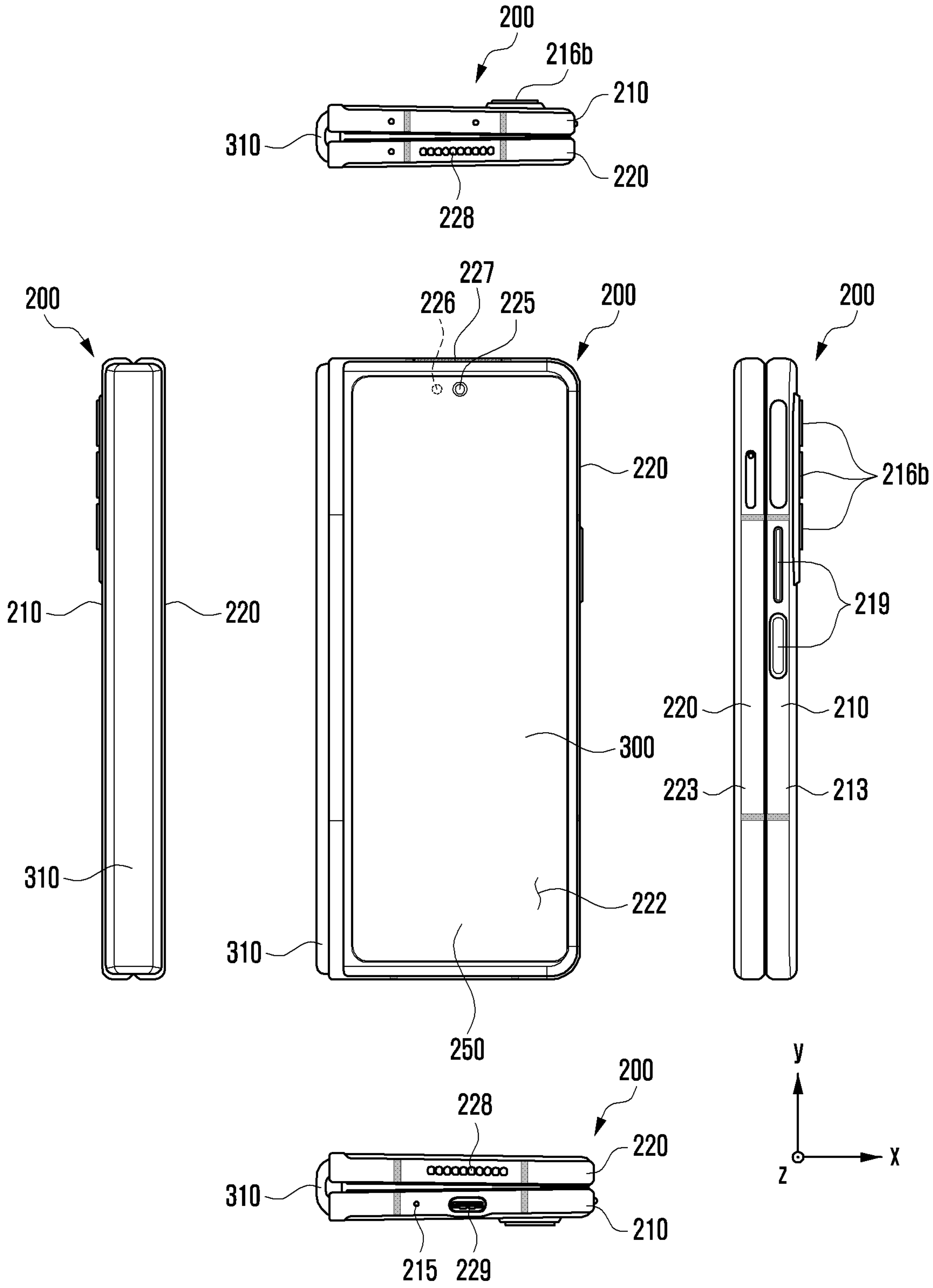
FIGS. 3A and 3B illustrate a foldable electronic device according to an embodiment of the disclosure, which is in a folded state and viewed from front and rear respectively.
Figure 3B:
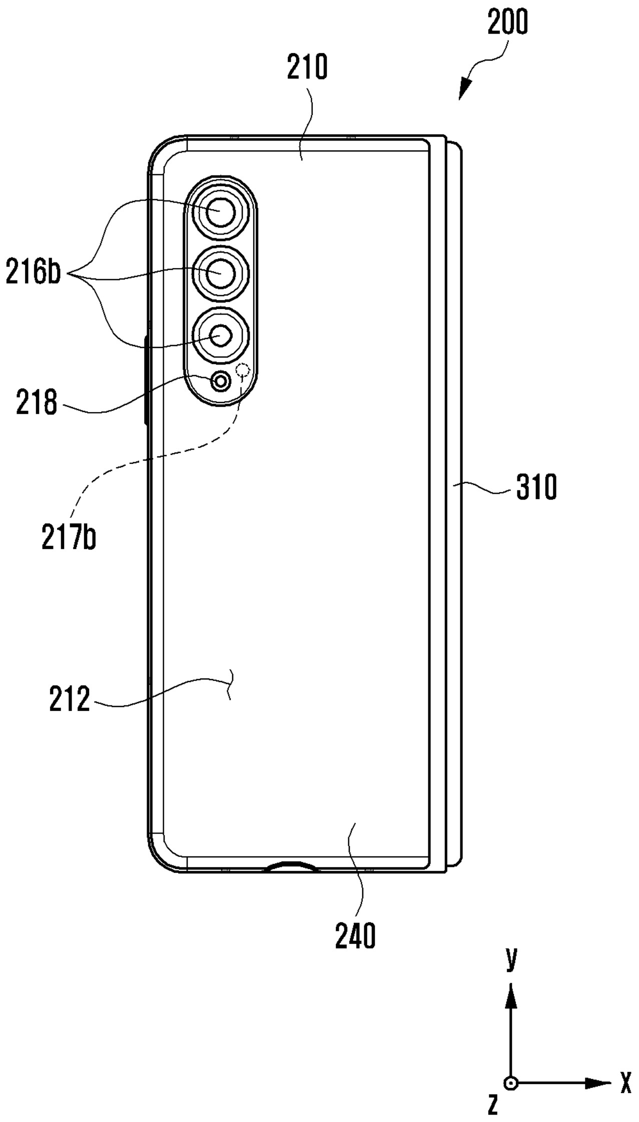

FIG. 2A illustrates a front view of a foldable electronic device in an unfolded state and FIG. 2B illustrates a rear view of the foldable electronic device in the unfolded state according to various embodiments of the disclosure. FIG. 3A illustrates a front view of a foldable electronic device in a folded state and FIG. 3B illustrates a rear view of the foldable electronic device in the folded state according to various embodiments of the disclosure.

According to various embodiments, the electronic device 101 or the one or more of components illustrated in FIG. 1 may be included in the embodiments illustrated in FIGS. 2A, 2B, 3A and 3B. For example, the electronic device 200 illustrated in FIGS. 2A, 2B, 3A and 3B may include the processor 120, the memory 130, the input module 150, the sound output module 155, the display module 160, the audio module 170, the sensor module 176, the interface 177, the connection terminal 178, the haptic module 179, the camera module 180, the antenna module 197, and/or the subscriber identification module 196, which are illustrated in FIG. 1. The electronic device shown in FIGS. 2A, 2B, 3A and 3B may include the foldable electronic device 200.

Figure 4:
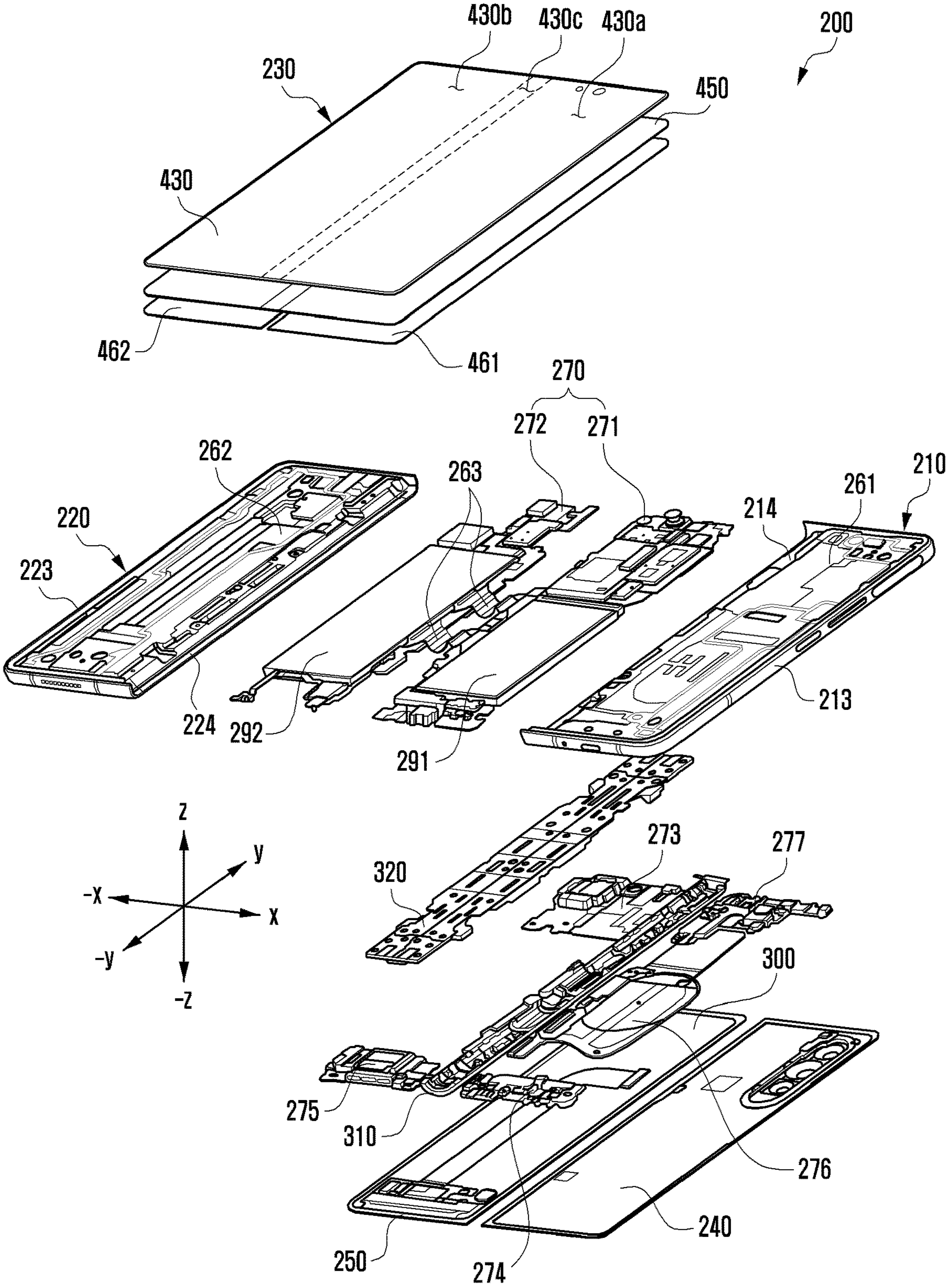
FIG. 4 schematically illustrates an exploded perspective view of an electronic device according to an embodiment of the disclosure.

With reference to FIGS. 2A, 2B, 3A and 3B, the electronic device 200 (e.g., the foldable electronic device) according to various embodiments of the disclosure may include a pair of housings 210 and 220, a flexible display 230 and/or a sub-display 300. The pair of housings 210 and 220 may be a foldable housing structure, which is rotatably coupled with respect to a folding axis A through a hinge device so as to be foldable with respect to each other. The hinge device may include hinge module or a hinge plate 320 as illustrated in FIG. 4. The flexible display 230 may include a first display, a foldable display, or a main display provided through the pair of housings 210 and 220. The sub-display 300 may include a second display provided through the second housing 220.

According to various embodiments, the hinge device (e.g., the hinge plate 320 in FIG. 4) may be provided at least in part to be invisible from the outside through the first housing 210 and the second housing 220, and in the unfolding state, to be invisible from the outside through a hinge cover 310 (e.g., a hinge housing) that covers a foldable portion. According to an embodiment, a surface on which the flexible display 230 is provided may be defined as the front surface of the electronic device 200, and a surface opposite to the front surface may be defined as the rear surface of the electronic device 200. A surface surrounding a space between the front surface and the rear surface may be defined as a side surface of the electronic device 200.

According to various embodiments, the pair of housings 210 and 220 may include a first housing 210 and a second housing 220, which are foldably provided with respect to each other through the hinge device (e.g., the hinge plate 320 in FIG. 4). Embodiments of the disclosure is not limited to the shape and combination shown in FIGS. 2A, 2B, 2C and 3B, and as such, according various other embodiments, the pair of housings 210 and 220 may be implemented with any other shape and/or any other combination of components. For example, the first and second housings 210 and 220 may be provided on both sides with respect to the folding axis A and may have an overall symmetrical shape with respect to the folding axis A. According to some embodiments, the first and second housings 210 and 220 may be folded asymmetrically with respect to the folding axis A. Depending on whether the electronic device 200 is in the unfolding state, the folding state, or an intermediate state, the first and second housings 210 and 220 may have different angles or distances therebetween.

According to various embodiments, the first housing 210 is connected to the hinge device (e.g., the hinge plate 320 in FIG. 4) in the unfolding state of the electronic device 200, and may have a first surface 211 provided to face the front of the electronic device 200, a second surface 212 facing a direction opposite to the first surface 211, and/or a first side member 213 surrounding at least a portion of a first space between the first surface 211 and the second surface 212. According to an embodiment, the first side member 213 includes a first side surface 213*a* having a first length along a first direction (e.g., the x-axis direction) and a second side surface 213*c* having a second length longer than the first length along a direction (e.g., the negative y-axis direction) substantially perpendicular from the first side surface 213*a*, and a third side surface 213*b* extending substantially parallel to the first side surface 213*a* from the second side surface 213*c* and having the first length.

According to various embodiments, the second housing 220 is connected to the hinge device (e.g., the hinge plate 320 in FIG. 4) in the unfolding state of the electronic device 200, and may have a third surface 221 provided to face the front of the electronic device 200, a fourth surface 222 facing a direction opposite to the third surface 221, and/or a second side member 223 surrounding at least a portion of a second space between the third surface 221 and the fourth surface 222. According to an embodiment, the second side member 223 includes a fourth side surface 223*a* having a first length along a first direction (e.g., the x-axis direction)

and a fifth side surface 223*c* having a second length longer than the first length along a direction (e.g., the negative y-axis direction) substantially perpendicular from the fourth side surface 223*a*, and a sixth side surface 223*b* extending substantially parallel to the fourth side surface 223*a* from the fifth side surface 223*c* and having the first length.

According to various embodiments, the first surface 211 faces substantially the same direction as the third surface 221 in the unfolding state, and at least partially faces the third surface 221 in the folding state.

According to various embodiments, the electronic device 200 may include a recess 201 formed to receive the flexible display 230 through structural coupling of the first and second housings 210 and 220. The recess 201 may have substantially the same size as the flexible display 230.

According to various embodiments, the hinge cover 310 (e.g., a hinge housing) may be provided between the first housing 210 and the second housing 220. The hinge cover 310 may be provided to cover a portion (e.g., at least one hinge module) of the hinge device (e.g., the hinge plate 320 in FIG. 4). Depending on whether the electronic device 200 is in the unfolding state, the folding state, or the intermediate state, the hinge cover 310 may be covered by a portion of the first and second housings 210 and 220 or exposed to the outside.

According to various embodiments, when the electronic device 200 is in the unfolding state, at least a portion of the hinge cover 310 may be covered by the first and second housings 210 and 220 and thereby not be substantially exposed. When the electronic device 200 is in the folding state, at least a portion of the hinge cover 310 may be exposed to the outside between the first and second housings 210 and 220. In case of the intermediate state in which the first and second housings 210 and 220 are folded with a certain angle, the hinge cover 310 may be exposed at least in part to the outside of the electronic device 200 between the first and second housings 210 and 220. In this state, the area in which the hinge cover 310 is exposed to the outside may be smaller than that in the fully folding state. The hinge cover 310 may have at least in part a curved surface.

According to various embodiments, when the electronic device 200 is in the unfolding state (e.g., the state shown in FIGS. 2A and 2B), the first and second housings 210 and 220 may form an angle of about 180 degrees, and a first area 230*a*, a second area 230*b*, and a folding area 230*c* of the flexible display 230 may be provided to form the same plane and to face substantially the same direction (e.g., the z-axis direction).

According to various embodiments, when the electronic device 200 is in the folding state (e.g., the state shown in FIGS. 3A and 3B), the first surface 211 of the first housing 210 and the third surface 221 of the second housing 220 may be provided to face each other. In this case, the first area 230*a* and the second area 230*b* of the flexible display 230 may be provided to face each other while forming a narrow angle (e.g., a range of 0 degrees to about 10 degrees) therebetween through the folding area 230*c*. In another embodiment, when the electronic device 200 is in the unfolding state, the first housing 210 may be rotated at an angle of about 360 degrees with respect to the second housing 220 and folded in the opposite direction so that the second surface 212 and the fourth surface 222 face each other (e.g., the out-folding style).

According to various embodiments, the folding area 230*c* may be deformed at least in part into a curved shape having a predetermined curvature. When the electronic device 200 is in the intermediate state, the first and second housings 210 and 220 may be provided at a certain angle to each other. In this case, the first area 230*a* and the second area 230*b* of the flexible display 230 may form an angle greater than in the folding state and smaller than in the unfolding state, and the curvature of the folding area 230*c* may be smaller than in the folding state and greater than in the unfolding state.

According to various embodiments, the first and second housings 210 and 220 may stop (e.g., a free stop function) at an angle designated between the folding state and the unfolding state through the hinge device (e.g., the hinge plate 320 in FIG. 4). In some embodiments, the first and second housings 210 and 220 may be continuously operated at designated inflection angles through the hinge device (e.g., the hinge plate 320 in FIG. 4) while being pressed in the unfolding direction or the folding direction.

According to various embodiments, the electronic device 200 may include at least one of at least one display (e.g., the flexible display 230 and the sub-display 300), an input device 215, sound output devices 227 and 228, sensor modules 217*a*, 217*b*, and 226, camera modules 216*a*, 216*b*, and 225, a key input device 219, an indicator, and a connector port 229, which are provided in the first housing 210 and/or the second housing 220. In some embodiments, the electronic device 200 may omit at least one of the above-described components or further include other components.

According to various embodiments, the at least one display (e.g., the flexible display 230 and the sub-display 300) may include the flexible display 230 (e.g., the first display) supported through the first surface 211 of the first housing 210, the hinge device (e.g., the hinge plate 320 in FIG. 4), and the third surface 221 of the second housing 220, and the sub-display 300 (e.g., the second display) provided to be visible at least in part to the outside through the fourth surface 222 in an inner space of the second housing 220. In some embodiments, the sub-display 300 may be provided to be visible to the outside through the second surface 212 in an inner space of the first housing 210. According to an embodiment, the flexible display 230 may be mainly used in the unfolding state of the electronic device 200, and the sub-display 300 may be mainly used in the folding state of the electronic device 200. According to an embodiment, in case of the intermediate state, the electronic device 200 may control the flexible display 230 and/or the sub-display 300 to be useable, based on the folding angles between the first and second housings 210 and 220.

According to various embodiments, the flexible display 230 may be provided in a space formed by the pair of housings 210 and 220. For example, the space formed by the pair of housings 210 and 220 may be referred to as an accommodation space for accommodating the flexible display 230. For example, the flexible display 230 may be provided in the recess 201 formed by the pair of housings 210 and 220, and in the unfolding state, arranged to occupy substantially most of the front surface of the electronic device 200. According to an embodiment, the flexible display 230 may be changed in shape to a flat surface or a curved surface in at least a partial area. The flexible display 230 may have a first area 230*a* facing the first housing 210, a second area 230*b* facing the second housing 220, and a folding area 230*c* connecting the first area 230*a* and the second area 230*b* and facing the hinge device (e.g., the hinge plate 320 in FIG. 4). According to an embodiment, the area division of the flexible display 230 is only an exemplary physical division by the pair of housings 210 and 220 and the hinge device (e.g., the hinge plate 320 in FIG. 4), and substantially the flexible display 230 may be realized as one seamless full screen over the pair of housings 210 and 220 and the hinge device (e.g., the hinge plate 320 in FIG. 4). The first area 230*a* and the second area 230*b* may have an overall symmetrical shape or a partially asymmetrical shape with respect to the folding area 230*c*.

According to various embodiments, the electronic device 200 may include a first rear cover 240 provided on the second surface 212 of the first housing 210 and a second rear cover 250 provided on the fourth surface 222 of the second housing 220. In some embodiments, at least a portion of the first rear cover 240 may be integrally formed with the first side member 213. In some embodiments, at least a portion of the second rear cover 250 may be integrally formed with the second side member 223. According to an embodiment, at least one of the first rear cover 240 and the second rear cover 250 may be formed with a substantially transparent plate (e.g., a glass plate having various coating layers, or a polymer plate) or an opaque plate.

According to various embodiments, the first rear cover 240 may be formed with an opaque plate such as, for example, coated or colored glass, ceramic, polymer, metal (e.g., aluminum, stainless steel (STS), or magnesium), or any combination thereof. The second rear cover 250 may be formed with a substantially transparent plate such as glass or polymer, for example. In this case, the second display 300 may be provided to be visible from the outside through the second rear cover 250 in the inner space of the second housing 220.

According to various embodiments, the input device 215 may include a microphone. In some embodiments, the input device 215 may include a plurality of microphones arranged to detect the direction of sound.

According to various embodiments, the sound output devices 227 and 228 may include speakers. According to an embodiment, the sound output devices 227 and 228 may include a receiver 227 for a call provided through the fourth surface 222 of the second housing 220, and an external speaker 228 provided through at least a portion of the second side member 223 of the second housing 220. In some embodiments, the input device 215, the sound output devices 227 and 228, and the connector 229 may be provided in spaces of the first housing 210 and/or the second housing 220 and exposed to the external environment through at least one hole formed in the first housing 210 and/or the second housing 220. In some embodiments, the holes formed in the first housing 210 and/or the second housing 220 may be commonly used for the input device 215 and the sound output devices 227 and 228. In some embodiments, the sound output devices 227 and 228 may include a speaker (e.g., a piezo speaker) that is operated without holes formed in the first housing 210 and/or the second housing 220.

According to various embodiments, the camera modules 216*a*, 216*b*, and 225 may include a first camera module 216*a* provided on the first surface 211 of the first housing 210, a second camera module 216*b* provided on the second surface 212 of the first housing 210, and/or a third camera module 225 provided on the fourth surface 222 of the second housing 220. According to an embodiment, the electronic device 200 may include a flash 218 provided near the second camera module 216*b*. The flash 218 may include, for example, a light emitting diode or a xenon lamp. According to an embodiment, the camera modules 216*a*, 216*b*, and 225 may include one or more lenses, an image sensor, and/or an image signal processor. In some embodiments, at least one of the camera modules 216*a*, 216*b*, and 225 may include two or more lenses (e.g., wide-angle and telephoto lenses) and image sensors and may be provided together on one surface of the first housing 210 and/or the second housing 220.

According to various embodiments, the sensor modules 217*a*, 217*b*, and 226 may generate an electrical signal or data value corresponding to an internal operating state of the electronic device 200 or an external environmental state. According to an embodiment, the sensor modules 217*a*, 217*b*, and 226 may include a first sensor module 217*a* provided on the first surface 211 of the first housing 210, a second sensor module 217*b* provided on the second surface 212 of the first housing 210, and/or a third sensor module 226 provided on the fourth surface 222 of the second housing 220. In some embodiments, the sensor modules 217*a*, 217*b*, and 226 may include at least one of a gesture sensor, a grip sensor, a color sensor, an infrared (IR) sensor, an illumination sensor, an ultrasonic sensor, an iris recognition sensor, or a distance detection sensor (e.g., a time of flight (TOF) sensor or a light detection and ranging (LiDAR)).

According to various embodiments, the electronic device 200 may further include an unillustrated sensor module, for example, at least one of a barometric pressure sensor, a magnetic sensor, a biometric sensor, a temperature sensor, a humidity sensor, or a fingerprint recognition sensor. In some embodiments, the fingerprint recognition sensor may be provided through at least one of the first side member 213 of the first housing 210 and/or the second side member 223 of the second housing 220.

According to various embodiments, the key input device 219 may be provided to be exposed to the outside through the first side member 213 of the first housing 210. In some embodiments, the key input device 219 may be provided to be exposed to the outside through the second side member 223 of the second housing 220. In some embodiments, the electronic device 200 may not include some or all of the key input devices 219, and the non-included key input device may be implemented in another form, such as a soft key, on at least one of the displays 230 and 300. In another embodiment, the key input device 219 may be implemented using a pressure sensor included in at least one of the displays 230 and 300.

According to various embodiments, the connector port 229 may include a connector (e.g., a USB connector or an interface connector port module (IF module)) for transmitting and receiving power and/or data to and from an external electronic device (e.g., the external electronic device 102, 104, or 108 in FIG. 1A). In some embodiments, the connector port 229 may also perform a function of transmitting and receiving an audio signal to and from an external electronic device or further include a separate connector port (e.g., an ear jack hole) for performing the function of audio signal transmission and reception.

According to various embodiments, at least one 216*a*, 225 of the camera modules 216*a*, 216*b*, and 225, at least one 217*a*, 226 of the sensor modules 217*a*, 217*b*, and 226, and/or the indicator may be arranged to be exposed through at least one of the displays 230 and 300. For example, the at least one camera module 216*a* and/or 225, the at least one sensor module 217*a* and/or 226, and/or the indicator may be provided under an active area (display area) of at least one of the displays 230 and 300 in the inner space of at least one of the housings 210 and 220 so as to be in contact with the external environment through a transparent region or an opening perforated up to a cover member (e.g., a window layer of the flexible display 230 and/or the second rear cover 250). According to an embodiment, a region where the display 230 or 300 and the camera module 216*a* or 225 face each other is a part of the display area and may be formed as a transmissive region having a certain transmittance. According to an embodiment, the transmissive region may be formed to have a transmittance in a range of about 5% to about 20%. The transmissive region may have an area that overlaps with an effective area (e.g., an angle of view area) of the camera module 216*a* or 225 through which light for generating an image at an image sensor passes. For example, the transmissive region of the at least one display 230 and/or 300 may have an area having a lower density of pixels than the surrounding area. For example, the transmissive region may replace the opening. For example, the at least one camera module 216*a* and/or 225 may include an under display camera (UDC) or an under panel camera (UPC). In another embodiment, some camera modules or sensor modules 217*a* and 226 may be provided to perform their functions without being visually exposed through the display. For example, a region facing the camera modules 216*a* and 225 and/or the sensor modules 217*a* and 226 provided under the at least one display 230 and/or 300 (e.g., a display panel) has an under display camera (UDC) structure that may not require a perforated opening.

FIG. 4 is an exploded perspective view schematically illustrating an electronic device according to various embodiments of the disclosure.

With reference to FIG. 4, the electronic device 200 may include a flexible display 230 (e.g., a first display), a sub-display 300 (e.g., a second display), a hinge plate 320, a pair of support members (e.g., a first support member 261, a second support member 262), at least one substrate 270 (e.g., a printed circuit board (PCB)), a first housing 210, a second housing 220, a first rear cover 240, and/or a second rear cover 250.

According to various embodiments, the flexible display 230 may include a display panel 430 (e.g., a flexible display panel), a support plate 450 provided under (e.g., in the negative z-axis direction) the display panel 430, and a pair of metal plates 461 and 462 provided under (e.g., in the negative z-axis direction) the support plate 450.

According to various embodiments, the display panel 430 may include a first panel area 430*a* corresponding to a first area (e.g., the first area 230*a* in FIG. 2A) of the flexible display 230, a second panel area 430*b* extending from the first panel area 430*a* and corresponding to a second area (e.g., the second area 230*b* in FIG. 2A) of the flexible display 230, and a third panel area 430*c* connecting the first panel area 430*a* and the second panel area 430*b* and corresponding to a folding area (e.g., the folding area 230*c* in FIG. 2A) of the flexible display 230.

According to various embodiments, the support plate 450 may be provided between the display panel 430 and the pair of support members 261 and 262 and formed to have a material and shape for providing a planar support structure for the first and second panel areas 430*a* and 430*b* and providing a bendable structure to aid in flexibility of the third panel region 430*c*. According to an embodiment, the support plate 450 may be formed of a conductive material (e.g., metal) or anon-conductive material (e.g., polymer or fiber reinforced plastics (FRP)). According to an embodiment, the pair of metal plates 461 and 462 may include a first metal plate 461 provided to correspond to at least a portion of the first and third panel areas 430*a* and 430*c* between the support plate 450 and the pair of support members 261 and 262, and a second metal plate 462 provided to correspond to at least a portion of the second and third panel areas 430*b* and 430*c*. According to an embodiment, the pair of metal plates 461 and 462 may be formed of a metal material (e.g., SUS), thereby helping to reinforce a ground connection structure and rigidity for the flexible display 230.

According to various embodiments, the sub-display 300 may be provided in a space between the second housing 220 and the second rear cover 250. According to an embodiment, the sub-display 300 may be provided to be visible from the outside through substantially the entire area of the second rear cover 250 in the space between the second housing 220 and the second rear cover 250.

According to various embodiments, at least a portion of the first support member 261 may be foldably combined with the second support member 262 through the hinge plate 320. According to an embodiment, the electronic device 200 may include at least one wiring member 263 (e.g., a flexible printed circuit board (FPCB)) provided from at least a portion of the first support member 261 to a portion of the second support member 262 across the hinge plate 320. According to an embodiment, the first support member 261 may be provided in such a way that it extends from the first side member 213 or is structurally combined with the first side member 213. According to an embodiment, the electronic device 200 may have a first space (e.g., the first space 2101 in FIG. 2A) provided through the first support member 261 and the first rear cover 240.

According to various embodiments, the first housing 210 (e.g., a first housing structure) may be configured through a combination of the first side member 213, the first support member 261, and the first rear cover 240. According to an embodiment, the second support member 262 may be provided in such a way that it extends from the second side member 223 or is structurally combined with the second side member 223. According to an embodiment, the electronic device 200 may have a second space (e.g., the second space 2201 in FIG. 2A) provided through the second support member 262 and the second rear cover 250.

According to various embodiments, the second housing 220 (e.g., a second housing structure) may be configured through a combination of the second side member 223, the second support member 262, and the second rear cover 250. According to an embodiment, at least a portion of the at least one wiring member 263 and/or the hinge plate 320 may be provided to be supported through at least a portion of the pair of support members 261 and 262. According to an embodiment, the at least one wiring member 263 may be provided in a direction (e.g., the x-axis direction) that crosses the first and second support members 261 and 262. According to an embodiment, the at least one wiring member 263 may be provided in a direction (e.g., the x-axis direction) substantially perpendicular to the folding axis (e.g., the y-axis or the folding axis A in FIG. 2A).

According to various embodiments, the at least one substrate 270 may include a first substrate 271 provided in the first space 2101 and a second substrate 272 provided in the second space 2201. According to an embodiment, the first substrate 271 and the second substrate 272 may include at least one electronic component provided to implement various functions of the electronic device 200. According to an embodiment, the first substrate 271 and the second substrate 272 may be electrically connected to each other through the at least one wiring member 263.

According to various embodiments, the electronic device 200 may include at least one battery 291 and 292. According to an embodiment, the at least one battery 291 and 292 may include a first battery 291 provided in the first space 2101 of the first housing 210 and electrically connected to the first substrate 271, and a second battery 292 provided in the second space 2201 of the second housing 220 and electrically connected to the second substrate 272. According to an embodiment, the first and second support members 261 and 262 may further have at least one swelling hole for the first and second batteries 291 and 292.

According to various embodiments, the first housing 210 may have a first rotation support surface 214, and the second housing 220 may have a second rotation support surface 224 corresponding to the first rotation support surface 214. According to an embodiment, the first and second rotation support surfaces 214 and 224 may have curved surfaces corresponding to the curved outer surface of the hinge cover 310. According to an embodiment, when the electronic device 200 is in the unfolding state, the first and second rotational support surfaces 214 and 224 may cover the hinge cover 310 so as not to expose or so as to partially expose the hinge cover 310 to the rear surface of the electronic device 200. According to an embodiment, when the electronic device 200 is in the folding state, the first and second rotational support surfaces 214 and 224 may rotate along the curved outer surface of the hinge cover 310 and thereby expose at least in part the hinge cover 310 to the rear surface of the electronic device 200.

According to various embodiments, the electronic device 200 may include at least one antenna 276 provided in the first space 2201. According to an embodiment, the at least one antenna 276 may be provided between the first battery 291 and the first rear cover 240 in the first space 2201. According to an embodiment, the at least one antenna 276 may include, for example, a near field communication (NFC) antenna, a wireless charging antenna, and/or a magnetic secure transmission (MST) antenna. According to an embodiment, the at least one antenna 276 may perform short-range communication with an external device or wirelessly transmit/receive power required for charging, for example. In some embodiments, the antenna structure may be formed by at least a portion of the first side member 213 or the second side member 223, a portion of the first and second support members 261 and 262, or a combination thereof.

According to various embodiments, the electronic device 200 may further include one or more electronic component assemblies 274 and 275 and/or additional support members 273 and 277 provided in the first space 2101 and/or the second space 2201. For example, the one or more electronic component assemblies 274 and 275 may include an interface connector port assembly 274 and/or a speaker assembly 275.

Figure 5:
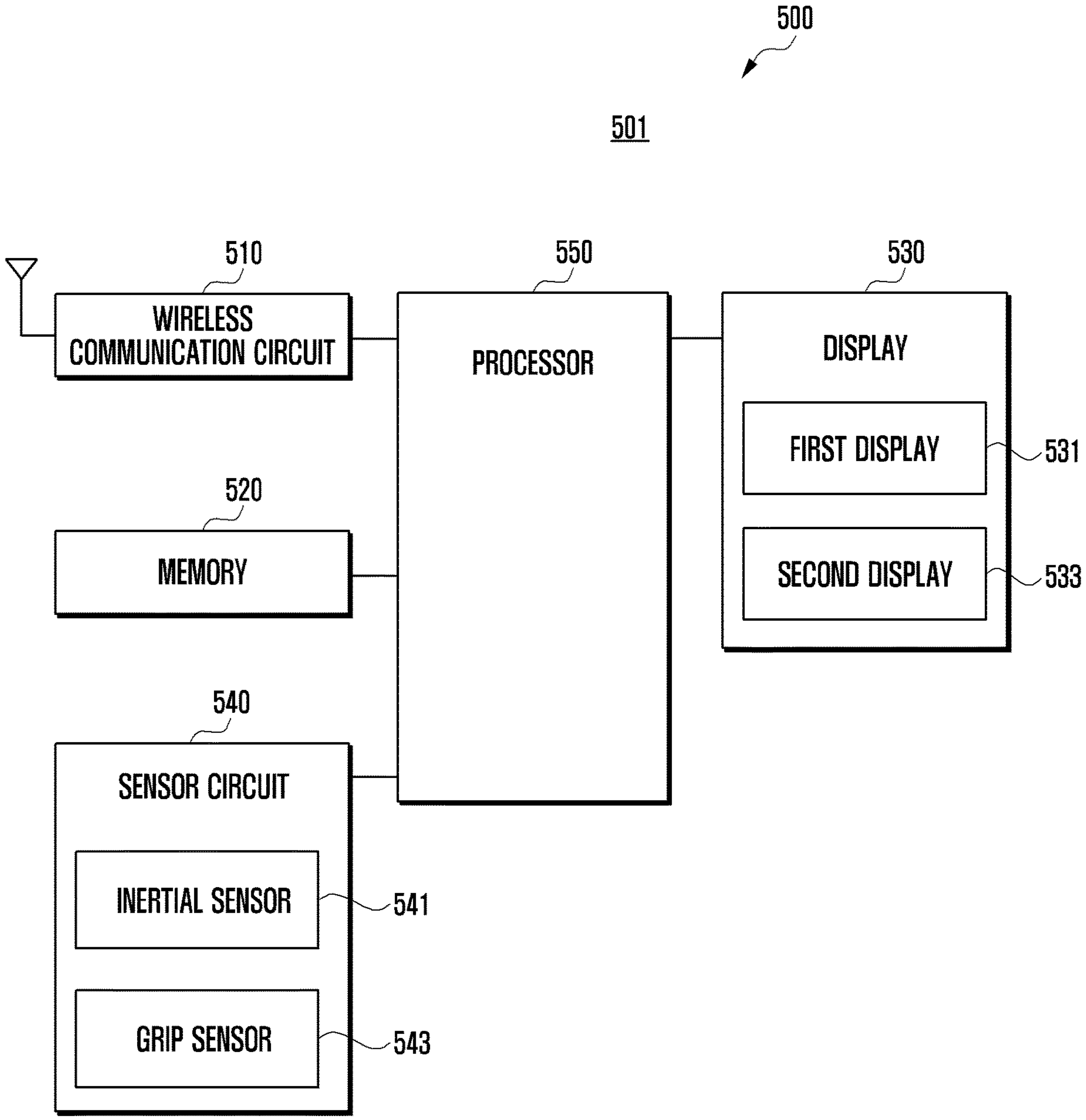
FIG. 5 is a block diagram illustrating an electronic device according to an embodiment of the disclosure.

FIG. 5 is a block diagram 500 illustrating an electronic device 501 according to an embodiment of the disclosure.

Referring to FIG. 5, the electronic device 501 may include a wireless communication circuit 510, a memory 520, a display 530, a sensor circuit 540, and/or a processor 550. The electronic device 501 may include other components illustrated in FIGS. 1, 2A, 2B, 3A, 3B and 4. For example, the electronic device 501 may include the electronic device 101 in FIG. 1, or the electronic device 200 in FIGS. 2A, 2B, 3A, 3C and 4. The wireless communication circuit 510 may include the communication module 190 in FIG. 1, the a memory 520 may include the memory 130 in FIG. 1, the display 530 may include the display module 160 in FIG. 1, or the displays 230 and 300 in FIGS. 2A, 2B, 3A, 3*b* and 4), the sensor circuit 540 may include the sensor module 176 in FIG. 1, and the processor 550 may include the processor 120 in FIG. 1.

According to an embodiment of the disclosure, the wireless communication circuit 510 (e.g., the communication module 190 in FIG. 1) may establish a communication channel with an external electronic device (e.g., the electronic device 102 in FIG. 1), and may support transmission/reception various data to/from the external electronic device.

In an embodiment, under the control of processor 550, the wireless communication circuit 510 may transmit sensor data acquired through the sensor circuit 540 to a server (e.g., the server 108 in FIG. 1), and may receive, from the server, an artificial intelligence (AI) model learned through machine learning. The server may be an intelligent server.

According to an embodiment of the disclosure, the memory 520 (e.g., the memory 130 in FIG. 1) may perform a function of storing a program (e.g., the program 140 in FIG. 1) for processing and control of the processor 550 of the electronic device 501, an operating system (OS) (e.g., the operating system 142 in FIG. 1), various applications, and/or input/output data, and may store a program for controlling overall operations of the electronic device 501. The memory 520 may store various instructions that can be executed by the processor 550.

In an embodiment, under the control of the processor 550, the memory 520 may store instructions for detecting a state (e.g., an unfolded state or a folded state) of the electronic device 501, based on a change in an angle between a first housing 210 and a second housing 220 of the electronic device 501.

In an embodiment, under the control of the processor 550, the memory 520 may store instructions for detecting a state of the electronic device 501, based on sensor information acquired (or measured) through at least one sensor, for example, an inertial sensor 541 and/or a grip sensor 543, included in the sensor circuit 540.

In an embodiment, under the control of the processor 550, the memory 520 may store instructions for detecting a user interaction on the rear surface of the electronic device 501 (e.g., a second surface (e.g., the second surface 212 in FIG. 2B) of the first housing (e.g., the first housing 210 in FIG. 2A) or a fourth surface (e.g., the fourth surface 222 in FIG. 2B) of the second housing (e.g., the second housing 220 in FIG. 2A), based on the sensor information acquired (or measured) through the inertial sensor 541 and/or the grip sensor 543. The user interaction on the rear surface of the electronic device 501 of the first housing or a fourth surface of the second housing may be referred to as user input. Here, the user input may include a single input or a plurality inputs.

In an embodiment, under the control of the processor 550, the memory 520 may store instructions for determining (or confirming, or identifying), based on the sensor information acquired (or measured) through the inertial sensor 541 and/or the grip sensor 543, the type of user interaction detected on the rear surface of the electronic device 501 and/or location information at which the user interaction is detected.

In an embodiment, under the control of the processor 550, the memory 520 may accumulate and store sensor data acquired through the sensor circuit 540 and information, determined (or confirmed) based on the sensor data, about the type of user interaction, and/or information about a location where the user interaction is detected. Under the control of the processor 550, the memory 520 may store instructions for learning, through artificial intelligence, stored sensor information and the type of user interaction and/or location information where the user interaction is detected based thereon, and generating a learned model (e.g., trained model). Under the control of the processor 550, the memory 520 may store instructions for determining (or confirming or identifying), based on the learned model, the information about the type of user interaction and/or the information about the location where the user interaction is detected.

In an embodiment, under the control of the processor 550, the memory 520 may store instructions for transmitting the sensor data acquired through the sensor circuit 540 to the server (e.g., the intelligent server) through the wireless communication circuit 510 and receiving, from the server, the learning model learned through machine learning by artificial intelligence, thereby determining (or confirming, or identifying) the type of user interaction and/or location information where the user interaction is detected.

In an embodiment, under the control of the processor 550, the memory 520 may store instructions for changing a display attribute of information corresponding to at least one application displayed on the display 530 (e.g., a first display 531 or a second display 533), based on the determined (or confirmed, or identified) type of user interaction and/or location information at which the user interaction is detected.

In an embodiment, under the control of the processor 550, the memory 520 may store instructions for displaying the information corresponding to the at least one application, based on the changed display attribute.

According to an embodiment of the disclosure, the display 530 (e.g., the display module 160 in FIG. 1 and the displays 230 and 300 in FIGS. 2A, 2B, 3A, 3B and 4) may be integrally configured to include a touch panel, and may be display an image under the control of the processor 550.

In an embodiment, the display 530 may include the first display 531 (e.g., the first display 230 in FIG. 2A) and the second display 533 (e.g., the second display 300 in FIG. 2B). In an embodiment, under the control of the processor 550, the first display 531 may be activated when the electronic device 501 is in an unfolded state and may be deactivated when the electronic device 501 is in a folded state. Under the control of the processor 550, the second display 533 may be activated in a folded state of the electronic device 501 and deactivated in an unfolded state of the electronic device 501. However, the disclosure is not limited thereto, and as such, according to another embodiment, the second display 533 may be activated in both a folded state of the electronic device 501 and an unfolded state of the electronic device 501.

In an embodiment, under the control of the processor 550, the display 530 (e.g., the first display 531 or the second display 533) may display, based on the changed display attribute, the information corresponding to at least one application on the type of user interaction and location information where the user interaction is detected.

According to an embodiment of the disclosure, the sensor circuit 540 (e.g., the sensor module 176 in FIG. 1) may measure a physical characteristic or detect an operating state of the electronic device 501, thereby generating an electrical signal or a data value corresponding to the electronic device 501.

In an embodiment, the sensor circuit 540 may include the inertial sensor 541 and/or the grip sensor 543.

In an embodiment, the inertial sensor 541 may include a 6-axis sensor (e.g., a geomagnetic sensor, an acceleration sensor, and/or a gyro sensor). The inertial sensor 541 may acquire (or measure) sensor information (e.g., x-axis, y-axis, and/or z-axis sensor information (e.g., an acceleration value, or an angular velocity value)) for determining the posture of the electronic device 501, and may transmit the sensor information to the processor 550.

In an embodiment, the inertial sensor 541 may be provided in an inner space of the first housing 210. However, the disclosure is not limited thereto. For example, the inertial sensor 541 may be provided in the inner space of the second housing 220. In another example, when the inertial sensor 541 includes two or more inertial sensors, at least one inertial sensor, among the two or more inertial sensors, may be provided in the inner space of the first housing 210, and at least one other inertial sensor, among the two or more inertial sensors, may be provided in the inner space of the second housing 220.

In an embodiment, the grip sensor 543 may detect a grip state of the electronic device 501. For example, the grip sensor 543 may detect whether the electronic device 501 is gripped with one hand or gripped with both hands. Moreover, the grip sensor 543 may detect whether the electronic device 501 is gripped a left hand or a right hand. In an embodiment, the grip sensor 543 may be provided on a partial area of the second side surface 213*c* of the first housing 210 and/or a partial area of the fifth side surface 223*c* of the second housing 220. However, the disclosure is not limited thereto, and as such, the grip sensor 543 may be provided on other areas of the first housing 210 and/or the second housing 220.

According to an embodiment of the disclosure, the processor 550 may include, for example, a micro controller unit (MCU), and may drive an operating system (OS) or an embedded software program to control multiple hardware elements connected to the processor 550. The processor 550 may control the multiple hardware elements according to, for example, instructions (e.g., the program 140 in FIG. 1) stored in the memory 520.

In an embodiment, the processor 550 may display information corresponding to each of multiple applications on the display 530 (e.g., the first display 531 or the second display 533) through multiple windows. For example, when the electronic device 501 is in an unfolding or folded state, the processor 550 may divide a display area of the first display 531 or the second display 533, which has been activated, into multiple areas. The processor 550 may control the display 530 (e.g., the first display 531 or the second display 533) to display application information in each separate area.

In an embodiment, the processor 550 may acquire sensor information through the sensor circuit 540, for example, the inertial sensor 541 and/or the grip sensor 543. In addition, the processor 550 may further acquire sensor information acquired through a touch sensor (e.g., a touch sensor of the second display 533). The processor 550 may identify, based on the acquired sensor information, whether a user interaction is detected on the second surface 212 or the fourth surface 222 of the electronic device 501. When it is identified that the user interaction on the second surface 212 or the fourth surface 222 of the electronic device 501 has been detected, the processor 550 may identify the type of the user interaction and location information where the user interaction has been detected. According to an embodiment, the processor 550 may correct sensor data of the detected user interaction, based on the acquired sensor information, and may identify, based on the corrected sensor data, the type of the user interaction and location information where the user interaction has been detected.

In an embodiment, the processor 550 may change a display attribute of at least one of first information corresponding to a first application and second information corresponding to a second application, based on the type of the user interaction and location information where the user interaction has been detected. For example, the display attribute may include at least one of the size of a window and arrangement of the window within the display area of the display 530 (e.g., the first display 531 or the second display 533) for displaying the first information corresponding to the first application and the second information corresponding to the second application. The processor 550 may display at least one of the first information and the second information on the display 530 (e.g., the first display 531 or the second display 533), based on the changed display attribute.

The electronic device 501 may include a first housing 210 which includes a first surface 211, a second surface 212 facing an opposite direction to the first surface 211, and a first lateral member 213 surrounding a first space between the first surface 211 and the second surface 212 as illustrated in FIGS. 2A, 2B, 3A and 3B. In an embodiment, the electronic device 501 may include a second housing 220 which is connected to the first housing 210 to be foldable about a folding axis by using a hinge structure (e.g., the hinge plate 320) and includes, in an unfolded state, a third surface 221 facing the same direction as the first surface 211, a fourth surface 222 facing an opposite direction to the third surface 221, and a second lateral member 223 surrounding a second space between the third surface 221 and the fourth surface 222. In an embodiment, the electronic device 501 may include a first display 531 provided from at least a portion of the first surface 211 to at least a portion of the third surface 221. In an embodiment, the electronic device 501 may include a sensor circuit 540. In an embodiment, the electronic device 501 may include a processor 550 operatively connected to the first display 531 and the sensor circuit 540. In an embodiment, the processor 550 may display first information corresponding to a first application on the first display 531. In an embodiment, the processor 550 may display second information corresponding to a second application and the first information corresponding to the first application on the first display 531 through multiple windows in response to an input for executing the second application. In an embodiment, the processor 550 may acquire sensor information through the sensor circuit 540. In an embodiment, when a user interaction on the second surface 212 or the fourth surface 222 is identified to be detected based on the sensor information acquired through the sensor circuit 540, the processor 550 may identify a type of the user interaction and location information where the user interaction is detected. In an embodiment, the processor 550 may change a display attribute of at least one of the first information corresponding to the first application and the second information corresponding to the second application, based on the type of the user interaction and the location information where the user interaction is detected. In an embodiment, the processor 550 may display at least one of the first information and the second information on the first display 531, based on the changed display attribute.

In an embodiment, the processor 550 may correct sensor data of the detected user interaction, based on the sensor information acquired through the sensor circuit 540. In an embodiment, the processor 550 may identify, based on the corrected sensor data, the type of the user interaction and the location information where the user interaction is detected.

In an embodiment, the processor 550 may change, based on the type of the user interaction and the location information where the user interaction is detected, the display attribute including at least one of the size of a window and the arrangement of the window within a display area of the first display 531 for displaying at least one of the first information corresponding to the first application and the second information corresponding to the second application.

In an embodiment, the electronic device 501 may further include a second display 533 provided to be at least partially visible from the outside through the fourth surface 222 in the inner space of the second housing 220.

In an embodiment, the sensor circuit 540 may include at least one of an inertial sensor 541 and a grip sensor 543.

In an embodiment, the sensor information acquired through the sensor circuit 540 may include at least one of first sensor information acquired through the inertial sensor 541, second sensor information acquired through the grip sensor 543, and third sensor information acquired through a touch circuit of the second display 533.

In an embodiment, the first sensor information may include at least one of sensor information related to a posture of the electronic device 501 and sensor information related to movement of the electronic device 501.

In an embodiment, the second sensor information may include at least one of a grip state and a grip pattern of the electronic device 501.

In an embodiment, the third sensor information may include touch information acquired through the touch circuit of the second display 533.

In an embodiment, the processor 550 may correct the sensor data of the detected user interaction, based on at least one of the first sensor information, the second sensor information, and the third sensor information.

In an embodiment, the electronic device 501 may further include a memory 520.

In an embodiment, the processor 550 may accumulate and store, in the memory 520, the sensor information acquired through the sensor circuit 540 and the information identified based on the sensor information and related to the type of the user interaction and the location where the user interaction is detected. In an embodiment, the processor 550 may generate an artificial intelligence (AI) model, through machine learning, based on the stored sensor information and the stored information related to the type of the user interaction and the location information where the user interaction is detected. In an embodiment, the processor 550 may identify, based on the AI model generated by the machine learning, the type of the user interaction and the location information where the user interaction is detected.

In an embodiment, the electronic device 501 may further include a wireless communication circuit 510.

In an embodiment, the processor 550 may transmit the sensor information acquired through the sensor circuit 540 to a server through the wireless communication circuit 510. In an embodiment, the processor 550 may receive a learning model learned through machine learning by artificial intelligence from the server and identify the type of the user interaction and the location information where the user interaction is detected.

Figure 6A:
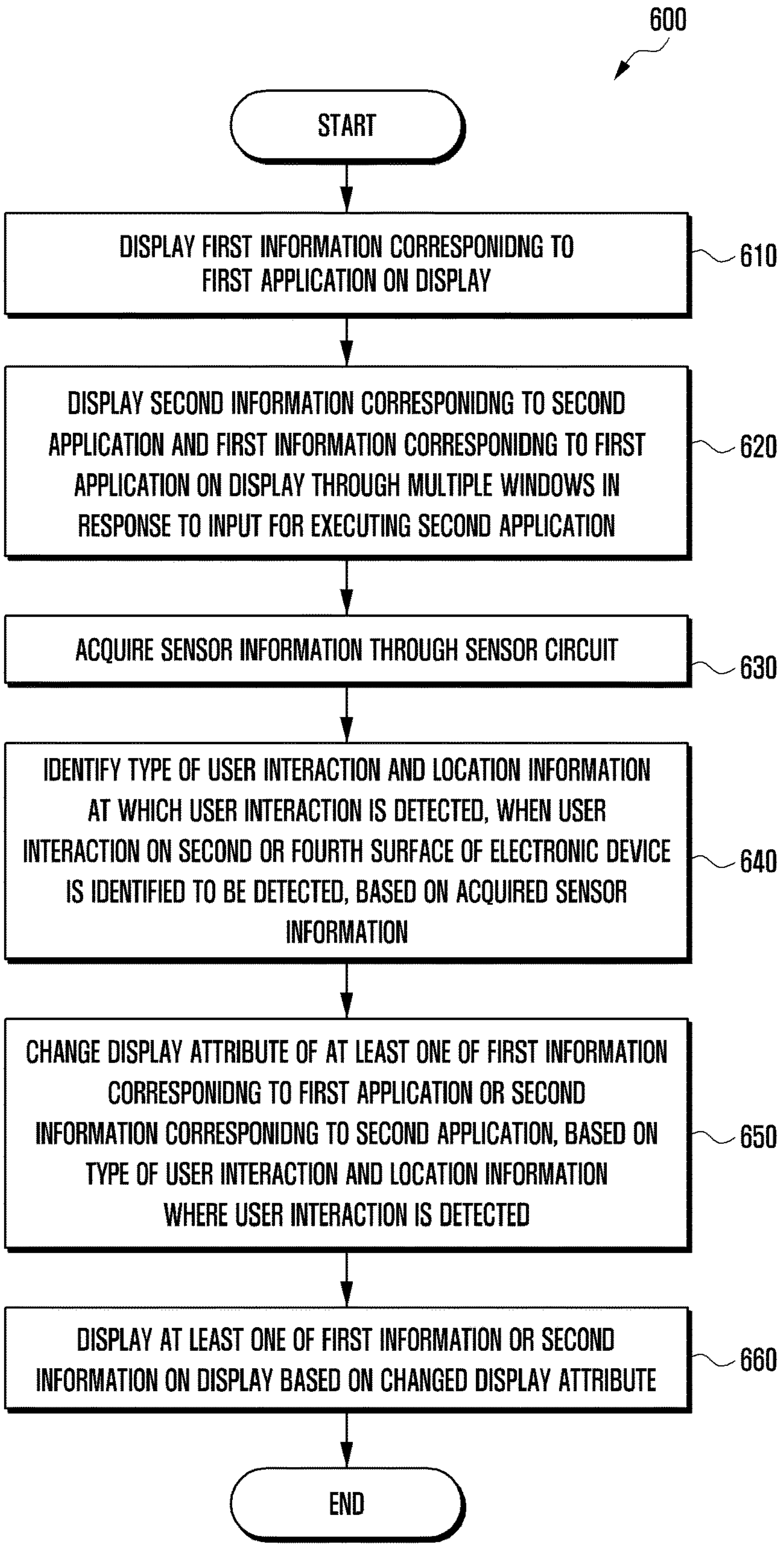
FIG. 6A is a flowchart illustrating a method for controlling a screen according to a user interaction by an electronic device according to an embodiment of the disclosure.

FIG. 6A is a flowchart 600 illustrating a method for controlling a screen according to a user interaction with the electronic device 501 according to an embodiment of the disclosure.

Referring to FIG. 6A, in operation 610, the method includes displaying first information corresponding to a first application on a display. For example, a processor (e.g., the processor 550 in FIG. 5) of an electronic device (e.g., the electronic device 501 in FIG. 5) may display first information corresponding to a first application on a display (e.g., the display 530 in FIG. 5).

In an embodiment, the electronic device 501 may be in an unfolded state (e.g., the state in FIGS. 2A and 2B) or a folded state (e.g., the state in FIGS. 3A and 3B).

In an embodiment, when the electronic device 501 is in an unfolded state, the first information corresponding to the first application may be displayed on a first display (e.g., the first display 531 in FIG. 5). For example, when the electronic device 501 is in an unfolded state, the first display 531 provided in a space formed by a pair of housings (e.g., the first housing 210 and the second housing 220 in FIG. 2A) may be activated, and a second display (e.g., the second display 533 in FIG. 5) provided on a fourth surface (e.g., the fourth surface 222 in FIG. 2B) of the second housing 220 may be deactivated. The first display 531 may have a first size, and the second display 533 may have a second size smaller than the first size.

In an embodiment, when the electronic device 501 is in a folded state, the first information corresponding to the first application may be displayed on the second display 533. For example, when the electronic device 501 is in a folded state, the second display 533 may be activated and the first display 531 may be deactivated.

In an embodiment, in operation 620, the method may include displaying second information corresponding to second application and the first information corresponding to the first application on the display 530 through multiple windows based on an input for executing the second application. For example, the processor 550 may display second information corresponding to second application and the first information corresponding to the first application on the display 530 (e.g., the first display 531 or the second display 533) through multiple windows in response to an input for executing the second application. Here, the first information corresponding to the first application may be displayed in a first window and the second information corresponding to the second application may be displayed in a second window.

For example, when the electronic device 501 is in an unfolded or folded state, the processor 550 may divide the display area of the first display 531 or the second display 533, which has been active, into multiple areas (e.g. multiple windows). The processor 550 may control the first display 531 to display the first information corresponding to the first application and the second display 533 to display the second information corresponding to the second application in separate areas.

In an embodiment, in operation 630, the method may include acquiring sensor information. For example, the processor 550 may acquire sensor information through a sensor circuit (e.g., the sensor circuit 540 in FIG. 5). In operation 640, the method may include identifying a type of user interaction (or user input) and/or location information at which the user interaction is detected. For example, when it is identified, based on the acquired sensor information, that user interaction is detected on a second surface (e.g., the second surface 212 in FIG. 2B) or the fourth surface (e.g., the fourth surface 222 in FIG. 2B) of the electronic device 501, the processor 550 may identify the type of the user interaction and location information where the user interaction is detected.

In an embodiment, the sensor circuit 540 may include an inertial sensor (e.g., the inertial sensor 541 in FIG. 5). The inertial sensor 541 may be provided in an inner space of the first housing 210. However, the disclosure is not limited thereto.

In an embodiment, the processor 550 may acquire sensor information related to a posture of the electronic device 501 and/or sensor information related to movement of the electronic device 501 through the inertial sensor 541. The sensor information related to the posture of the electronic device 501 and/or the sensor information related to the movement of the electronic device 501 may include a sensor value, for example, an acceleration value and/or an angular velocity value, measured with respect to a specific axis (e.g., the x-axis, the y-axis, and/or the z-axis). Based on the sensor information related to the posture of the electronic device 501 and/or the sensor information related to the movement of the electronic device 501, acquired through the inertial sensor 541, the processor 550 may identify whether the user interaction is detected on the second surface 212 or the fourth surface 222 of the electronic device 501.

The disclosure is not limited thereto, and as such, according to another embodiment, the sensor circuit 540 may include a grip sensor (e.g., the grip sensor 543 in FIG. 5). The grip sensor 543 may be provided in a partial area of a second side surface 213*c* of the first housing 210 and/or a partial area of a fifth side surface 223*c* of the second housing 220. However, the disclosure is not limited thereto.

In an embodiment, the processor 550 may identify a grip state (e.g., a grip state by one hand (e.g., the left or right hand) or a grip state by both hands) based on sensor information acquired through the grip sensor 543. The processor 550 may estimate (or predict), based on the confirmed grip state, information about a location at which the user interaction is detected on the second surface 212 or the fourth surface 222 of the electronic device 501.

The disclosure is not limited thereto, and as such, according to another embodiment, the processor 550 may estimate (or predict), based on a touch input detected on the second display 533 provided on the fourth surface 222, information about a location, at which the user interaction is detected, on the second surface 212 or the fourth surface 222 of the electronic device 501.

In an embodiment, in operation 650, the method may include changing a display attribute of at least one of the first information corresponding to the first application and second information corresponding to the second application, based on the type of the user interaction and the location at which the user interaction is detection. For example, the processor 550 may change a display attribute of at least one of the first information corresponding to the first application and second information corresponding to the second application, based on the type of the user interaction and the location information where the user interaction is detected.

In an embodiment, the display attribute may include at least one of a size of a window and an arrangement of the window within a display area of the display 530 for displaying the first information corresponding to the first application and the second information corresponding to the second application.

In an embodiment, in operation 660, the method may include displaying at least one of the first information and the second information on the display 530 based on the changed display attribute. For example, the processor 550 may display, based on the changed display attribute, at least one of the first information and the second information on the display 530.

Figure 6B:
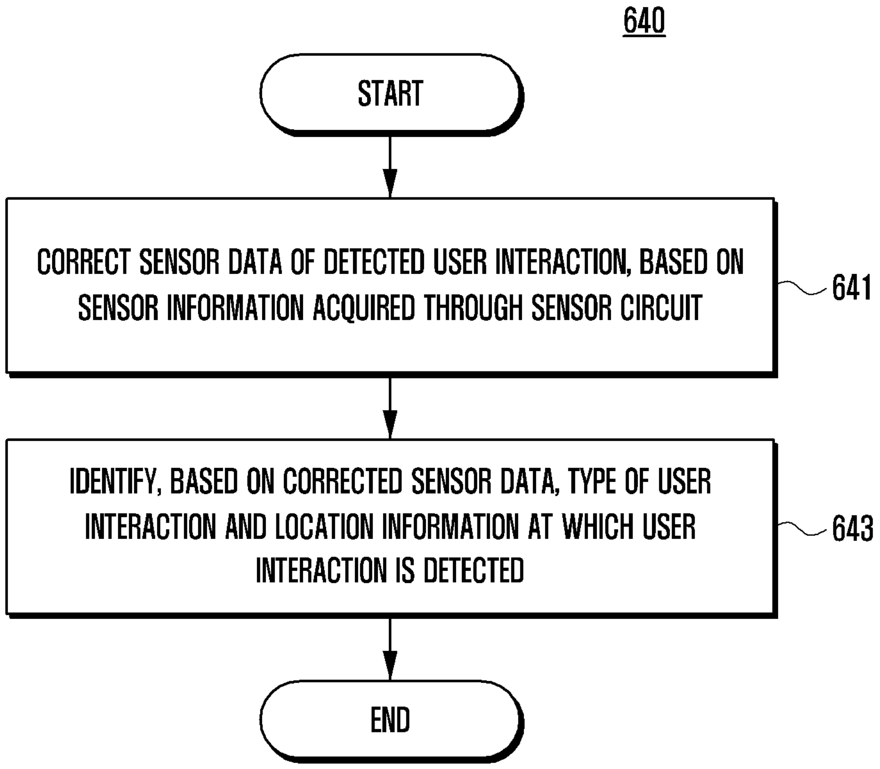
FIG. 6B is a flowchart illustrating an operation of identifying a type and a location of user interaction in FIG. 6A according to an embodiment of the disclosure.

FIG. 6B is a flowchart illustrating a method of identifying a type of user interaction (or user input) and identifying a location information at which the user interaction is detected (i.e., operation 640 in FIG. 6A) according to an embodiment of the disclosure.

Referring to FIG. 6B, in operation 641, the method may include correcting sensor data of the detected user interaction, based on the acquired sensor information. For example, the processor 550 may correct sensor data of the detected user interaction, based on the acquired sensor information.

In an embodiment, the electronic device 501 may include the sensor circuit 540, for example, the inertial sensor 541 and/or the grip sensor 543. Also, the electronic device 501 may include the display 530 including a touch sensor. The processor 550 may correct sensor data of the detected user interaction, based on sensor information acquired through the inertial sensor 541, sensor information acquired through the grip sensor 543, and/or touch information acquired through the second display 533.

In an embodiment, in operation 643, the method may include identifying, based on the corrected sensor data, the type of the user interaction and the location information where the user interaction is detected. For example, the processor 550 may identify, based on the corrected sensor data, the type of the user interaction and the location information where the user interaction is detected.

In relation to the above-described operation of correcting the sensor data of the detected user interaction, various embodiments will be described with reference to FIGS. 7A to 22 to be described later.

Figure 7A:
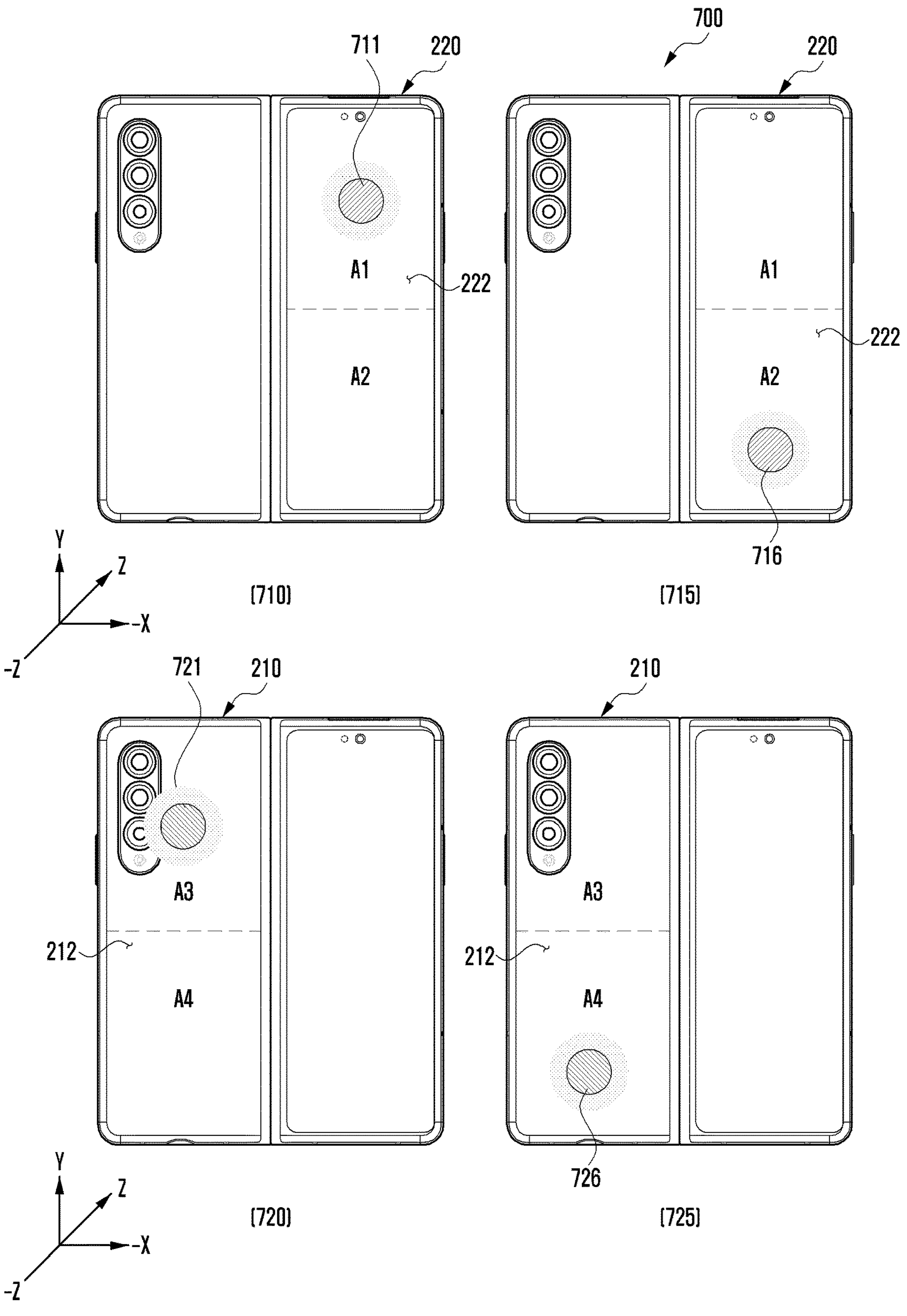
FIG. 7A illustrates a user interaction that may be detected in an unfolded state of an electronic device according to an embodiment of the disclosure.

FIG. 7A includes a view 700 for illustrating a user interaction that may be detected in an unfolded state of the electronic device 501 according to an embodiment of the disclosure.

Referring to FIG. 7A, an electronic device (e.g., the electronic device 501 in FIG. 5) includes a first housing (e.g., the first housing 210 in FIG. 2A) and a second housing (e.g., the second housing 220 in FIG. 2A).

In an embodiment, a processor (e.g., the processor 550 in FIG. 5) may detect, based on sensor information acquired through a sensor circuit (e.g., the sensor circuit 540 in FIG. 5), a user interaction in at least a partial area of a second surface (e.g., the second surface 212 in FIG. 2B) of the first housing 210 and/or at least a partial area of a fourth surface (e.g., the fourth surface 222 in FIG. 2B) of the second housing 220.

In an embodiment, the user interaction may include a double tap or a triple tap. However, the disclosure is not limited thereto, and as such, according to another embodiment, the user interaction may include other types of user inputs. For example, the user input may be a gesture input, a touch and hold input, a slide or drag input, a pinch input, or multiple touch inputs. The multiple touch input may include simultaneous touch multiple inputs.

In an embodiment, the sensor circuit 540 may include an inertial sensor (e.g., the inertial sensor 541 in FIG. 5). In an embodiment, the inertial sensor 541 may be provided in the inner space of the first housing 210. However, the disclosure is not limited thereto.

In an embodiment, the inertial sensor 541 may include a 6-axis sensor (e.g., a geomagnetic sensor, an acceleration sensor, and/or a gyro sensor). The inertial sensor 541 may acquire (or measure) sensor information (e.g., x-axis, y-axis, and/or z-axis sensor information (e.g., an acceleration value or an angular velocity value)) related to the movement of the electronic device 501, and may transmit the sensor information to the processor 550. The processor 550 may detect a user interaction on the second surface 212 of the first housing 210 and/or the fourth surface 222 of the second housing 220, based on the sensor information acquired through the inertial sensor 541, and may identify the type of the detected user interaction and/or location information where the user interaction has been detected.

In an embodiment, the processor 550 may configure the second surface 212 of the first housing 210 as at least one area, and may configure the fourth surface 222 of the second housing 220 as at least one other area. The processor 550 may detect a user interaction in at least one configured area (e.g., the second surface 212 or the fourth surface 222), based on sensor information acquired through the sensor circuit 540.

According to an embodiment, as illustrated in views depicted by reference numerals <710> and <715>, the processor 550 may configure the fourth surface 222 of the second housing 220 as two areas, for example, a first area A1 (e.g., the upper area of the fourth surface 222 of the second housing 220) and a second area A2 (e.g., the lower area of the fourth surface 222 of the second housing 220). The processor 550 may detect user interactions 711 and 716 on the fourth surface 222 divided into the first area and the second area.

In another example, as illustrated in views depicted by reference numerals <720> and <725>, the processor 550 may configure the second surface 212 of the first housing 210 as two areas, for example, a third area A3 (e.g., the upper area of the second surface 212 of the first housing 210) and a fourth area A4 (e.g., the lower area of the second surface 212 of the first housing 210). The processor 550 may detect user interactions 721 and 726 on the second surface 212 divided into the third area and the fourth area.

Figure 7B:
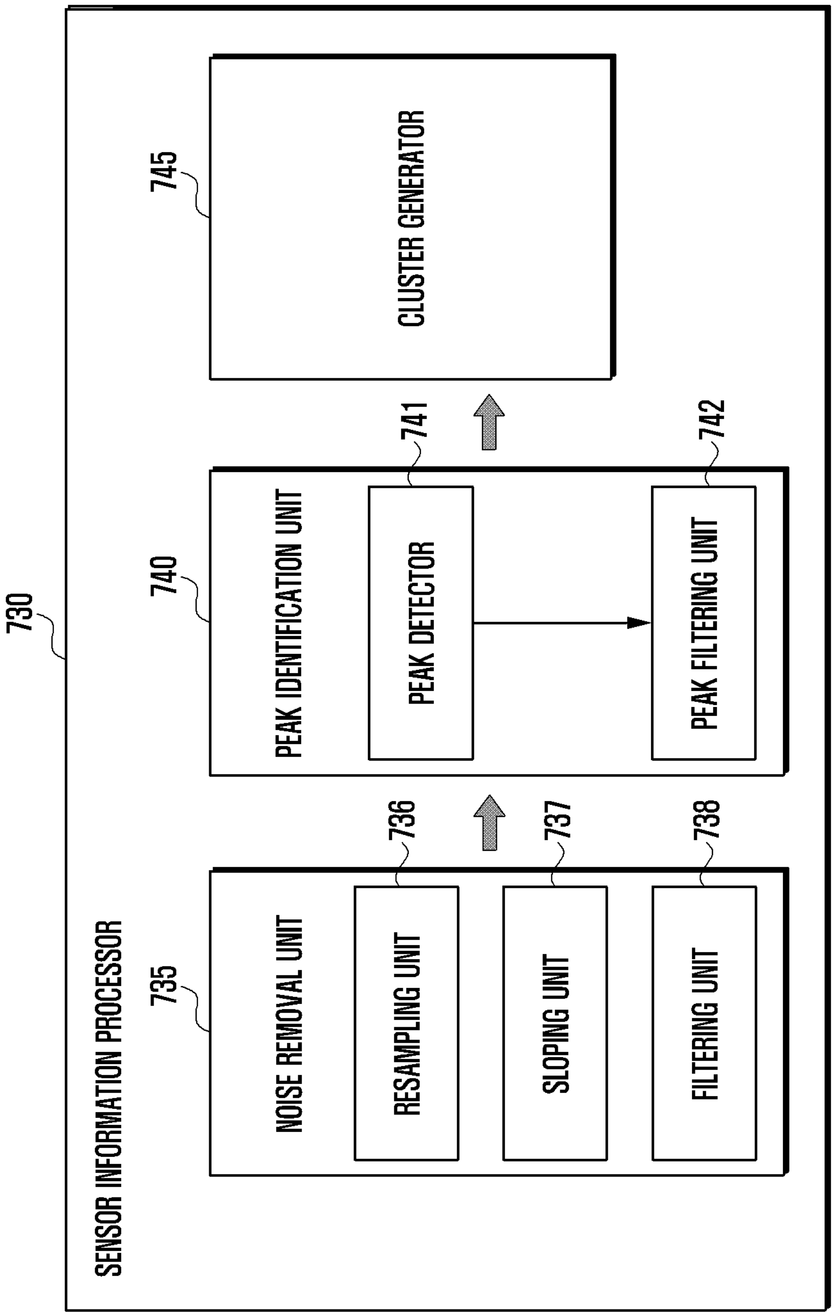
FIGS. 7B and 7C are views used to describe a method for detecting a user interaction according to an embodiment of the disclosure.

In various embodiments, the processor 550 may perform different functions depending on a location where a user interaction is detected (e.g., the first area, the second area, the third area, or the fourth area) and/or the type of user interaction (e.g., a double tap or a triple tap) detected in each location (e.g., the first area, the second area, the third area, or the fourth area). Although four areas are illustrated in FIGS. 7A and 7B, the disclosure is not limited thereto, and as such, according to another embodiment, the number of user interaction areas may be different than four. According to another embodiment, the size and/or shape of the user interaction areas may be same or different from each other.

In various embodiments, when a user interaction is detected, the processor 550 may accumulate and store, in a memory (e.g., the memory 520 in FIG. 5), sensor information acquired through the sensor circuit 540 and information, which has been identified based the sensor information, about the type of the user interaction and/or a location where the user interaction is detected. The processor 550 may learn or train a model, through artificial intelligence, based on the sensor information stored in the memory 520 and the information about the type of the user interaction and/or the location where the user interaction is detected corresponding to the stored sensor information. The processor 550 may identify information about the type of user interaction corresponding to sensor information acquired based on a learned learning model and/or information about a location where the user interaction is detected. In this regard, various embodiments will be described with reference to FIGS. 7B to 22 to be described later.

Figure 7C:
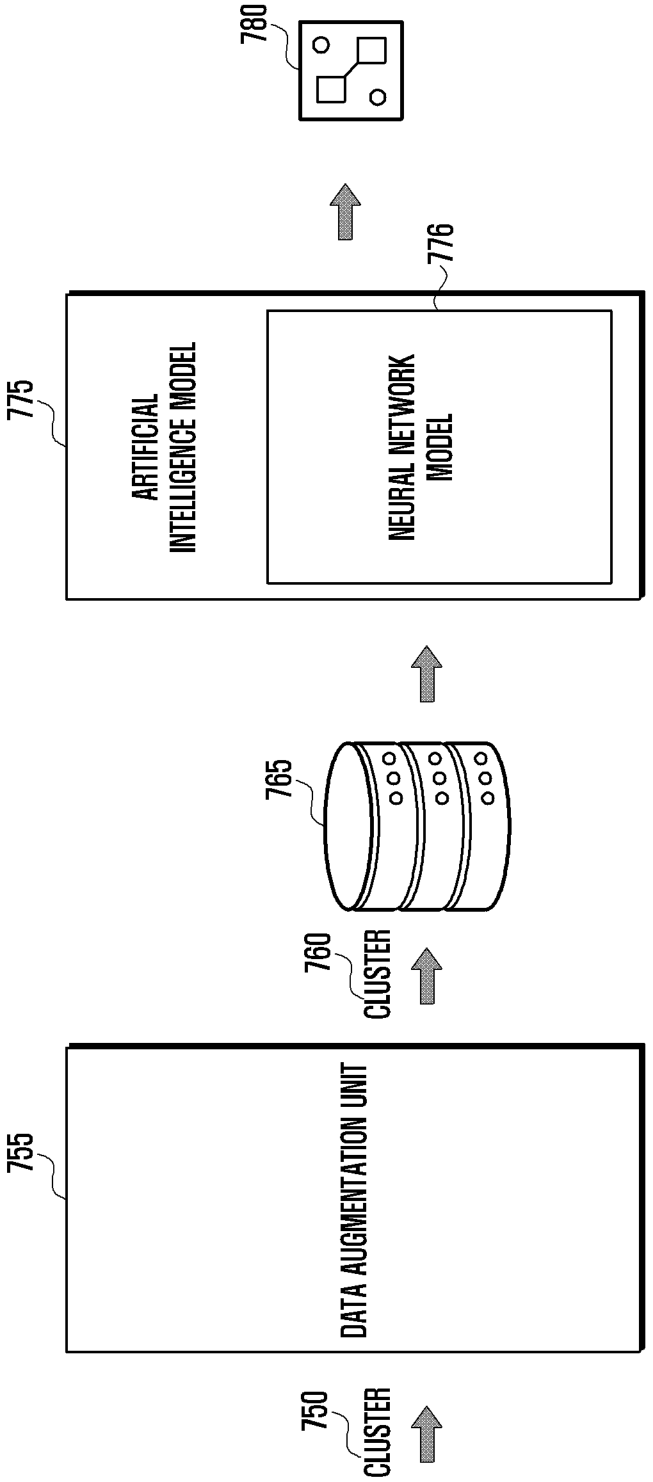

FIGS. 7B and 7C describe a method for detecting a user interaction according to an embodiment of the disclosure.

Referring to FIGS. 7B and 7C, a processor (e.g., the processor 550 in FIG. 5) may include a sensor information processor 730, a data augmentation unit 755, and/or an artificial intelligence model 775.

According to an embodiment, the sensor information processor 730, the data augmentation unit 755, and/or the artificial intelligence model 775 included in the processor 550 described above may be hardware modules (e.g., circuitry) included in the processor 550, and/or may be implemented as software including one or more instructions executable by the processor 550. According to an embodiment, the processor 550 may include a plurality of processors to implement the sensor information processor 730, the data augmentation unit 755, and/or the artificial intelligence model 775.

In an embodiment, the sensor information processor 730 may include a noise removal unit 735, a peak identification unit 740, and/or a cluster generator 745.

In an embodiment, the noise removal unit 735 may include a resampling unit 736, a sloping unit 737, and/or a filtering unit 738.

In an embodiment, the resampling unit 736 of the noise removal unit 735 may uniformly correct sensor values acquired through the sensor circuit 540, for example, the inertial sensor 541, at specific time intervals. The sensor values may be x-axis sensor data, y-axis sensor data, and z-axis sensor data corresponding to acceleration values and/or angle values detected by the sensor circuit 450.

In an embodiment, the slope unit 737 of the noise removal unit 735 may calculate a slope value of the sensor values uniformly corrected by the resampling unit 736, and may identify an abrupt change in the sensor values, based on the calculated slope value.

In an embodiment, the filtering unit 738 of the noise removal unit 735 may allow the sensor values and the slope value to pass through a low-pass filter (LPF). The sensor values and the slope value passed through the low-pass filter may pass through a high-pass filter (HPF). When the sensor values pass through the high-pass filter, noise may be removed from the sensor values and the slope value, so that a peak value of the sensor values may be accurately acquired.

In an embodiment, the peak identification unit 740 may include a peak detector 741 and/or a peak filtering unit 742.

In an embodiment, the peak detector 741 may detect peak values based on the sensor values (e.g., filtered sensor values) that have passed through the high pass filter in the filtering unit 738.

In an embodiment, the peak filtering unit 742 may remove (or delete) peak values, which are smaller than a reference peak value, among the peak values detected by the peak detector 741. The reference peak value may be a predetermined peak value or a designated peak value.

In an embodiment, the cluster generator 745 may generate, as one cluster 750, a designated number of sensor values including the highest peak value among the peak values filtered by the peak filtering unit 742.

In an embodiment, the data augmentation unit 755 may augment the amount of data based on the generated cluster 750. The augmented data may be generated as one cluster 760. In an embodiment, in order to generate a sufficient amount of data in a data set 765 usable for learning, the data augmentation unit 755 may augment the amount of data, based on the generated cluster 750.

In an embodiment, the data set 765 may be generated based on one cluster 760 including the augmented data. The generated data set 765 may be learned by the artificial intelligence model 775.

In an embodiment, the artificial intelligence model 775 may use the generated data set 765 to learn the type of user interaction and/or location information where the user interaction is detected, and may generate a learned model 780. The artificial intelligence model 775 may include a neural network model 776. The disclosure is not limited thereto.

In various embodiments, it has been described that the processor 550 learns information, which is determined (or identified) based on sensor data acquired through the sensor circuit 540 and is related to the type of user interaction and/or a location where the user interaction is detected, and generates the learned model 780. However, the disclosure is not limited thereto, and as such, according to another embodiment, the processor 550 may use through a wireless communication circuit (e.g., the wireless communication circuit 510 in FIG. 5) to transmit sensor data acquired through the sensor circuit 540 to a server (e.g., an intelligent server) and receive, from the server, a learning model learned through machine learning by artificial intelligence, so as to confirm (or identify, or determine) the type of user interaction and/or a location where the user interaction is detected.

Figure 8:
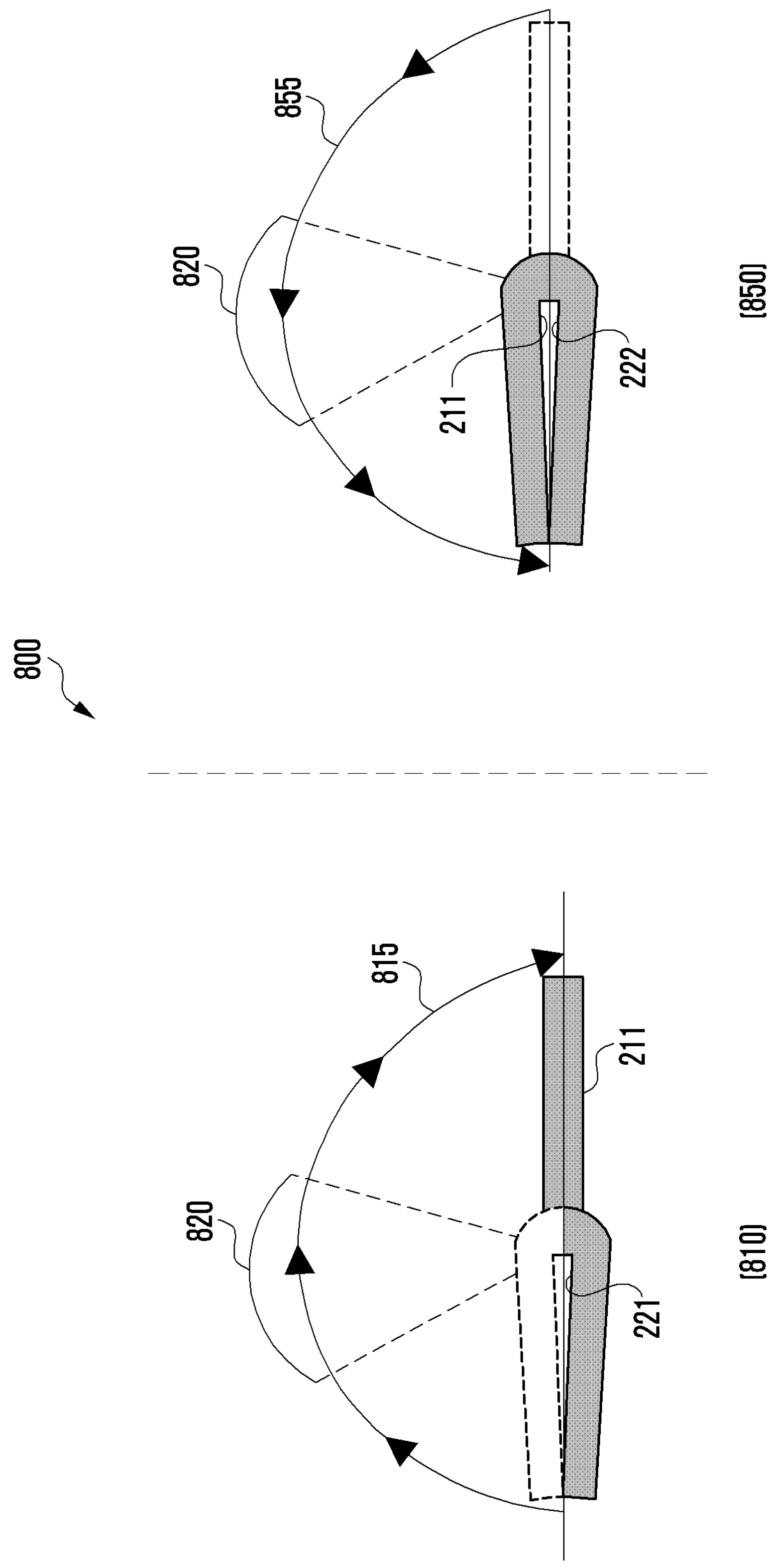
FIG. 8 illustrates a method for correcting sensor data of a user interaction, based on a state of an electronic device according to an embodiment of the disclosure.

FIG. 8 includes a view 800 for illustrating a method for correcting sensor data of a user interaction, based on a state of the electronic device 501 according to an embodiment of the disclosure.

Referring to FIG. 8, a processor (e.g., the processor 550 in FIG. 5) may identify, based on sensor information acquired through a sensor circuit (e.g., the sensor circuit 540 in FIG. 5), a state (e.g., an unfolded state as illustrated in FIGS. 2A and 2B, a folded state as illustrated in FIGS. 3A and 3B, or an intermediate state) and/or state switching (e.g., switching from an unfolded state to a folded state or from a folded state to an unfolded state) of an electronic device (e.g., the electronic device 501 in FIG. 5). For example, the sensor circuit 540 may include a Hall sensor and/or an inertial sensor (e.g., the inertial sensor 541 in FIG. 5).

In an embodiment, when the electronic device 501 is in an unfolded state (e.g., the state in FIGS. 2A and 2B), a first housing (e.g., the first housing 210 in FIG. 2A) and a second housing (e.g., the second housing 220 in FIG. 2A) may form an angle of about 180 degrees.

In an embodiment, when the electronic device 501 is in a folded state (e.g., the state in FIGS. 3A and 3B), a first surface (e.g., the first surface 211 in FIG. 2A) of the first housing 210 and a third surface (e.g., the third surface 221 in FIG. 2A) of the second housing 220 form a narrow angle (e.g., a range from about 0 degrees to about 10 degrees) therebetween, and may be arranged to face each other.

In an embodiment, when the electronic device 501 is in an intermediate state in which a predetermined angle is formed, the first surface 211 of the first housing 210 and the third surface 221 of the second housing 220 may form an angle of about 80 degrees to about 130 degrees.

According to an embodiment, a view depicted by reference number 810 illustrates switching (815) of the electronic device 501 from a folded state to an unfolded state. For example, the processor 550 may detect switching of the electronic device 501 from a folded state (e.g., the state in which the first surface 211 of the first housing 210 and the third surface 221 of the second housing 220 form an angle of about 0 degrees to about 10 degrees) to an intermediate state (e.g., the state in which the first surface 211 of the first housing 210 and the third surface 221 of the second housing 220 form an angle of about 80 degrees to about 130 degrees), or to an unfolded state (e.g., the state in which the first housing 210 and the second housing 220 form an angle of about 180 degrees).

According to an embodiment, a view depicted by reference number 850 illustrates switching (855) of the electronic device 501 from an unfolded state to a folded state. For example, the processor 550 may detect switching of the electronic device 501 from an unfolded state (e.g., the state of about 180 degrees) to an intermediate state (e.g., the state in which the first surface 211 of the first housing 210 and the third surface 221 of the second housing 220 form an angle of about 80 degrees to about 130 degrees) or to a folded state (e.g., the state in which the first surface 211 of the first housing 210 and the third surface 221 of the second housing 220 form an angle of about 0 degrees to about 10 degrees).

In an embodiment, the processor 550, when the first surface 211 of the first housing 210 and the third surface 221 of the second housing 220 form a specific angle 820 (e.g., about 75 degrees to about 115 degrees) based on the state switching of the electronic device 501, the processor 550 may correct sensor data acquired through the sensor circuit 540. The sensor data acquired through the sensor circuit 540 may be corrected based on the state of the electronic device 501, thereby accurately identifying the type of user interaction according to the state of the electronic device 501 and/or a location where the user interaction is detected.

Figure 9A:
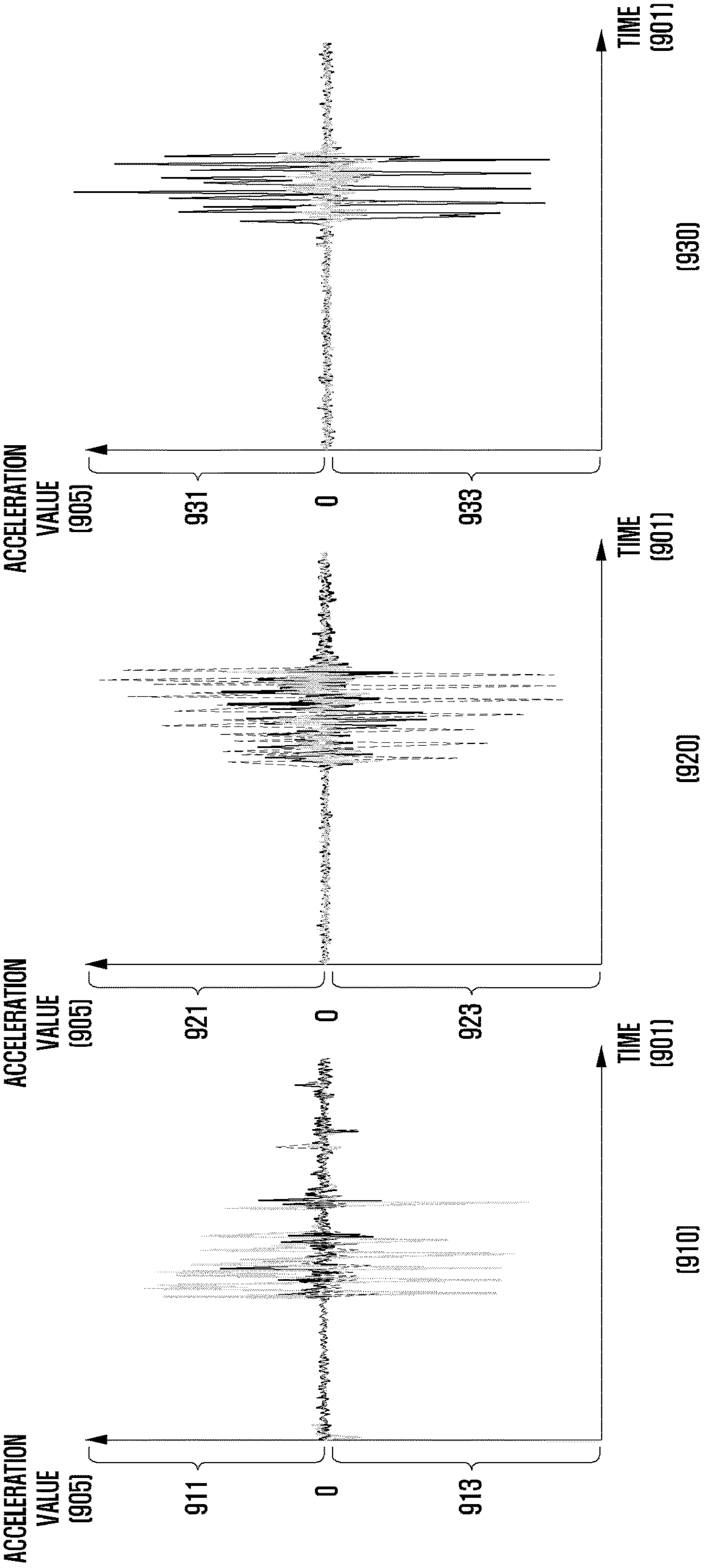
FIGS. 9A and 9B are views used to describe a method for correcting sensor data of a user interaction by using sensor information obtained through an inertial sensor according to an embodiment of the disclosure.
Figure 9B:
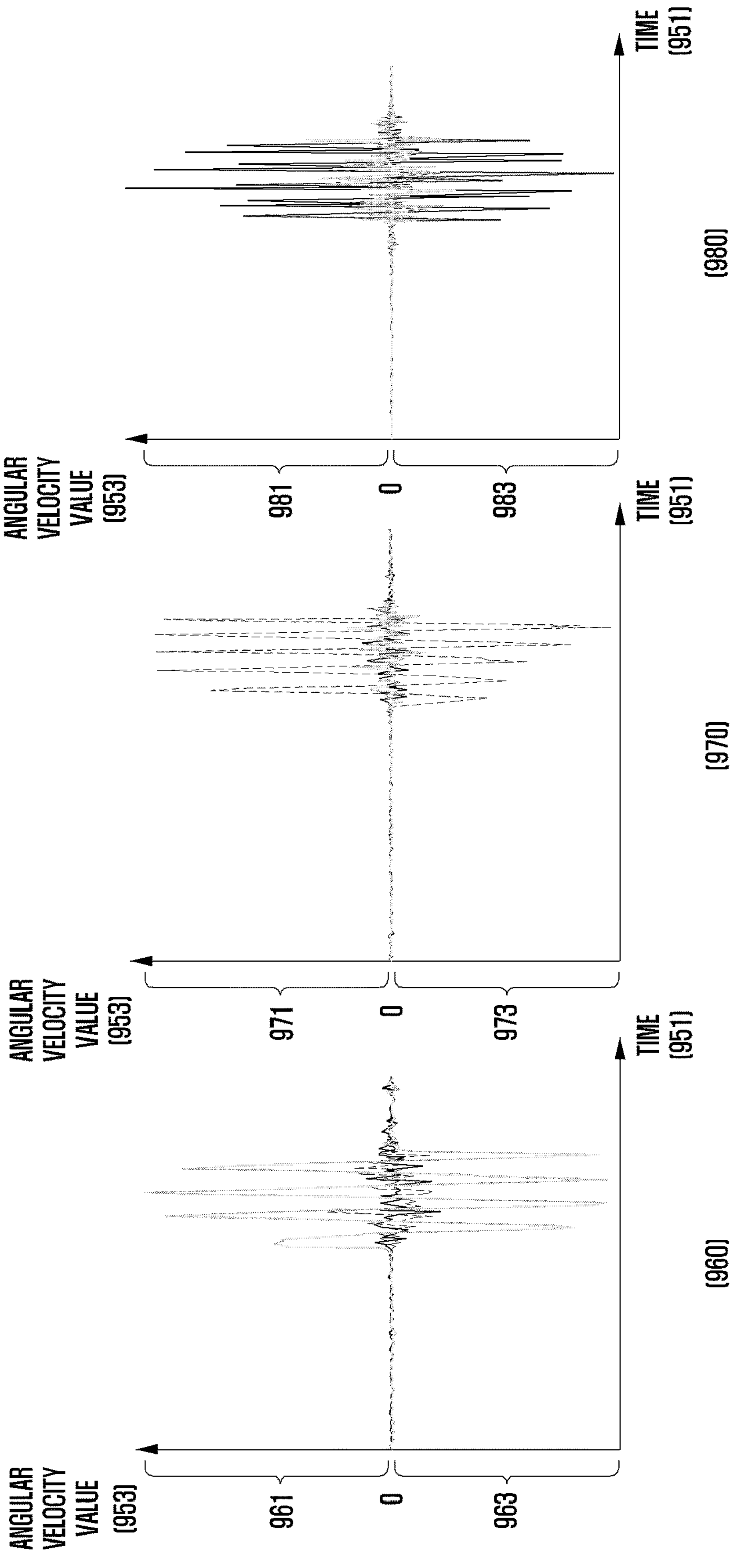

FIGS. 9A and 9B illustrate a method for correcting sensor data of a user interaction by using sensor information obtained through the inertial sensor 541 according to an embodiment of the disclosure.

FIG. 9A illustrates graphs 910, 920 and 930 showing sensor information, for example, x-axis, y-axis, and z-axis acceleration values, acquired through an inertial sensor (e.g., the inertial sensor 541 in FIG. 5). FIG. 9B illustrates graphs 960, 970 and 980 showing sensor information, for example, the x-axis, y-axis, and z-axis angle velocity values, acquired through the inertial sensor 541.

Referring to FIG. 9A, the x-axis may denote time 901 and the y-axis may denote an acceleration value (m/s2) 905.

In an embodiment, graphs 910, 920, and 930 are showing acceleration values 911, 921, and 931 of the x-axis (e.g., left/right movement), y-axis (e.g., forward/backward movement), and z-axis (e.g., up/down movement) of a first housing (e.g., the first housing 210 in FIG. 2A) and acceleration values 913, 923, and 933 of the x-axis (e.g., left/right movement), y-axis (e.g., forward/backward movement), and z-axis (e.g., up/down movement) of a second housing (e.g., the second housing 220 in FIG. 2A) according to the movement of an electronic device (e.g., the electronic device 501 in FIG. 5).

In various embodiments, as noted in graphs 910, 920, and 930, the processor 550 may identify (or determine), based on the acceleration values of the first housing 210 and the second housing 220 according to the movement of the electronic device 501, whether a user interaction has been detected on the rear surface, for example, a second surface (e.g., the second surface 212 in FIG. 2B) or a fourth surface (e.g., the fourth surface 222 in FIG. 2B), of the electronic device 501.

Referring to FIG. 9B, the x-axis may denote time 951, and the y-axis may denote an angular velocity value (rad/s) 953.

In an embodiment, graphs 960, 970, and 980 are showing angular velocity values 961, 971, and 981 of the x-axis, y-axis, and z-axis of a first housing (e.g., the first housing 210 in FIG. 2A) and angular velocity values 963, 973, and 983 of the x-axis, y-axis, and z-axis of a second housing (e.g., the second housing 220 in FIG. 2A) according to the movement of the electronic device 501.

In various embodiments, as noted in graphs 960, 970, and 980, the processor 550 may identify the posture of the electronic device 501, for example, the degree of horizontality, based on the angular velocity values of the first housing 210 and the second housing 220 according to the movement of the electronic device 501, thereby determining (or identify, or confirm, or estimate) whether a user interaction detected on the rear surface, for example, the second surface 212 or the fourth surface 222, of the electronic device 501 is an intended user input.

Figure 10A:
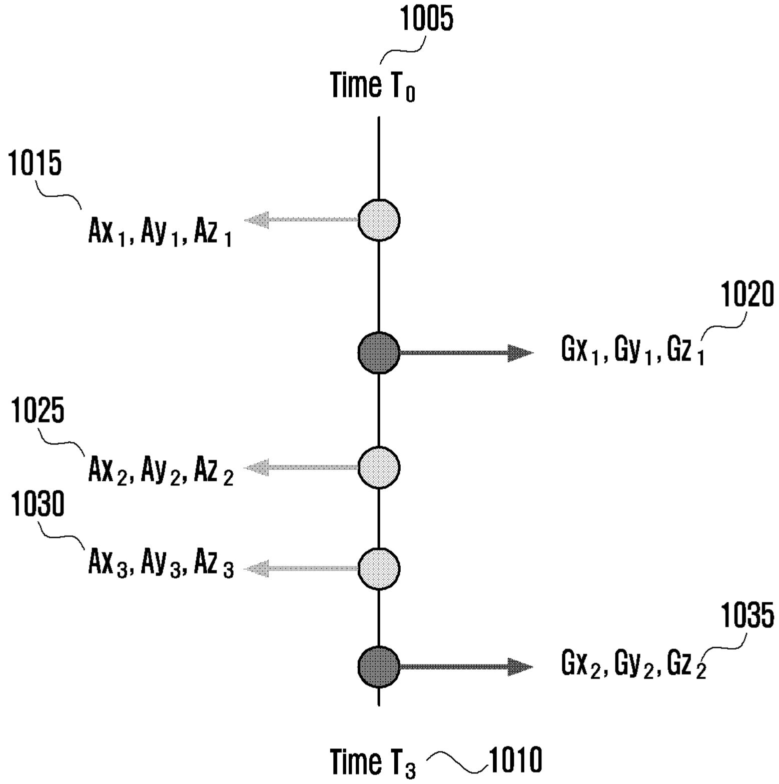
FIGS. 10A, 10B and 10C illustrate an operation of a resampling unit in FIG. 7B according to an embodiment of the disclosure.
Figure 10B:
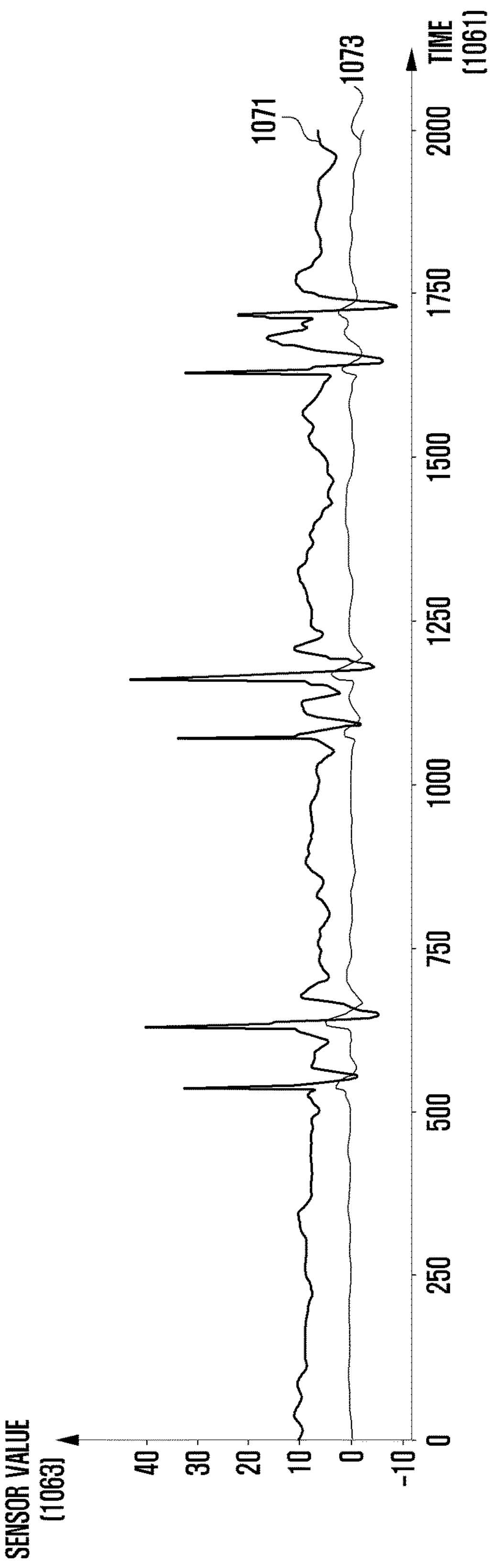
Figure 10C:
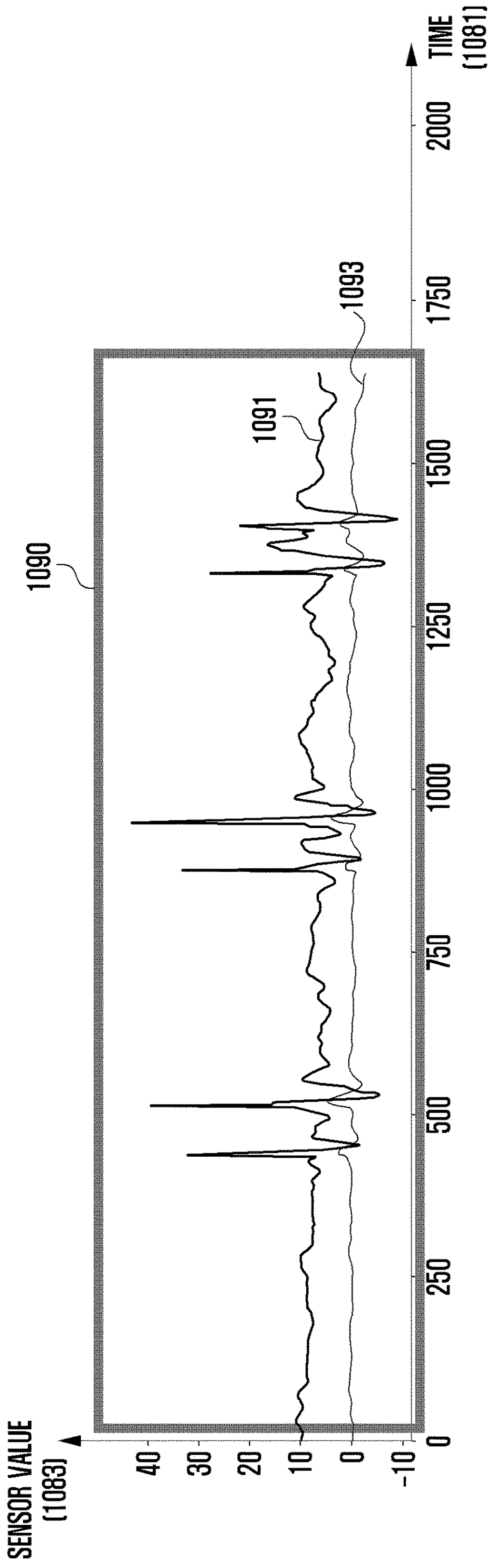

FIGS. 10A, 10B and 10C illustrate an operation of the resampling unit 736 in FIG. 7B according to an embodiment of the disclosure.

Referring to FIG. 10A, a processor (e.g., the processor 550 in FIG. 5) may acquire a sensor value, for example, acceleration values and/or angular velocity values, measured based on a specific axis (e.g., the x-axis, the y-axis, and/or the z-axis) through a sensor circuit (e.g., the sensor circuit 540 in FIG. 5), for example, an inertial sensor (e.g., the inertial sensor 541 in FIG. 5).

In an embodiment, the processor 550 (e.g., the resampling unit 736 of the processor 550) may uniformly correct the acceleration values and/or the angular velocity values acquired through the inertial sensor 541 during a specific time period and measured based on a specific axis.

In an embodiment, the processor 550 may acquire sensor data through the inertial sensor 541, for example, an acceleration sensor and/or a gyro sensor, for a specific time (e.g., Time $T_0$ 1005 to Time $T_3$ 1010). For example, first sensor data 1015 (e.g., $Ax_1$, $Ay_1$ and $Az_1$), third sensor data 1025 (e.g., $Ax_2$, $Ay_2$ and $Az_2$), and fourth sensor data 1030 (e.g., $Ax_3$, $Ay_3$ and $Az_3$) may be acquired through the acceleration sensor, and second sensor data 1020 (e.g., $Gx_1$, $Gy_1$ and $Gz_1$) and fifth sensor data 1035 (e.g., $Gx_2$, $Gy_2$ and $Gz_2$) may be acquired through the gyro sensor.

In an embodiment, the processor 550 (e.g., the resampling unit 736) may uniformly correct the first sensor data 1015 (e.g., $Ax_1$, $Ay_1$ and $Az_1$), the second sensor data 1020 (e.g., $Gx_1$, $Gy_1$ and $Gz_1$), the third sensor data 1025 (e.g., $Ax_2$, $Ay_2$ and $Az_2$), the fourth sensor data 1030 (e.g., $Ax_3$, $Ay_3$ and $Az_3$), and the fifth sensor data 1035 (e.g., $Gx_2$, $Gy_2$ and $Gz_2$) acquired through the inertial sensor 541 for the specific time.

For example, FIG. 10B illustrates a first graph 1071 showing sensor values (e.g., acceleration values measured based on the z-axis) acquired at designated time intervals through the inertial sensor 541, for example, an acceleration sensor, and a second graph 1073 showing sensor values (e.g., angular velocity values measured based on the x-axis) acquired through a gyro sensor at designated time intervals.

In the first graph 1071 and the second graph 1073, the x-axis may denote time 1061, and the y-axis may denote a sensor value 1063 (e.g., acceleration value or angular velocity value).

FIG. 10C illustrates a third graph 1091, obtained by resampling the sensor values (e.g., acceleration values measured based on the z-axis) acquired at the designated time intervals through the acceleration sensor according to the illustrated in FIG. 10B, and a fourth graph 1093, obtained by resampling the sensor values (e.g., angular velocity values measured based on the x-axis) acquired through the gyro sensor at the designated time intervals.

In the third graph 1091 and the fourth graph 1093, the x-axis may denote time 1081, and the y-axis may denote a sensor value 1083 (e.g., acceleration value or angular velocity value).

In various embodiments, the resampling unit 736 may correct (1090) the sensor values acquired through the acceleration sensor and/or the gyro sensor so as to have uniform sensor values.

In various embodiments, the processor 550 may perform an operation in FIGS. 11A and 11B, which will be described below, by using the above-described corrected uniform sensor values.

Figure 11A:
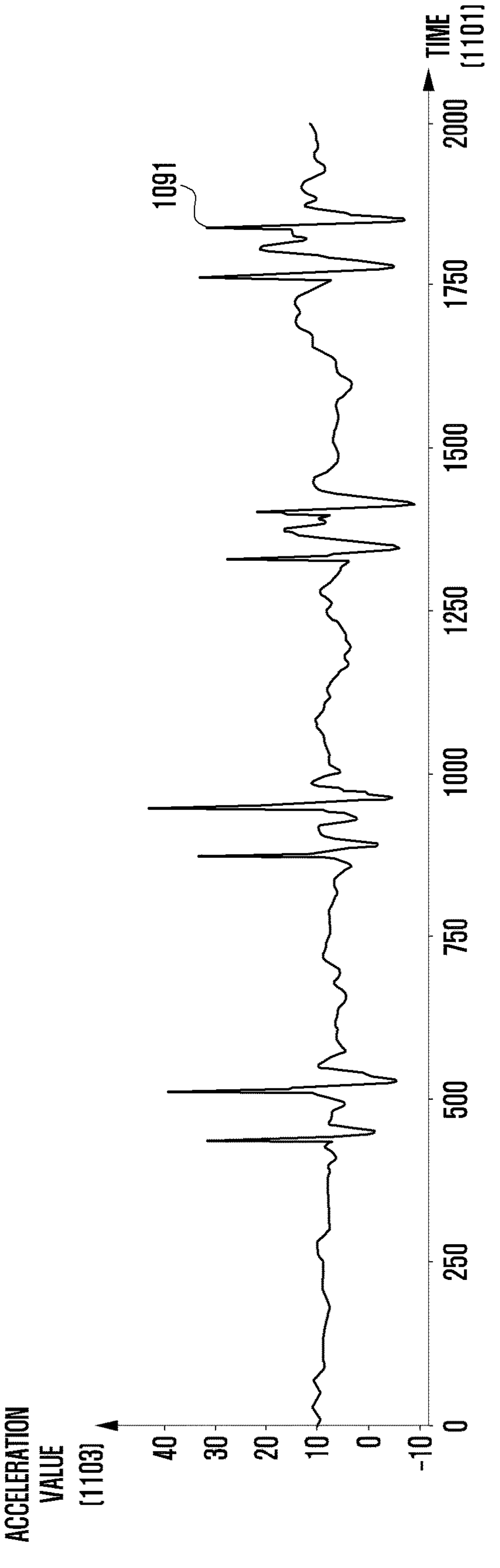
FIGS. 11A and 11B illustrate an operation of a sloping unit in FIG. 7B according to an embodiment of the disclosure.
Figure 11B:
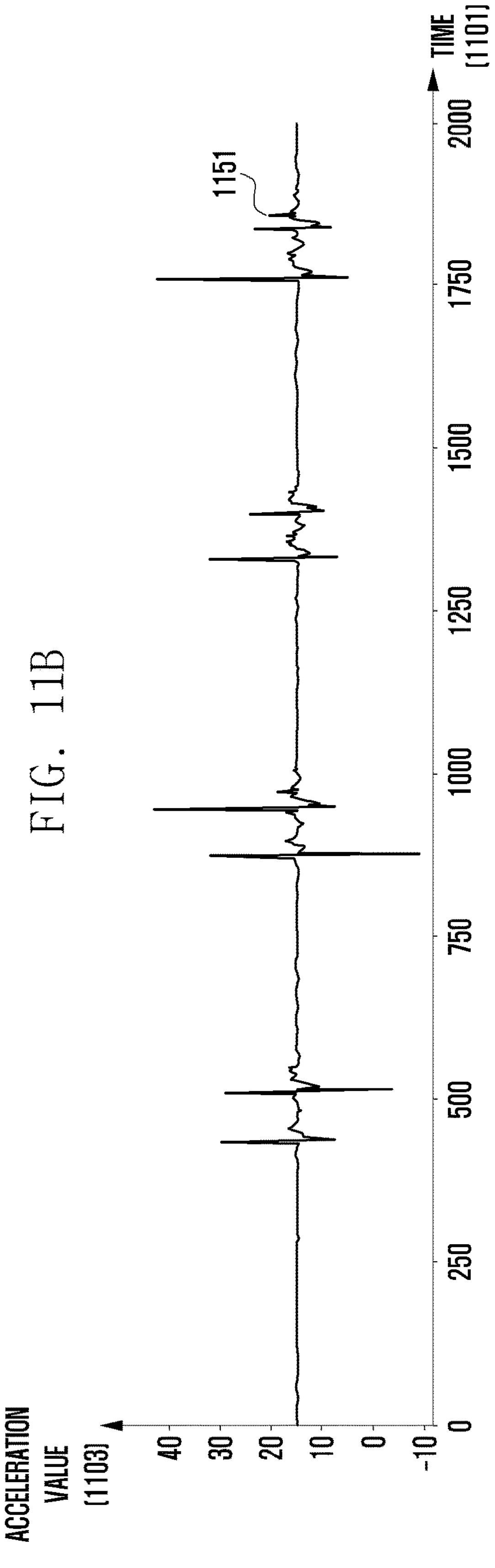

FIGS. 11A and 11B illustrate an operation of the sloping unit 737 in FIG. 7B according to an embodiment of the disclosure.

Referring to FIG. 11A, a graph 1091 shows acceleration values (e.g., acceleration values measured based on the z-axis) corrected through the resampling operation in FIGS. 10B and 11C described above. Referring to 11B, a graph 1151 shows acceleration values (e.g., acceleration values measured based on the z-axis) according to the movement of the electronic device 501 through a slope operation.

In an embodiment, a processor (e.g., the processor 550 in FIG. 5) may calculate the slope value (m) of sensor values, based on <Equation 1> below. For example, the processor 550 may identify how much acceleration (e.g., the y-axis) has been performed for a predetermined time (e.g., the x-axis) through a sloping unit (e.g., the sloping unit 737 in FIG. 7B) to calculate the slope value (m) of the sensor values. The processor 550 may identify rapid changes in the sensor values, based on the calculated slope value (m). In other words, the processor 550 may identify whether the acceleration has changed rapidly with respect to time.

$$\text{Slope}(m)=\Delta y/\Delta x=\tan\theta(x\text{: time}, y\text{: acceleration value}) \quad \text{[Equation 1]}$$

After calculating the above-described slope (m), the processor 550 may filter the sensor values and the calculated slope value (m) through a filtering unit (e.g., the filtering unit 738 in FIG. 7B) and then perform an operation in FIGS. 12A and 12B as follows.

Figure 12A:
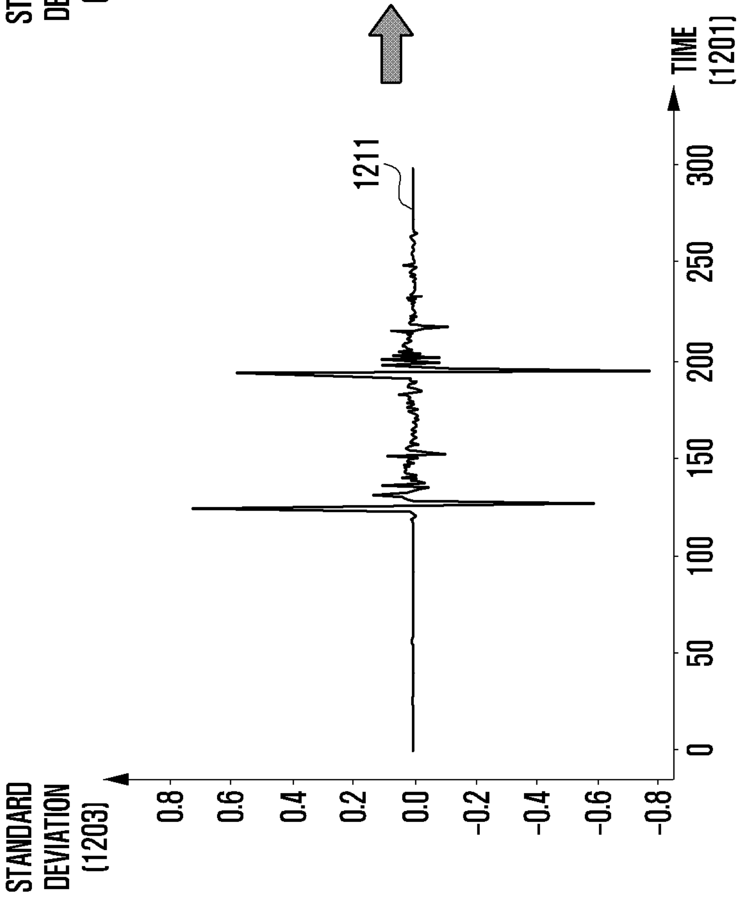
FIGS. 12A and 12B illustrate an operation of a peak identification unit in FIG. 7B according to an embodiment of the disclosure.
Figure 12B:
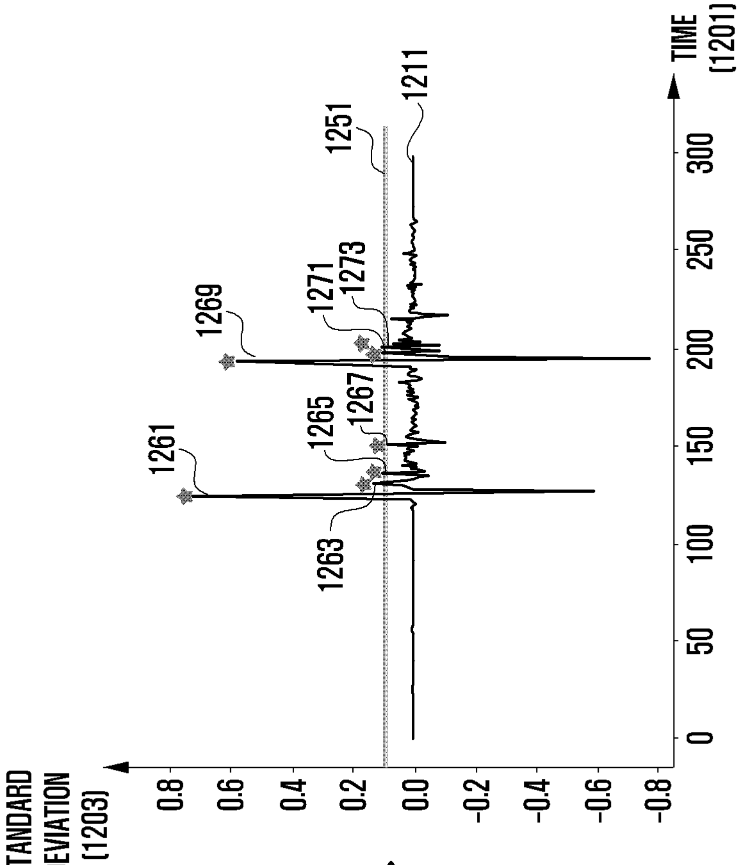

FIGS. 12A and 12B illustrate an operation of the peak identification unit 740 in FIG. 7B according to an embodiment of the disclosure.

Referring to FIG. 12A, a graph 1211 shows acceleration values (e.g., acceleration values measured based on the z-axis) detected through a peak detector (e.g., the peak detector 741 in FIG. 7B). Referring to FIG. 12B, a graph 1211 shows acceleration values (e.g., acceleration values measured based on the z-axis) filtered through a peak filtering unit (e.g., the peak filtering unit 742 in FIG. 7B).

In FIGS. 12A and 12B, the x-axis may indicate time 1201 and the y-axis may indicate a standard deviation 1203 of acceleration values.

In an embodiment, the processor 550 (e.g., the peak detector 741) may identify peak values of acceleration values in the graph 1211 in FIG. 12A. For example, the identified peak values may include a first peak value 1261, a second peak value 1263, a third peak value 1265, a fourth peak value 1267, a fifth peak value 1269, a sixth peak value 1271, and a seventh peak value 1273.

In an embodiment, the processor 550 (e.g., the peak filtering unit 742) may remove a gravitational acceleration component through a filter (e.g., a high-pass filter). For example, as illustrated in FIG. 12B, the processor 550 (e.g., the peak filtering unit 742) may remove (or delete) the identified peak values, for example, peak values, which are less than a specified peak value 1251 and/or are within a specified range (e.g., +0.2) based on the specified peak value 1251 (e.g., the second peak value 1263, the third peak value 1265, the fourth peak value 1267, the sixth peak value 1271, and the seventh peak value 1273), among the first peak value 1261, the second peak value 1263, the third peak value 1265, the fourth peak value 1267, the fifth peak value 1269, the sixth peak value 1271, and the seventh peak values 1273.

Figure 13:
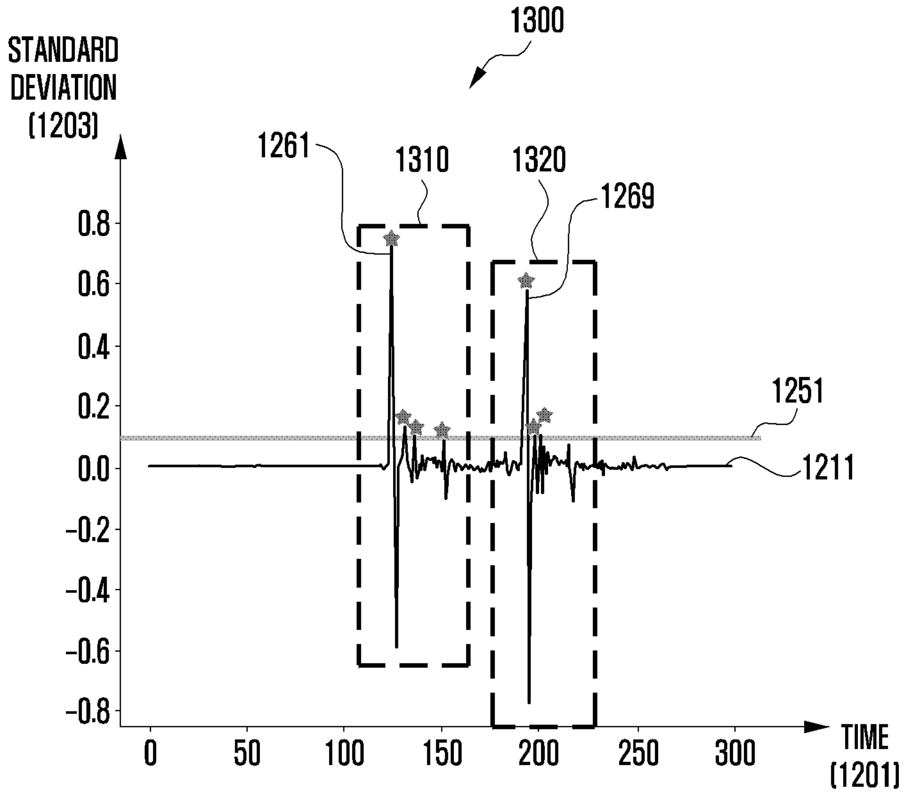
FIG. 13 illustrates an operation of a cluster generator in FIG. 7B according to an embodiment of the disclosure.

FIG. 13 includes a graph 1300 for illustrating an operation of the cluster generator 745 in FIG. 7B according to an embodiment of the disclosure.

Referring to FIG. 13, a processor (e.g., the processor 550 in FIG. 5) (e.g., the cluster generator 745) may generate, as one cluster, a designated number of sensor values including the highest peak value among the peak values filtered by the peak filtering unit (e.g., the peak filtering unit 742 in FIG. 7B) in FIGS. 12A and 12B described above. For example, the processor 550 (e.g., the cluster generator 745) may generate a first cluster 1310 including a designated number of sensor values including the highest peak value, for example, the first peak value 1261, and a second cluster 1320 including a designated number of sensor values including the fifth peak value 1269.

In an embodiment, the processor 550 may identify (or determine) one cluster as a single tap. For example, the processor 550 may identify the first cluster 1310 as a first tap, and may identify the second cluster 1320 as a second tap. The processor 550 may determine the type of a user interaction, based on the detected time of the identified first tap and the detected time of the identified second tap. In this regard, various embodiments will be described with reference to FIG. 14 to be described later.

Figure 14:
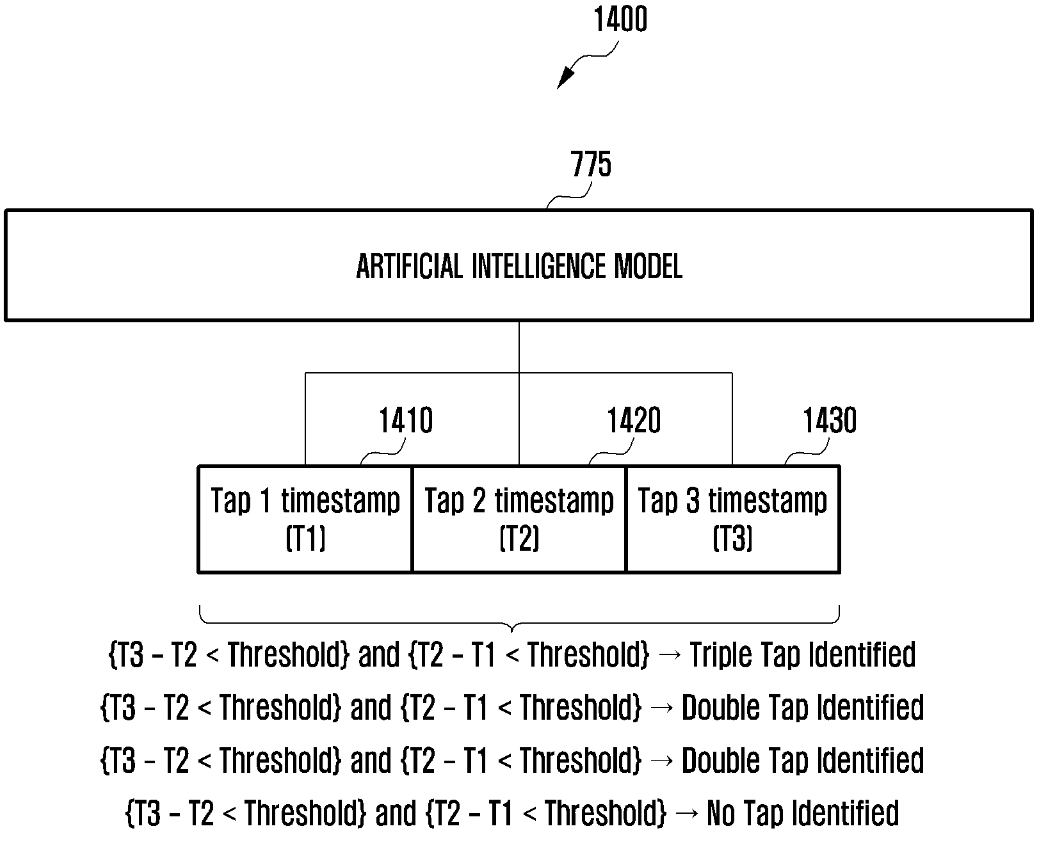
FIG. 14 illustrates an operation of an artificial intelligence model according to an embodiment of the disclosure.

FIG. 14 is a view 1400 illustrating an operation of the artificial intelligence model 775 according to an embodiment of the disclosure.

Referring to FIG. 14, a processor (e.g., the processor 550 in FIG. 5) (e.g., the artificial intelligence model 775 in FIG. 7B) may learn the type of a user interaction and/or location information where the user interaction is detected, wherein the information is determined (or identified) based on sensor data acquired through a sensor circuit (e.g., the sensor circuit 540 in FIG. 5) through the above-described operations in FIGS. 7A to 13, and may generate a learned model.

In an embodiment, the type of user interaction may include no-tap, a single tap, a double tap, and a triple tap. Also, the location where the user interaction is detected may be a partial area of the rear surface of an electronic device (e.g., the electronic device 501 in FIG. 5). For example, a partial area of the rear surface of the electronic device 501 may include a second surface (e.g., the second surface 212 in FIG. 2B) of a first housing (e.g., the first housing 210 in FIG. 2A) or a fourth surface (e.g., the fourth surface 222 in FIG. 2B) of a second housing (e.g., the second housing 220 in FIG. 2A).

In an embodiment, the processor 550 may identify a time T1 when a first tap 1410 is detected, a time T2 when a second tap 1420 is detected, and a time T3 when a third tap 1430 is detected. For example, each of the first tap 1410, the second tap 1420, or the third tap 1430 may be based on clusters (e.g., the first cluster 1310 and the second cluster 1320) generated based on the peak values examined in FIG. 13 described above.

In an embodiment, the processor 550 may identify (or determine) the type of user interaction as a triple tap when it is identified that the difference between the time T3, at which the third tap 1430 is detected, and the time T2, at which the second tap 1420 is detected, is smaller than a designated time (e.g., about 500 ms) and that the time T2, at which the second tap 1420 is detected, and the time T1, at which the first tap 1410 is detected, are smaller than the designated time. However, the disclosure is not limited thereto.

In an embodiment, the processor 550 may identify (or determine) the type of user interaction as a double tap when it is identified that the difference between the time T3, at which the third tap 1430 is detected, and the time T2, at which the second tap 1420 is detected, is greater than a designated time (e.g., about 500 ms) and that the time T2, at which the second tap 1420 is detected, and the time T1, at which the first tap 1410 is detected, are smaller than the designated time. In another embodiment, the processor 550 may identify (or determine) the type of user interaction as a double tap when it is identified that the difference between the time T3, at which the third tap 1430 is detected, and the time T2, at which the second tap 1420, is smaller than a designated time (e.g., about 500 ms) and that the time T2, at which the second tap 1420 is detected, and the time T1, at which the first tap 1410 is detected, are greater than the designated time. However, the disclosure is not limited thereto.

In an embodiment, when it is identified that the difference between the time T3, at which the third tap 1430 is detected, and the time T2, at which the second tap 1420, is greater than a designated time (e.g., about 500 ms) and that the time T2, at which the second tap 1420 is detected, and the time T1, at which the first tap 1410 is detected, are greater than the designated time, the processor 550 may identify (or determine) the type of user interaction as a single tap and may process the first tap 1410, the second tap 1420, or the third tap 1430 as an invalid input. For example, a single tap may be detected by manipulation of the electronic device 501 (e.g., a touch input on a display (e.g., the display 530 in FIG. 5)) or by external impact (e.g., impact due to placing the electronic device 501 on the ground or impact due to shock applied to the ground on which the electronic device 501 is placed), and this may not be an input intended by the user. Considering this, when the type of user interaction by the first tap 1410, the second tap 1420, and/or the third tap 1430 is identified (or determined) as a single tap, the processor 550 may process the single tap as an invalid input. In another example, when the type of user interaction by the first tap 1410, the second tap 1420, and/or the third tap 1430 described above is identified (or determined) as a double tap or a triple tip, the processor 550 may process the double tap or the triple tap as a valid input. However, the disclosure is not limited thereto.

Figure 15A:
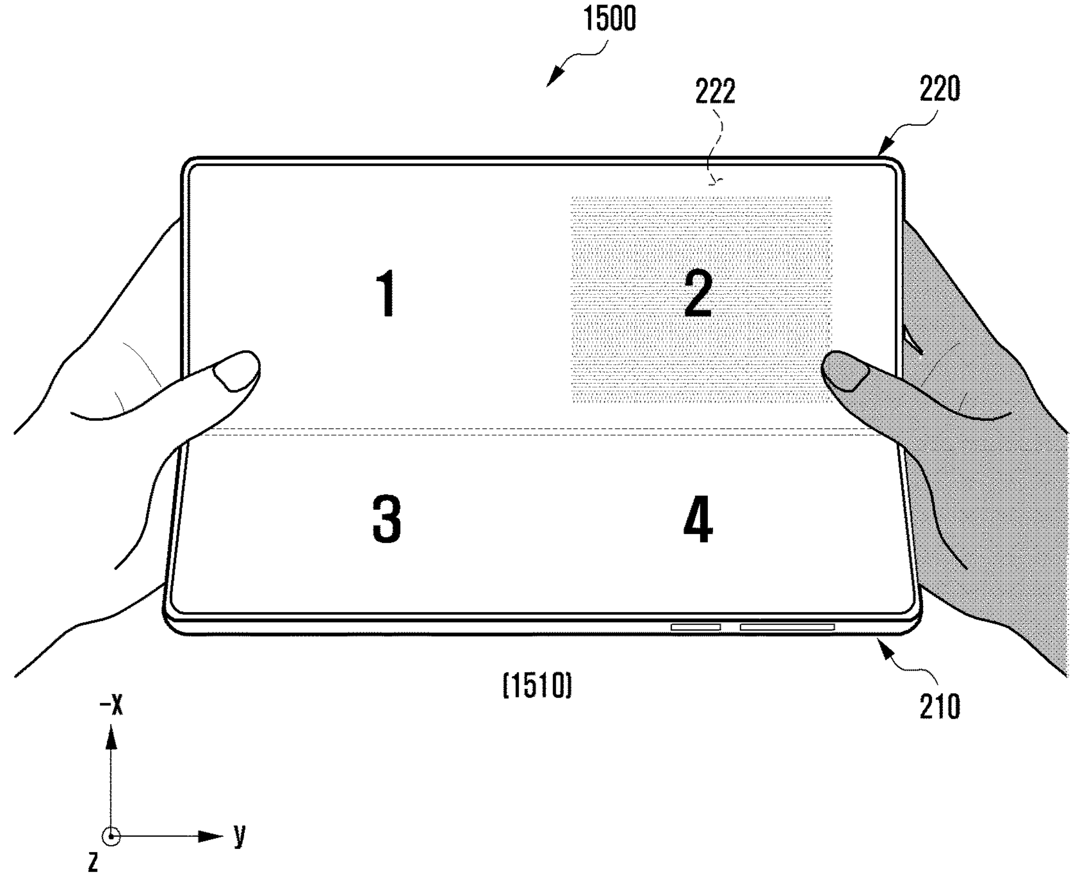
FIGS. 15A and 15B illustrate a method for correcting sensor data of a user interaction according to an embodiment of the disclosure.
Figure 15A:
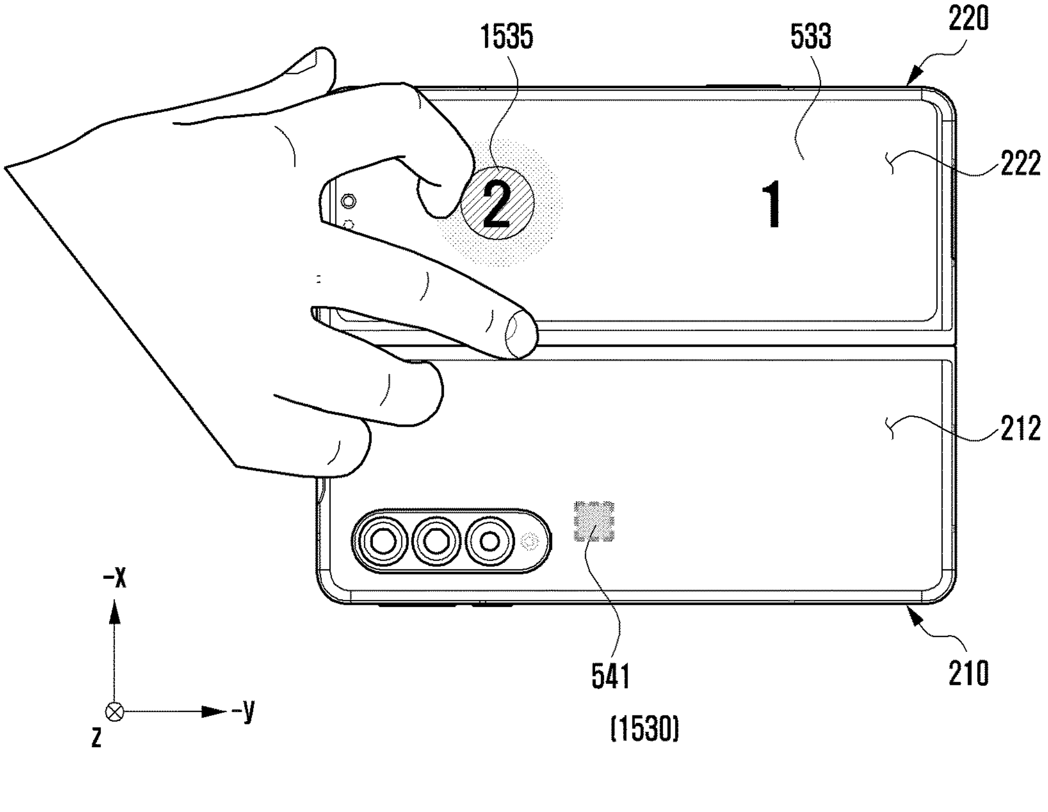
Figure 15B:
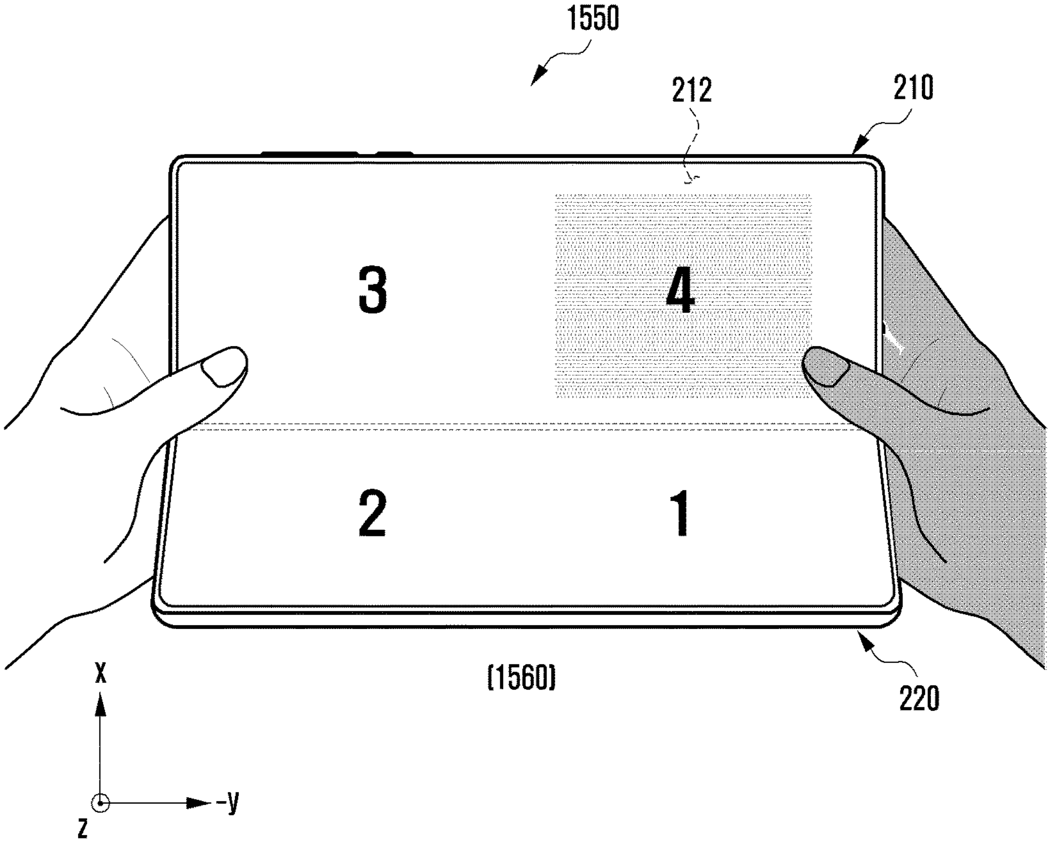
Figure 15B:
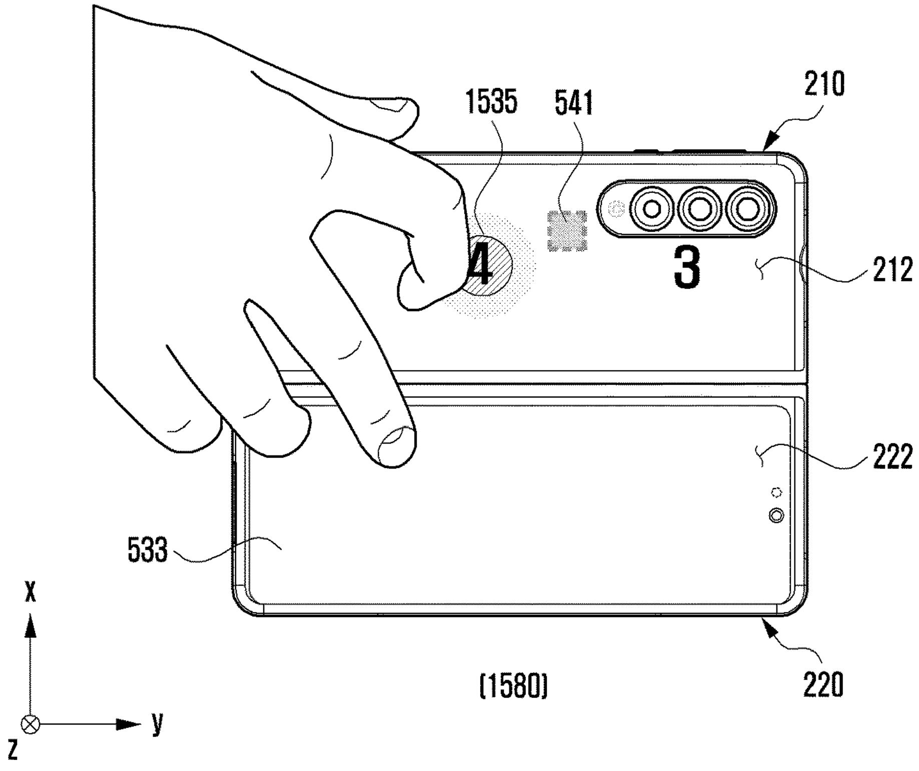

FIGS. 15A and 15B include views 1500 and 1550, respectively, for illustrating a method for correcting sensor data of a user interaction according to an embodiment of the disclosure.

Referring to FIGS. 15A and 15B, a processor (e.g., the processor 550 in FIG. 5) may identify the posture of an electronic device (e.g., the electronic device 501 in FIG. 5).

In an embodiment, the processor 550 may identify the posture of the electronic device 501 based on sensor information acquired through an inertial sensor (e.g., the inertial sensor 541 in FIG. 5).

In an embodiment, as illustrated in views depicted by reference numerals <1510> and <1530>, the posture of the electronic device 501 may include a state in which a first housing (e.g., the first housing 210 in FIG. 2A) having a sensor circuit (e.g., the sensor circuit 540 in FIG. 5), for example, the inertial sensor 541, provided therein is provided to face the ground (e.g., the floor or a desk) (e.g., a state in which the first housing 210 is provided parallel to the ground). Here, the rear surface of the first housing 210 may face the ground. For example, the second surface 212 of the first housing 210 may be provided to face the ground. However, the disclosure is not limited thereto, and as such, according to another embodiment, reference numerals <1510> and <1530> may include a scenario in which the first housing 210 is provided to be a lower part of the electronic device 501. For instance, the electronic device 501 is in an orientation that has the second housing 220 as the upper part and the first housing 210 as the lower part of the electronic device 501. As such, the disclosure is not limited to the first housing 210 is facing the ground or being parallel to the ground.

According to an embodiment, reference numeral <1510> illustrates the front surface of the electronic device 501 in a state in which the first housing 210 is provided to face the ground, and reference numeral <1530> illustrates the bear surface of the electronic device 501 in a state where the first housing 210 is provided to face the ground.

In an embodiment in FIG. 15A, referring to reference numerals <1510> and <1530>, in a state where the first housing 210 is provided to face the ground, a user interaction 1535 may be detected in a partial area, for example, a second area, of a fourth surface (e.g., the fourth surface 222 in FIG. 2B) of a second housing (e.g., the second housing 220 in FIG. 2A) of the electronic device 501. In an embodiment, a second display (e.g., the second display 533 in FIG. 5) may be provided on the fourth surface 222 of the second housing 220. As the second display 533 is provided on the fourth surface 222 of the second housing 220, the user interaction 1535 may be detected through the second display 533 provided on the fourth surface 222.

In an embodiment, when the posture of the electronic device 501 is the state of reference numerals <1510> and <1530>, the probability that the user interaction 1535 will be detected through the second display 533 provided on the fourth surface 222 may be higher than the probability that the user interaction will be detected on a second surface (e.g., the second surface 212 in FIG. 2B) of the first housing 210. Based on this, when it is identified that the posture of the electronic device 501 is the state of reference numerals <1510> and <1530>, the processor 550 may estimate (or predict) that the user interaction 1535 will be detected through the second display 533 provided on the fourth surface 222, and may correct sensor data of the user interaction 1535.

In another embodiment in FIG. 15B, as illustrated in views depicted by reference numerals <1560> and <1580>, the posture of the electronic device 501 may include a state in which the first housing 210 in which the sensor circuit 540, for example, the inertial sensor 541, is provided not to face the ground (e.g., a state in which the first housing 210 is not provided parallel to the ground).

In an embodiment in FIG. 15B, reference numeral <1560> illustrates the front surface of the electronic device 501 in a state in which the first housing 210 is provided not to face the ground, and reference numeral <1580> illustrates the rear surface of the electronic device 501 in a state where the first housing 210 is provided not to face the ground. Here, the rear surface of the first housing 210 may not face the ground. Instead, the fourth surface 222 of the second housing 220 may be provided to face the ground. However, the disclosure is not limited thereto, and as such, according to another embodiment, reference numerals <1560> and <1580> may include a scenario in which the first housing 210 is provided to be an upper part of the electronic device 501. For instance, the electronic device 501 is in an orientation that has the second housing 220 as the lower part and the first housing as the upper part of the electronic device 501.

In an embodiment, referring to reference numerals <1560> and <1580>, in a state where the first housing 210 is provided not to face the ground, a user interaction 1535 may be detected in a partial area, for example, the fourth area, of the second surface 212 of the first housing 210 of the electronic device 501. In an embodiment, the second display 533 may not be provided on the second surface 212 of the first housing 210, and thus, the user interaction 1535 may not be detected through the second display 533.

In an embodiment, when the posture of the electronic device 501 is in the state of reference numerals <1560> and <1580>, the probability that a user interaction will be detect through the second display 533 provided on the fourth surface 222 may be lower than the probability that the user interaction 1535 will be detected on the second surface 212. Based on this, when the posture of the electronic device 501 is identified as the state of reference numerals <1560> and <1580>, the processor 550 may estimate (or predict) that the user interaction 1535 will be detected on the second surface 212, and may correct sensor data of the user interaction 1535.

Figure 16:
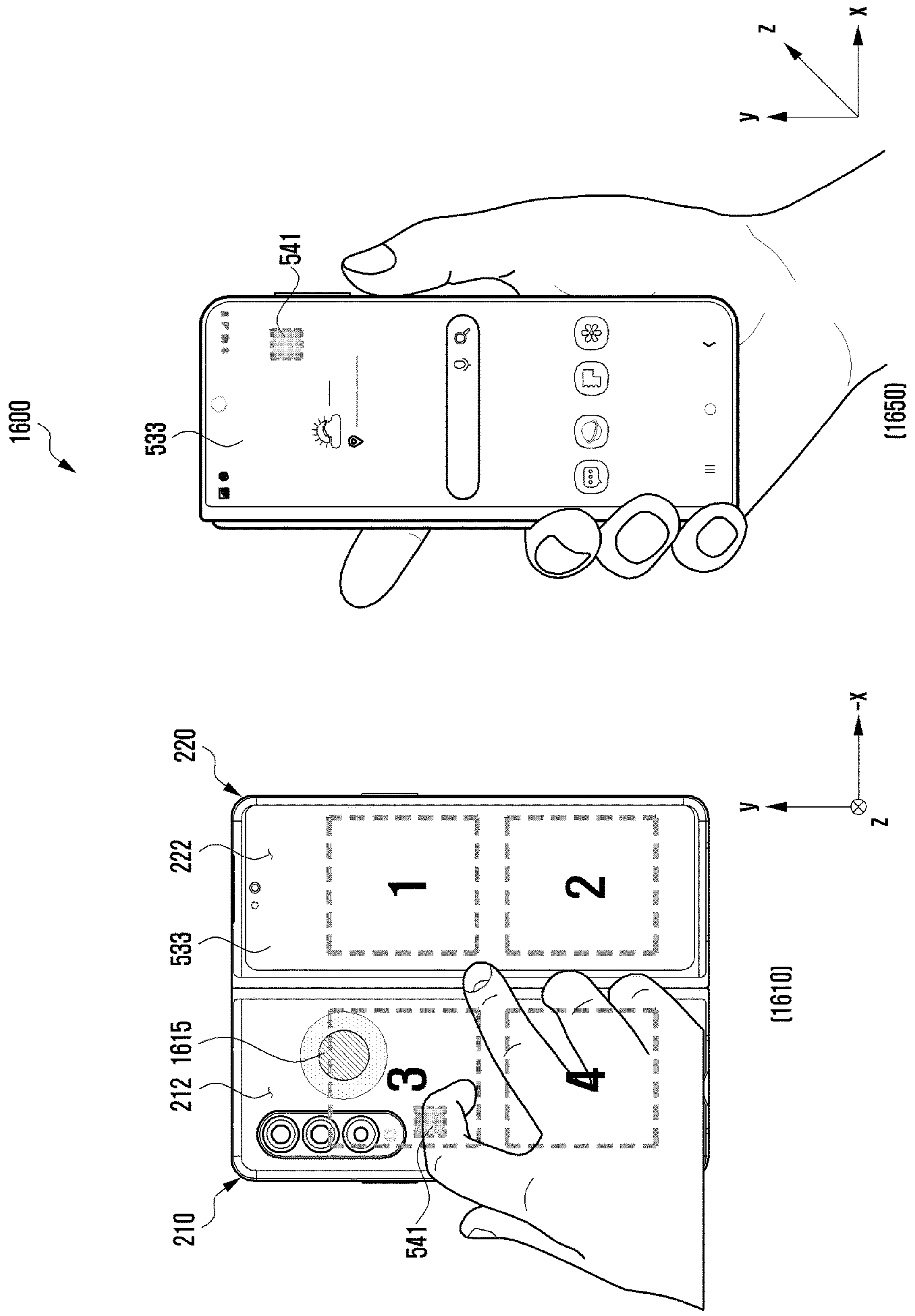
FIG. 16 illustrates a method for correcting sensor data of a user interaction according to an embodiment of the disclosure.

FIG. 16 includes a view 1600 for illustrating a method for correcting sensor data of a user interaction according to an embodiment of the disclosure.

Referring to FIG. 16, a processor (e.g., the processor 550 in FIG. 5) may identify the posture of an electronic device (e.g., the electronic device 501 in FIG. 5). For example, the processor 550 may identify the posture of the electronic device 501, for example, the degree of horizontality, based on sensor information acquired through an inertial sensor (e.g., the inertial sensor 541 in FIG. 5). For example, the processor 550 may identify, based on the sensor information acquired through the inertial sensor 541, whether a second surface (e.g., the second surface 212 in FIG. 2*b*) of a first housing (e.g., the first housing 210 in FIG. 2A) of the electronic device 501 and/or a fourth surface (e.g., the fourth surface 222 in the FIG. 2*b*) of a second housing (e.g., the second housing 220 in FIG. 2A) is provided to face the ground (e.g., floor or desk) and remains parallel to the ground.

In an embodiment, after identifying the posture of the electronic device 501 (e.g., the degree of horizontality of the electronic device 501), the processor 550 may identify a grip state of the electronic device 501 through a grip sensor (e.g., the grip sensor 543 in FIG. 5).

In an embodiment, as illustrated in reference numeral <1610>, the grip state of the electronic device 501 may be a state in which a first housing (e.g., the first housing 210 in FIG. 2A) has been gripped in an unfolded state (e.g., the state in FIGS. 2A and 2B) of the electronic device 501.

According to an embodiment in FIG. 16, reference numeral <1610> illustrates the rear surface of the electronic device 501 in a state in which the second surface 212 of the first housing 210 and the fourth surface 222 of the second housing 220 are provided not to face the ground (e.g., a state in which the electronic device 501 is not provided parallel to the ground) and in a state in which the first housing 210 has been gripped.

In an embodiment, referring to reference numeral <1610>, a user interaction 1615 may be detected in a partial area, for example, the third area, of the second surface 212 of the first housing 210 of the electronic device 501 in a state in which the second surface 212 of the first housing 210 and the fourth surface 222 of the second housing 220 are provided not to face the ground (e.g., a state in which the electronic device 501 is not provided parallel to the ground) and in a state in which the first housing 210 has been gripped. In an embodiment, the second display 533 may not be provided on the second surface 212 of the first housing 210, and thus, in the gripped state of the first housing 210, the user interaction 1615 may not be detected through the second display 533.

In an embodiment, when the electronic device 501 is in a state illustrated in reference numeral <1610>, the probability that a user interaction will be detected through the second display 533 provided on the fourth surface 222 may be lower than the probability that the user interaction 1615 will be detected in the second surface 212. Based on this, in the state of reference numeral <1610>, the processor 550 may estimate (or predict) that the user interaction 1615 will be detected on the second surface 212, and may correct sensor data of the user interaction 1615.

In another embodiment illustrated in FIG. 16, reference numeral <1650> may indicate a state in which the fourth surface 222 of the second housing 220 faces the front when the electronic device 501 is in a folded state (e.g., the state in FIGS. 3A and 3B) (e.g., a state in which the second surface 212 of the first housing 210 is provided not to face the ground) and in which the electronic device 501 has been gripped. In the state indicated by reference numeral <1650>, the processor 550 may detect a user interaction in a partial area of the second surface 212 of the first housing 210 of the electronic device 501.

In an embodiment, when the electronic device 501 is in the state of reference numeral <1650>, the electronic device 501 is gripped in a state where the fourth surface 222 of the second housing 220 is facing the front, and thus a user interaction may be highly likely to be detected in the second surface 212. Based on this, when the electronic device 501 is identified as being in the state of reference numeral <1650>, the processor 550 may estimate (or predict) that a user interaction will be detected on the second surface 212, and may correct sensor data of the user interaction.

In various embodiments, in a state in which the second surface 212 of the first housing 210 and/or the fourth surface 222 of the second housing 220 is provided to face the ground (e.g., in a state in which the electronic device 501 is provided parallel to the ground), the processor 550 may detect the gripped state of the first housing 210 and/or the second housing 220 through the grip sensor 543. When a user interaction is detected in this state, the processor 550 may process the user interaction as a valid input. For example, when the second surface 212 of the first housing 210 and/or the fourth surface 222 of the second housing 220 is provided to face the ground (e.g., the electronic device 501 is provided to parallel to the ground), but when the first housing 210 and/or the second housing 220 is gripped, the processor 550 may determine a detected user interaction as an intended input the user and may process the user interaction as a valid input. However, the disclosure is not limited thereto. The processor 550 may process a user interaction as invalid input when the processor 550 detects the user interaction in a state in which the second surface 212 of the first housing 210 and/or the fourth surface 222 of the second housing 220 is provided to face the ground (e.g., a state in which the electronic device 501 is provided parallel to the ground) and in a state in which the first housing 210 and/or the second housing 220 is gripped through the grip sensor 543.

In various embodiments, in a state in which the second surface 212 of the first housing 210 and/or the fourth surface 222 of the second housing 220 is provided to face the ground (e.g., in a state in which the electronic device 501 is provided parallel to the ground), the processor 550 may detect a state in which the first housing 210 and/or the second housing 220 has not been gripped through the grip sensor 543. When a user interaction is detected in this state, the processor 550 may process the user interaction as an invalid input. For example, a user interaction, detected in a state in which the second surface 212 of the first housing 210 and/or the fourth surface 222 of the second housing 220 is provided so as not to face the ground and in a state in which the first housing 210 and/or the second housing 220 is not gripped through the grip sensor 543, may not be a user's intended input that may be detected by manipulation of the electronic device 501 (e.g., a touch input on a display (e.g., the display 530 in FIG. 5)) or by external impact (e.g., impact due to placing the electronic device 501 on the ground or impact due to shock applied to the ground on which the electronic device 501 is placed). Based on this, the processor 550 may process a detected user interaction as an invalid input when the user interaction is detected in a state in which the second surface 212 of the first housing 210 and/or the fourth surface 222 of the second housing 220 is provided so as not to face the ground and in a state in which the first housing 210 and/or the second housing 220 is not gripped through the grip sensor 543.

Figure 17:
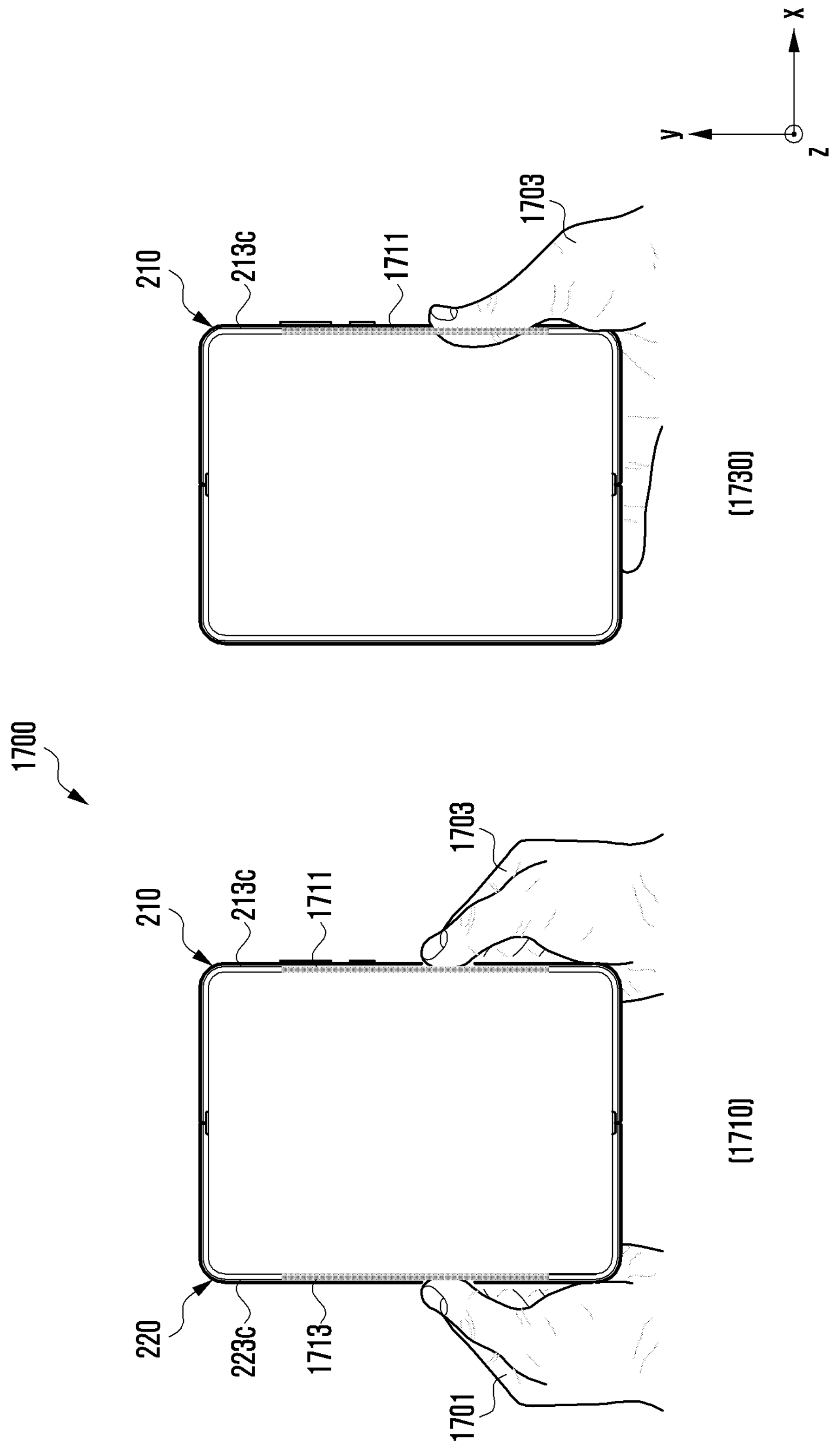
FIG. 17 illustrates a method for correcting sensor data of a user interaction according to an embodiment of the disclosure.

FIG. 17 includes a view 1700 for illustrating a method for correcting sensor data of a user interaction according to an embodiment of the disclosure.

Referring to FIG. 17, in an unfolded state (e.g., the state in FIGS. 2A and 2B) of an electronic device (e.g., the electronic device 501 in FIG. 5), the grip state of the electronic device 501 may be identified through a grip sensor (e.g., the grip sensor 543 in FIG. 5).

In an embodiment, based on sensor information acquired through the grip sensor 543 and based on whether the electronic device 501 is gripped with one hand or both hands, a processor (e.g., the processor 550 in FIG. 5) may learn the type of detected user interaction and/or a location where the user interaction is detected.

In an embodiment, when a user interaction is detected on the rear surface of the electronic device 501 while the electronic device 501 is gripped with one hand, a sensor value (e.g., an acceleration value and/or an angular velocity value) of movement of the electronic device 501 may be greater than a sensor value (e.g., an acceleration value and/or an angular velocity value) of movement of the electronic device 501 when a user interaction is detected on the rear surface of the electronic device 501 while the electronic device 501 is gripped with both hands.

In an embodiment, when the electronic device 501 is gripped with one hand, whether a user interaction is detected on the second surface 212 of the first housing 210 or an interaction is detected on the fourth surface 222 of the second housing 220 may be estimated depending on whether the electronic device 501 is gripped with the left hand or the electronic device 501 is gripped with the right hand.

In an embodiment, the grip sensor 543 may be provided on at least a partial area of a side surface of the electronic device 501. For example, as illustrated in reference numeral <1710>, the grip sensor 543 may include a first grip sensor 1711 provided in a partial area of the second side surface 213*c* of the first housing 210 and/or a second grip sensor 1713 provided in a partial area of the fifth side surface 223*c* of the second housing 220.

In an embodiment, as illustrated in reference numeral <1710>, the processor 550 may identify the electronic device 501 as being gripped with both hands 1701 and 1703 through the first grip sensor 1711 provided in a partial area of the second side surface 213*c* of the first housing 210 and/or the second grip sensor 1713 provided in a partial area of the fifth side surface 223*c* of the second housing 220. For example, when the electronic device 501 is identified as being gripped with both hands 1701 and 1703 through the first grip sensor 1711 and the second grip sensor 1713, the processor 550 may estimate (or predict) that the user interaction (e.g., the user interaction 1615 in FIG. 6) will be detected on the second surface 212 of the first housing 210 and/or the fourth surface 222 of the second housing 220, and may correct sensor data of the detected user interaction.

In another embodiment, as illustrated in reference numeral <1730>, the processor 550 may identify the electronic device 501 as being gripped with one hand 1703 through the first grip sensor 1711 provided in a partial area of the second side surface 213*c* of the first housing 210. For example, when the electronic device 501 is determined as being gripped with one hand 1703 through the first grip sensor 1711, the processor 550 may estimate (or predict) that the user interaction 1615 will be detected on the second surface 212 of the first housing 210, and may correct sensor data of the detected user interaction.

Figure 18:
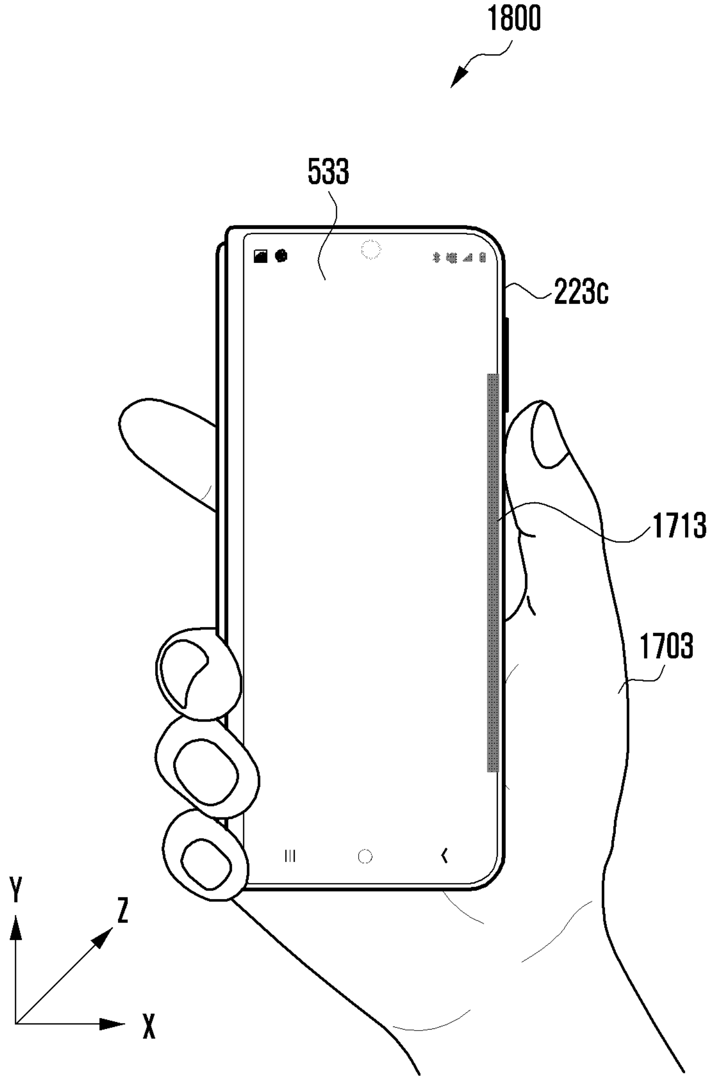
FIG. 18 illustrates a method for correcting sensor data of a user interaction according to an embodiment of the disclosure.

FIG. 18 includes a view 1800 for illustrating a method for correcting sensor data of a user interaction according to an embodiment of the disclosure.

Referring to FIG. 18, in a folded state (e.g., the state in FIGS. 3A and 3B) of an electronic device (e.g., the electronic device 501 in FIG. 5), the grip state of the electronic device 501 may be identified through a grip sensor (e.g., the grip sensor 543 in FIG. 5).

In an embodiment, based on sensor information acquired through the grip sensor 543 and based on whether the electronic device 501 is gripped with one hand or both hands, a processor (e.g., the processor 550 in FIG. 5) may estimate the type of detected user interaction and/or a location where the user interaction is detected.

For example, when the electronic device 501 is in a folded state, the processor 550 may identify the electronic device 501 as being gripped with one hand 1703 through a second grip sensor 1713 provided in a partial area of the fifth side surface 223*c* of the second housing 220. For example, when the electronic device 501 is in a folded state and when the electronic device 501 is identified as being gripped with one hand 1703 through the second grip sensor 1713, the processor 550 may estimate (or predict) that a user interaction will be detected on the second surface 212 of the first housing 210 and may correct sensor data of the detected user interaction.

Figure 19:
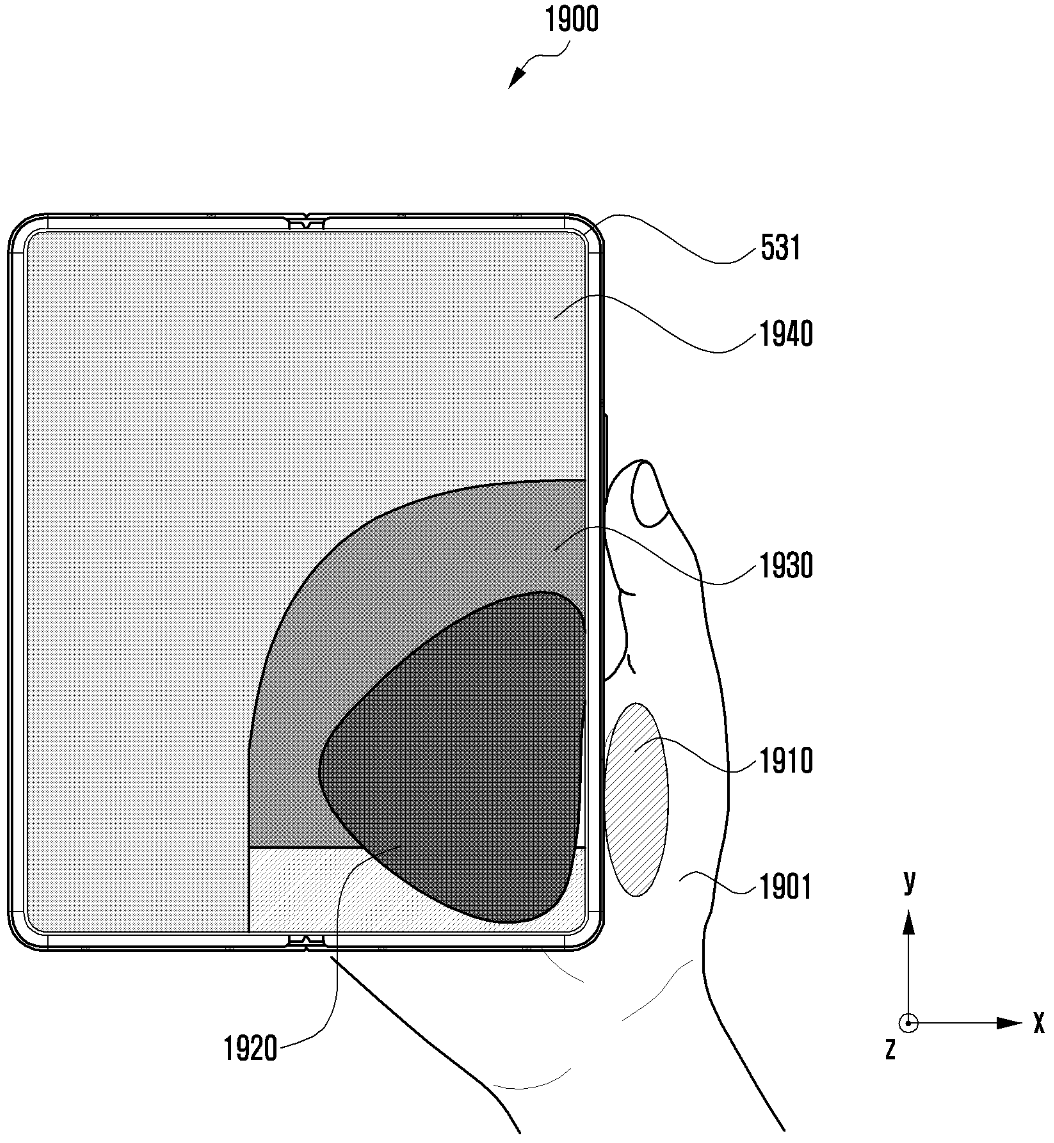
FIG. 19 illustrates a method for correcting sensor data of a user interaction according to a grip of an electronic device according to an embodiment of the disclosure.

FIG. 19 includes a view 1900 for illustrating a method for correcting sensor data of a user interaction according to a grip of the electronic device 501 according to an embodiment of the disclosure.

Referring to FIG. 19, a processor (e.g., the processor 550 in FIG. 5) may identify the grip state of an electronic device (e.g., the electronic device 501 in FIG. 5). For example, the processor 550 may identify, through a grip sensor (e.g., the grip sensor 543 in FIG. 5), whether the electronic device 501 is gripped with one hand (e.g., the left hand or the right hand) or both hands.

In an embodiment, the processor 550 may detect a user interaction based on a thumb base part 1910 and/or touch information. For example, when it is identified, through the grip sensor 543 and/or a touch sensor of a first display (e.g., the first display 531 in FIG. 5), that the thumb base part 1910 of a right hand 1901 is in contact with a partial area of the first display 531, the processor 550 may identify that the electronic device 501 is manipulated using the right hand 1901 in a state in which the electronic device 501 has been gripped with the right hand 1901.

In an embodiment, when the electronic device 501 is manipulated with one hand, the amount of change in an acceleration value and/or angular velocity value of the electronic device 501 may be greater than when the electronic device 501 is manipulated with both hands. Based on this, in case that a user interaction is detected from the rear surface of the electronic device 501 when the electronic device 501 is manipulated with one hand in an unfolded state, movement of the electronic device 501 may also be greater than movement when the electronic device 501 is manipulated with both hands. Considering the above description, when it is identified that the electronic device 501 is manipulated with one hand, the processor 550 may correct sensor data acquired through a sensor circuit (e.g., the sensor circuit 540 in FIG. 5) in order to accurately recognize a user interaction on the rear surface of the electronic device 501 (e.g., the second surface 212 of the first housing 210 or the fourth surface 222 of the second housing 220).

In an embodiment, in a state where the electronic device 501 is gripped with the right hand 1901, it may be easy to detect a user interaction in a first area 1920 and a second area 1930 on the rear surface of the electronic device 501 by the right hand 1901, but it may be difficult to detect a user interaction in a third area 1940. Based on this, when it is identified that the electronic device 501 is gripped with the right hand 1901 in an unfolded state, the processor 550 may estimate (or predict) that a user interaction will be detected on the second surface 212 of the first housing 210, and may correct sensor data of the detected user interaction.

Figure 20:
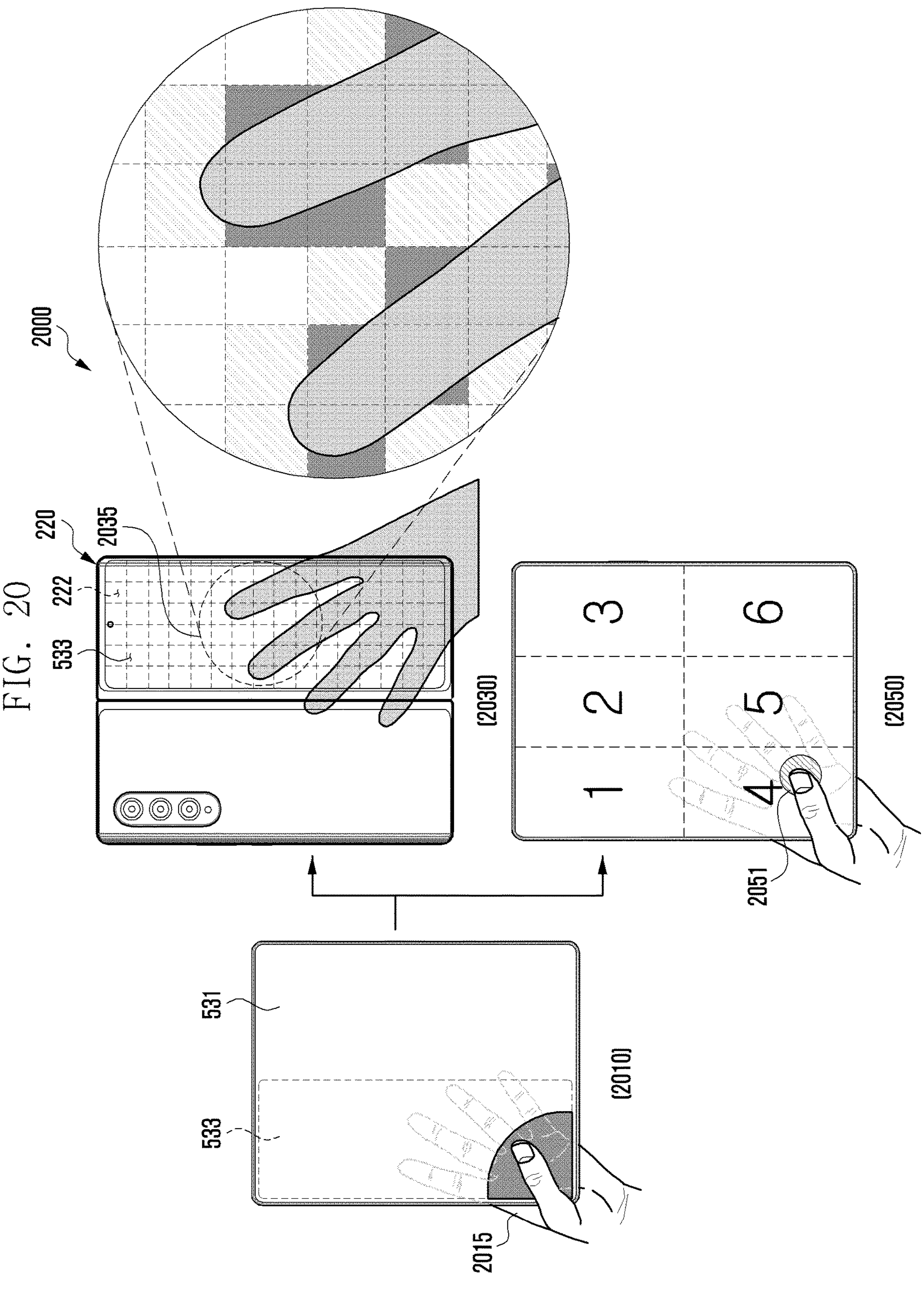
FIG. 20 illustrates a method for correcting sensor data of a user interaction according to an embodiment of the disclosure.

FIG. 20 includes a view 2000 for illustrating a method for correcting sensor data of a user interaction according to an embodiment of the disclosure.

Referring to reference numeral <2010> in FIG. 20, an electronic device (e.g., the electronic device 501 in FIG. 5) may be gripped by one hand 2015 (e.g., the left hand) of a user in an unfolded state. For example, when the electronic device 501 is in an unfolded state (e.g., the state in FIGS. 2A and 2B), the electronic device 501 may include a first display (e.g., the first display 531 in FIG. 5) provided in a space formed by a pair of housings (e.g., the first housing 210 and the second housing 220 in FIG. 2A), and a second display (e.g., the second display 533 in FIG. 5) provided on a fourth surface (e.g., the fourth surface 222 in FIG. 2B) of the second housing 220.

In an embodiment, based on detection of a touch input on the first display 531 and/or the second display 533 when the electronic device 501 is in an unfolded state, the processor 550 may estimate (or predict) an area in which a user interaction is to be detected.

For example, as illustrated in reference numeral <2050>, the processor 550 may detect a touch input 2051 by the thumb in a fourth area among multiple areas (e.g., first to sixth areas) of the first display 531, and as illustrated in reference numeral <2030>, the processor 550 may detect a touch input by the index finger and/or the middle finger in a specific area 2035 of the second display 533.

In an embodiment, as illustrated in views depicted by reference numerals <2050> and <2030>, when the touch input 2051 by the thumb is detected in the fourth area among the multiple areas (e.g., the first to sixth areas) of the first display 531, and when the touch input by the index finger and/or the middle finger is detected in the specific area 2035 of the second display 533, the processor 550 may estimate (or predict) that a user interaction will be detected on the fourth surface 222 of the second housing 220 where the second display 533 is provided, and may correct sensor data of the user interaction.

Figure 21A:
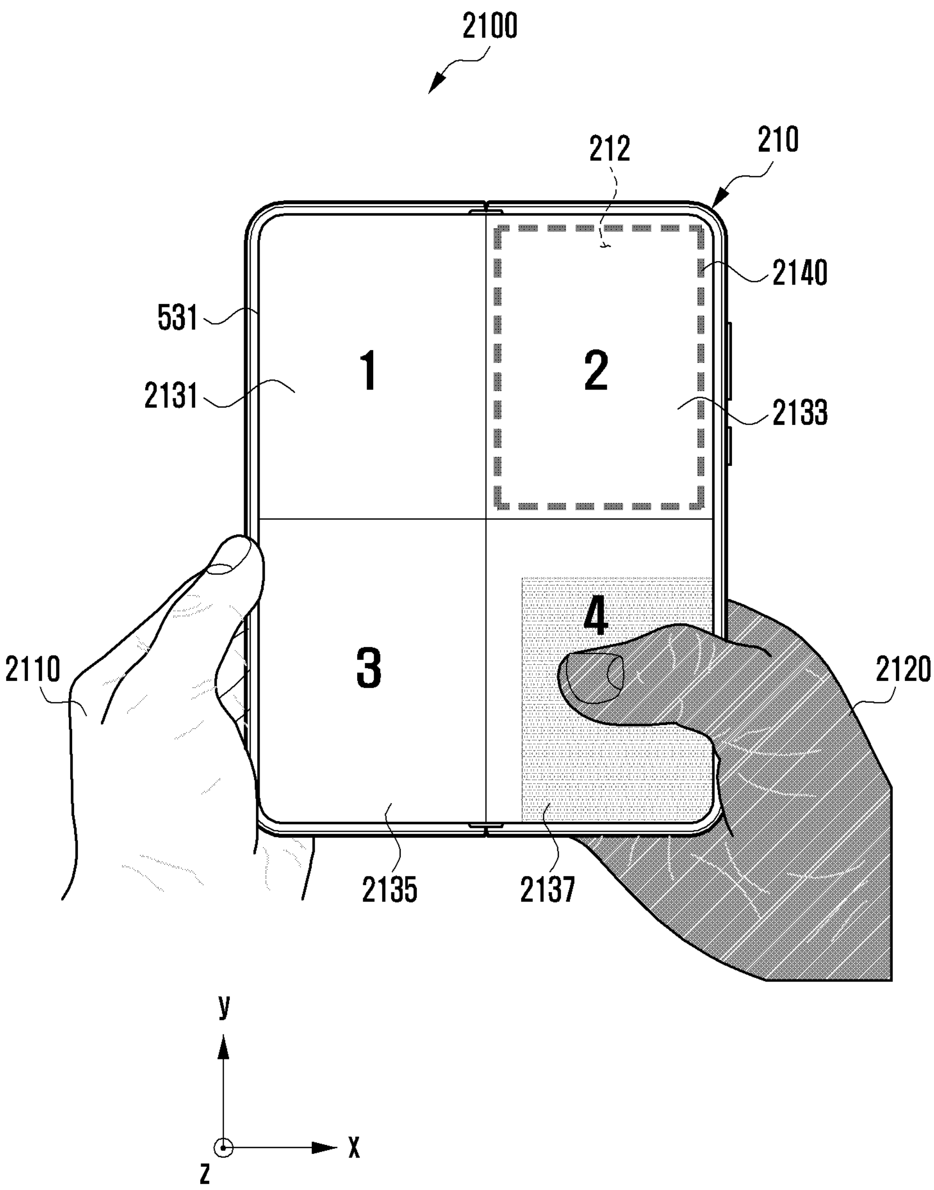
FIGS. 21A and 21B illustrate a method for correcting sensor data of a user interaction according to a grip of an electronic device according to an embodiment of the disclosure.
Figure 21B:
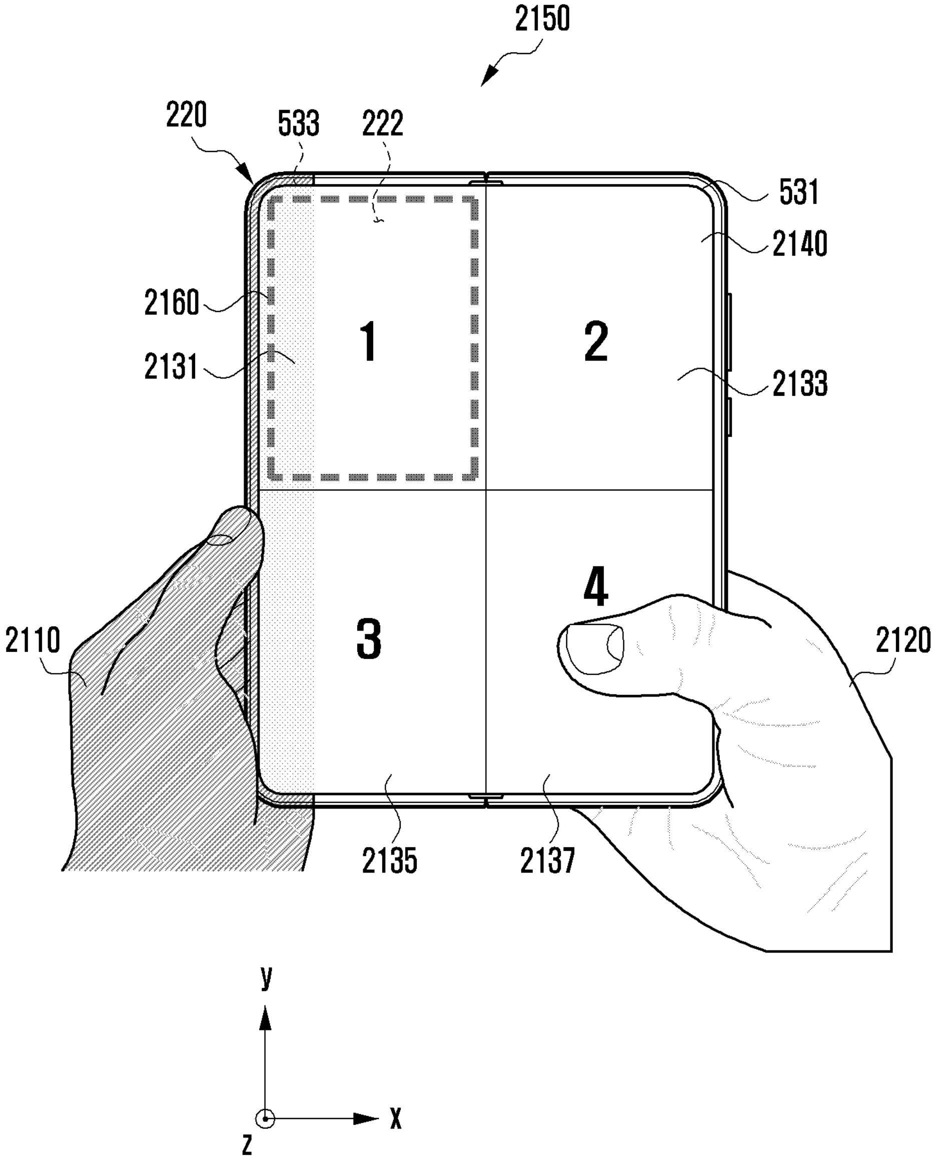

FIGS. 21A and 21B include views 2100 and 2150, respectively, for illustrating a method for correcting sensor data of a user interaction according to a grip of the electronic device 501 according to an embodiment of the disclosure.

Referring FIG. 21A, an electronic device (e.g., the electronic device 501 in FIG. 5) is gripped by both hands 2110 and 2120 of a user in an unfolded state. For example, the left hand 2110 may be gripping a side surface of the electronic device 501 (e.g., the fifth side surface 223*c* of the second housing 220 in FIG. 2A). In addition, the right hand 2120 may be gripping a side surface of the electronic device 501 (e.g., the second side surface 213*c* of the first housing 210 in FIG. 2A), and a touch input by the thumb of the right hand 2120 may be detected in a fourth area 2137 among multiple areas (e.g., a first area 2131, a second area 2133, a third area 2135, and the fourth area 2137) of a first display (e.g., the first display 531 in FIG. 5).

In an embodiment, when the touch input is detected in the fourth area 2137 by the thumb of the right hand 2120, there is a high possibility that a user interaction is detected by another finger of the right hand 2120 on the rear side of the electronic device 501. Considering this, when the touch input by the thumb of the right hand 2120 is detected in the fourth area 2137, the processor 550 may estimate (or predict) that the user interaction is detected in an area 2140 of a second surface (e.g., the second surface 212 in FIG. 2B) of the first housing 210, corresponding to the second area 2133, and may correct sensor data of the user interaction.

However, the disclosure is not limited thereto, and as such, referring to FIG. 21B, the electronic device 501 may include a second display (e.g., the second display 533 in FIG. 5) provided on a fourth surface (e.g., the fourth surface 222 in FIG. 2B) of the second housing 220.

In an embodiment, based on detection of a touch input on the first display 531 and/or the second display 533 provided on the front surface in an unfolded state of the electronic device 501, the processor 550 may estimate (or predict) an area in which a user interaction is to be detected. For example, when a touch input by the thumb of the right hand 2120 is detected in the fourth area 2137, and when a user interaction is detected by the left hand 2110 on the rear surface of the electronic device 501, for example, on the second display 533, the processor 550 may estimate (or predict) that the user interaction is detected in an area 2160 of the fourth surface 222 of the second housing 220 where the second display 533 is provided, and may correct sensor data of the user interaction.

Figure 22:
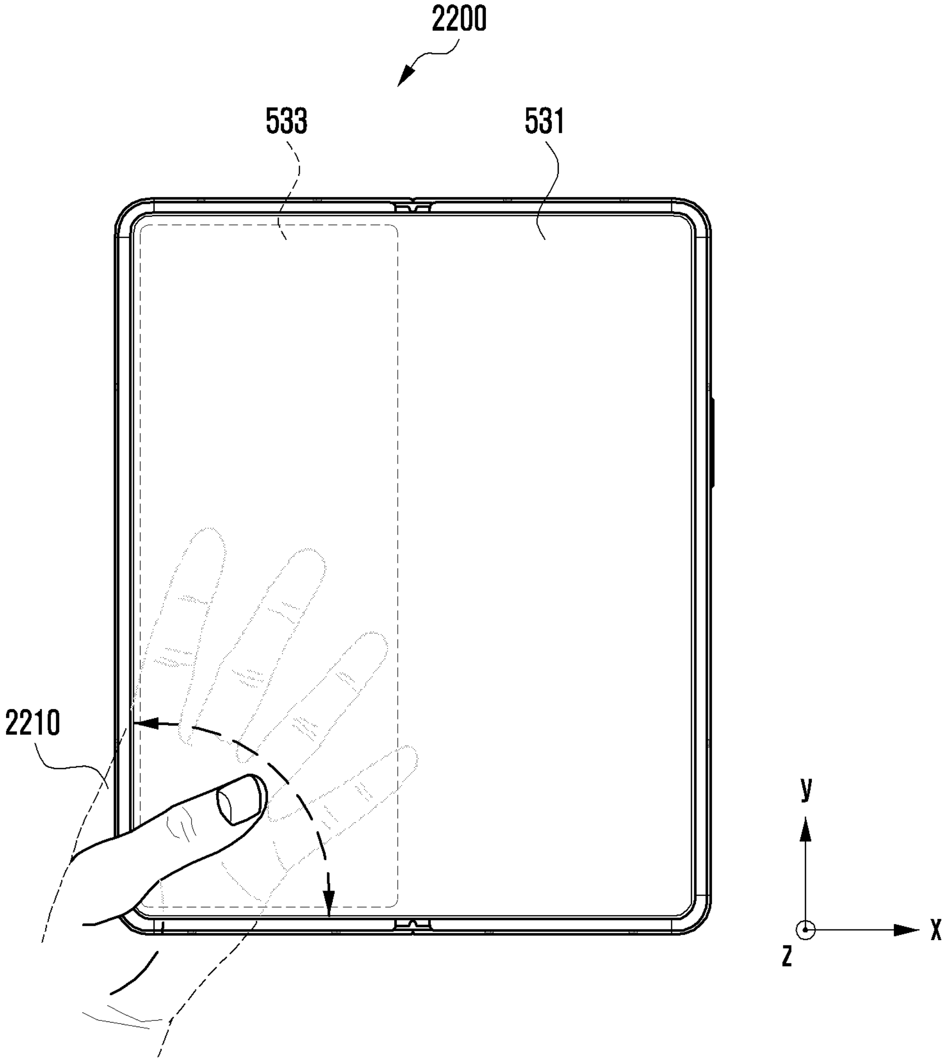
FIG. 22 illustrates a method for correcting sensor data of a user interaction according to a grip of an electronic device according to an embodiment of the disclosure.

FIG. 22 includes a view 2200 for illustrating a method for correcting sensor data of a user interaction according to a grip of the electronic device 501 according to an embodiment of the disclosure.

Referring to FIG. 22, an electronic device (e.g., the electronic device 501 in FIG. 5) may be gripped by one hand 2210 (e.g., the left hand) of a user in an unfolded state. For example, a processor (e.g., the processor 550 in FIG. 5) may identify whether the electronic device 501 is gripped by both hands or by one hand, through a grip sensor provided on the side surface of the electronic device 501 (e.g., the first grip sensor 1711 provided in a partial area of the second side surface 213*c* of the first housing 210 and the second grip sensor 1713 provided in a partial area of the fifth side surface 223*c* of the second housing 220 in FIG. 17)

In an embodiment, when the electronic device 501 is identified as being gripped with one hand 2210 through the grip sensor provided on the side surface of the electronic device 501 (e.g., the second grip sensor 1713 provided on a partial area of the fifth side surface 223*c* of the second housing 220), an area of the rear surface (e.g., a second surface (the second surface 212 in FIG. 2B) and/or a fourth surface (the fourth surface 222 in FIG. 2B) of the electronic device 501 where a user interaction is detected may be estimated (or predicted) by identifying a pattern in which the electronic device 501 is gripped by one hand 2210.

For example, in a state where the electronic device 501 is gripped with one hand 2210, when a touch input by a finger is detected through a second display (e.g., the second display 533 in FIG. 5) provided on the fourth surface 222 of the electronic device 501, the processor 550 may estimate (or predict) that a user interaction will be detected on the fourth surface 222 of the second housing 220 where the second display 533 is provided, and may correct sensor data of the user interaction.

As illustrated according to various embodiments in FIGS. 7A to 22, the type of user interaction and/or location information where the user interaction is detected may be accurately determined by correcting sensor data of the user interaction according to the state of the electronic device 501 (e.g., the posture of the electronic device 501, the movement of the electronic device 501, and/or the grip state of the electronic device 501).

Figure 23:
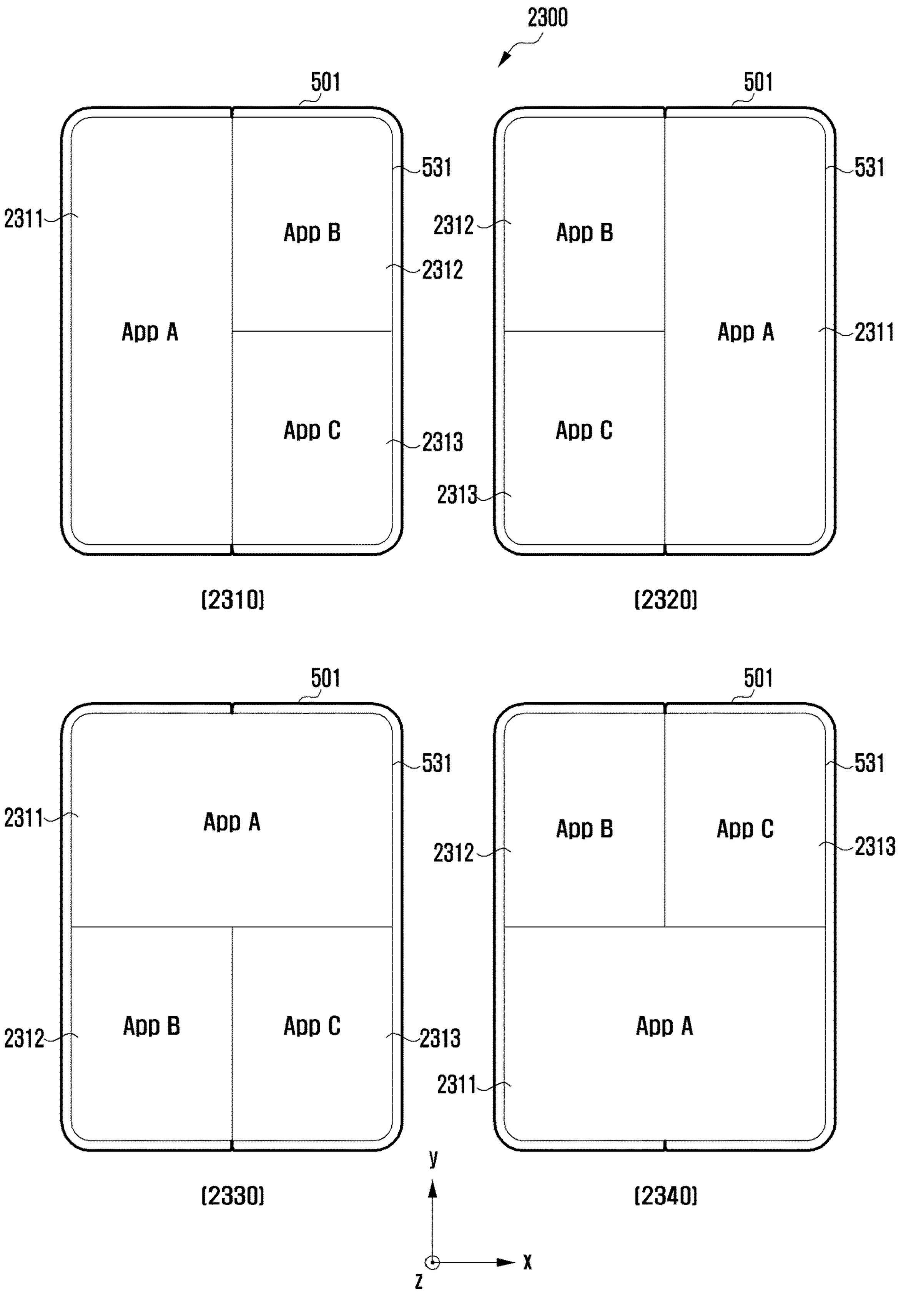
FIG. 23 illustrates a method for displaying information about each of multiple applications in an unfolded state of an electronic device according to an embodiment of the disclosure.

FIG. 23 includes a view 2300 for illustrating a method for displaying information about each of multiple applications in an unfolded state of the electronic device 501 according to an embodiment of the disclosure.

Referring to FIG. 23, a processor (e.g., the processor 550 in FIG. 5) of an electronic device (e.g., the electronic device 501 in FIG. 5) may display information corresponding to each of multiple applications on a first display (e.g., the first display 531 in FIG. 5) when the electronic device 501 is in an unfolded state (e.g., the state in FIGS. 2A and 2B).

In FIG. 23 according to various embodiments, a description will be made assuming that multiple applications, for example, three applications are executed and three pieces of information corresponding to the three applications are displayed in three areas into which the first display 531 is divided. The disclosure is not limited thereto, and as such, when more than three applications are executed, the processor 550 may divide the first display 531 into more than three areas, and may display information about each application in a corresponding area among the areas.

For example, as illustrated in reference numeral <2310>, the processor 550 may display first information 2311 corresponding to application A in a first area (e.g., a left area) among three areas of the first display 531, may display second information 2312 corresponding to application B in a second area (e.g., an upper right area), and may display third information 2313 corresponding to application C in a third area (e.g., a lower right area).

In another example, as illustrated in reference numeral <2320>, the processor 550 may display the second information 2312 corresponding to application B in a first area (e.g., an upper left area) among three areas of the first display 531, may display the third information 2313 corresponding to application C in a second area (e.g., a lower left area) and may display the first information 2311 corresponding to application A in a third area (e.g., a right area).

In another example, as illustrated in reference numeral <2330>, the processor 550 may display the first information 2311 corresponding to application A in a first area (e.g., an upper area) among three areas of the first display 531, may display the second information 2312 corresponding to application B in a second area (e.g., a lower left area), and may display the third information 2313 corresponding to application C in a third area (e.g., a lower right area).

In another example, as illustrated in reference numeral <2340>, the processor 550 may display the second information 2312 corresponding to application B in a first area (e.g., an upper left area) among three areas of the first display 531, may display the third information 2313 corresponding to application C in a second area (e.g., an upper right area), and may display the first information 2311 corresponding to application A in a third area (e.g., a lower area).

Reference numerals <2310>, <2320>, <2330>, and <2340> in FIG. 23 illustrate examples of applications displayed on the electronic device, but the disclosure is not limited thereto. As such, the number applications and the display information corresponding to the applications may vary. Moreover, information about an application provided in each area may vary. Also, the arrangement of the display area may vary.

In various embodiments, the processor 550 may store information (e.g., arrangement information) about an area of the first display 531 in which information corresponding to an executed application is displayed based on the execution of the application.

Figure 24:
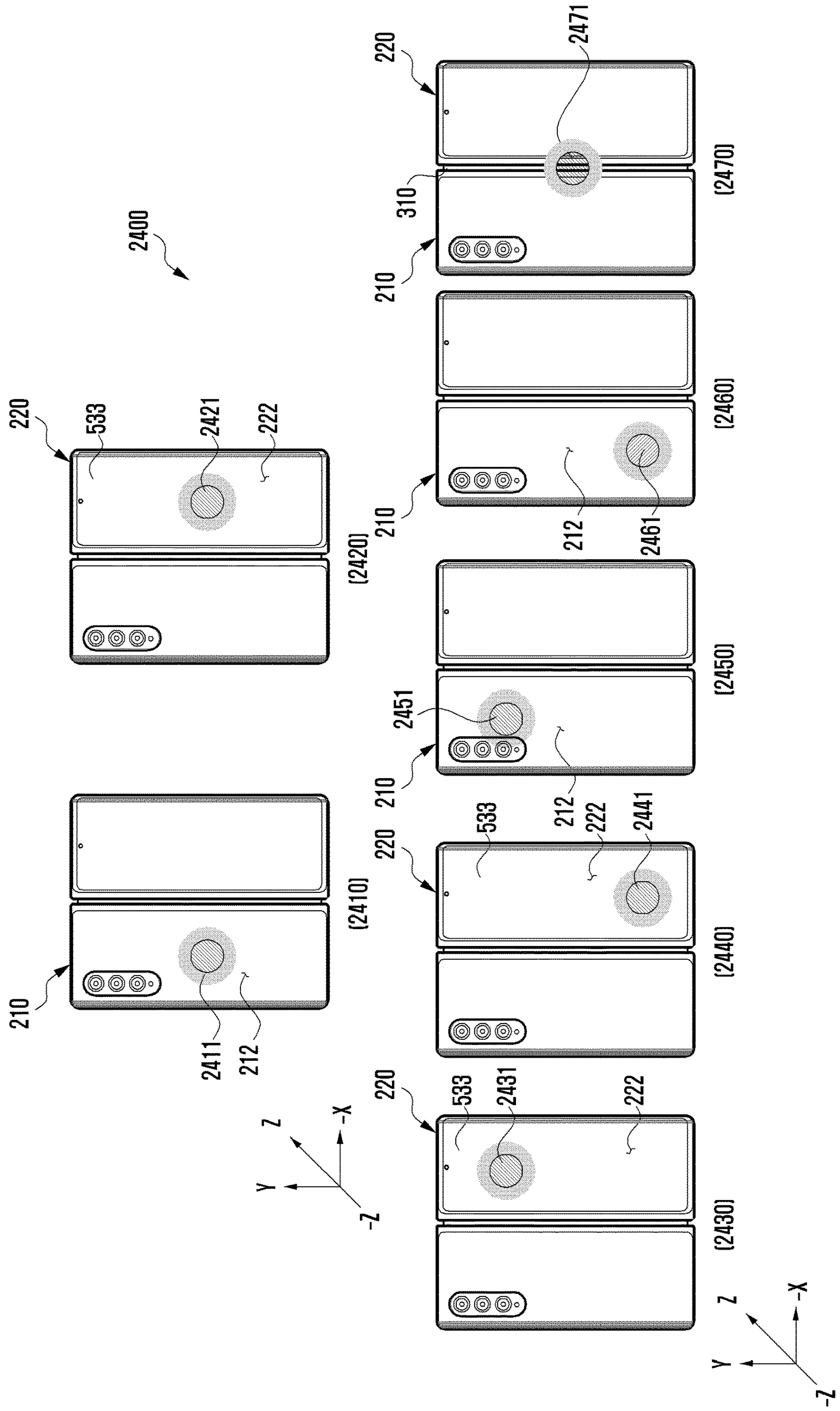
FIG. 24 illustrates a user interaction detected in an unfolded state of an electronic device according to an embodiment of the disclosure.

FIG. 24 includes a view 2400 for illustrating a user interaction detected in an unfolded state of the electronic device 501 according to an embodiment of the disclosure.

Referring to FIG. 24, an electronic device (e.g., the electronic device 501 in FIG. 5) may include a first housing (e.g., the first housing 210 in FIG. 2A) and a second housing (e.g., the second housing 220 in FIG. 2A).

In an embodiment, based on sensor information acquired through a sensor circuit (e.g., the sensor circuit 540 in FIG. 5) and/or a touch sensor (e.g., a touch sensor of a second display (the second display 533 in FIG. 5)), a processor (e.g., the processor 550 in FIG. 5) may identify a location where a user interaction is detected on a second surface (e.g., the second surface 212 in FIG. 2B) of the first housing 210 and/or a fourth surface (e.g., the fourth surface 222 in FIG. 2B) of the second housing 220.

In an embodiment, a user interaction may include a double tap or a triple tap. However, the disclosure is not limited thereto, and as such, according to another embodiment, other types of input may be included as the user interaction.

In an embodiment, the processor 550 may configure the second surface 212 of the first housing 210 as a first area, and may configure the fourth surface 222 of the second housing 220 as a second area. The processor 550 may detect a user interaction in the configured first area (e.g., the second surface 212) or the configured second area (e.g., the fourth surface 222).

For example, as illustrated in reference numeral <2410>, the processor 550 may detect a user interaction 2411 in the first area (e.g., the second surface 212 of the first housing 210). In another example, as illustrated in reference numeral <2420>, the processor 550 may detect a user interaction 2421 in the second area (e.g., the fourth surface 222 of the second housing 220).

In an embodiment, the processor 550 may perform, based on the detection of the user interaction in the first area or the second area, a function mapped to the detected user interaction.

In reference numerals <2410> and <2420> according to various embodiments, it has been described that areas where user interactions are detected are configured as two areas, but the disclosure is not limited thereto. For example, areas in which user interactions are detected may be configured as five areas. For example, the processor 550 may configure a partial area (e.g., an upper area) of the second surface 212 of the first housing 210 as a first area, and may configure another partial area (e.g., a lower area) of the second surface 212 as a second area. The processor 550 may configure a partial area (e.g., upper area) of the fourth surface 222 of the second housing 220 as a third area, and may configure another partial area (e.g., a lower area) of the fourth surface 222 as a fourth area. The processor 550 may configure a partial area of the second surface 212 and a partial area of the fourth surface 222 (e.g., the hinge area 310) as a fifth area. The processor 550 may detect a user interaction in the first area, the second area, the third area, the fourth area, or the fifth area which has been configured.

For example, as illustrated in reference numeral <2430>, the processor 550 may detect a user interaction 2431 in a first area (e.g., the upper area of the fourth surface 222). In another example, as illustrated in reference numeral <2440>, the processor 550 may detect a user interaction 2441 in a second area (e.g., a lower area of the fourth surface 222). In another example, as illustrated in reference numeral <2450>, the processor 550 may detect a user interaction 2451 in a third area (e.g., an upper area of the second surface 212). In another example, as illustrated in reference numeral <2460>, the processor 550 may detect a user interaction 2461 in a fourth area (e.g., a lower area of the second surface 212). In another example, as illustrated in reference numeral <2470>, the processor 550 may detect a user interaction 2471 in a fifth area (e.g., a partial area of the second surface 212 and a partial area of the fourth surface 222 (e.g., the hinge area 310)).

According to various embodiments, areas for detecting user interaction (e.g., the first area, the second area, the third area, the fourth area, and/or the fifth area) may be configured based on the number of pieces of information (or the number of windows) displayed on a first display (e.g., the first display 531 in FIG. 5) or the second display 533.

Figure 25:
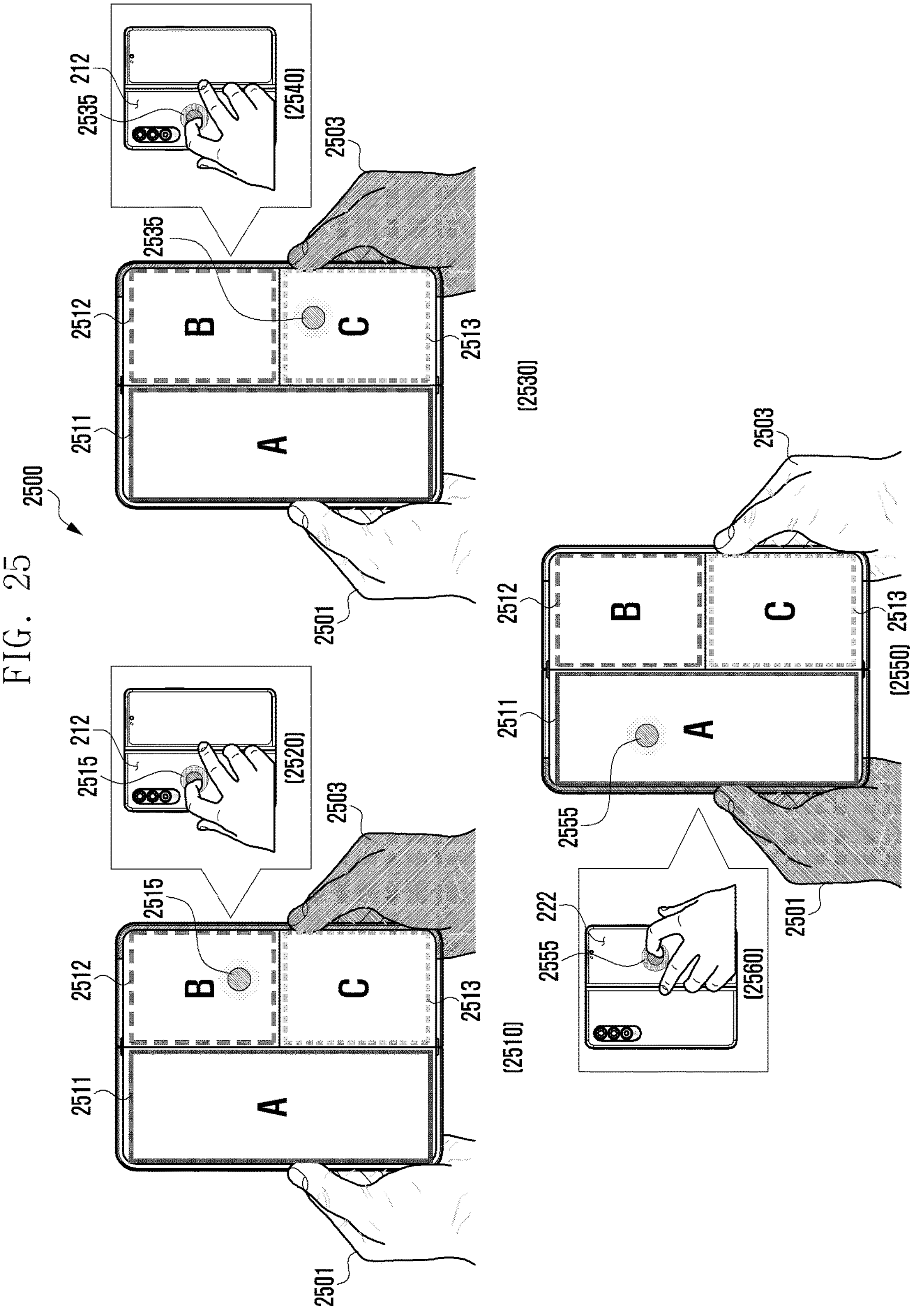
FIG. 25 illustrates a method for controlling a screen according to a user interaction according to an embodiment of the disclosure.

FIG. 25 includes a view 2500 for illustrating a method for controlling a screen according to a user interaction according to an embodiment of the disclosure.

Referring to FIG. 25, a processor (e.g., the processor 550 in FIG. 5) of an electronic device (e.g., the electronic device 501 in FIG. 5) may display information corresponding to each of multiple applications on a first display (e.g., the first display 531 in FIG. 5) when the electronic device 501 is in an unfolded state (e.g., the state in FIGS. 2A and 2B). For example, as illustrated in reference numeral <2510>, the processor 550 may display first information 2511 corresponding to application A in a first area (e.g., a left area) among three areas of the first display 531, may display second information 2512 corresponding to application B in a second area (e.g., an upper right area), and may display third information 2513 corresponding to application C in a third area (e.g., a lower right area).

In an embodiment, the processor 550 may acquire sensor information through a sensor circuit (e.g., the sensor circuit 540 in FIG. 5). For example, the sensor circuit 540 may include an inertial sensor (e.g., the inertial sensor 541 in FIG. 5) and/or a grip sensor (e.g., the grip sensor 543 in FIG. 5). The disclosure is not limited thereto, and as such, other types of sensors or detectors to determine user interaction or user input may be provided. The sensor information may further include sensor information acquired through a touch sensor (e.g., a touch sensor of a second display (e.g., the second display 533 in FIG. 5)).

In an embodiment, the processor 550 may detect a user interaction on the second surface 212 or the fourth surface 222 of the electronic device 501, based on the sensor information acquired through the sensor circuit 540 and/or the touch sensor of the second display 533. The processor 550 may identify the type of detected user interaction and/or location information where the user interaction has been detected.

In an embodiment, as illustrated in views depicted by reference numerals <2510> and <2520>, the processor 550 may detect a user interaction 2515 in a partial area of the second surface 212 of the electronic device 501. For example, a partial area of the second surface 212 illustrated in views depicted by reference numerals <2510> and <2520> may be an area corresponding to a second area of the first display 531 (e.g., an area in which the second information 2512 corresponding to application B is displayed).

In an embodiment, as illustrated in views depicted by reference numerals <2530> and <2540>, the processor 550 may detect a user interaction 2535 in a partial area of the second surface 212 of the electronic device 501. For example, a partial area of the second surface 212 illustrated in views depicted by reference numerals <2530> and <2540> may be an area corresponding to a third area of the first display 531 (e.g., an area in which the third information 2513 corresponding to application C is displayed).

In an embodiment, as illustrated in views depicted by reference numerals <2550> and <2560>, the processor 550 may detect a user interaction 2555 in a partial area of the fourth surface 222 of the electronic device 501. For example, a partial area of the fourth surface 222 illustrated in views depicted by reference numerals <2550> and <2560> may be an area corresponding to a first area of the first display 531 (e.g., an area displaying the first information 2511 corresponding to application A is displayed).

In an embodiment, the processor 550 may change a display attribute of at least one among the first information 2511 corresponding to the first application, the second information 2512 corresponding to the second application, and the third information 2513 corresponding to the third application, based on the types of user interactions 2515, 2535, and 2555 and locations information at which the user interactions 2515, 2535, and 2555 are detected.

Various embodiments will be described with reference to FIGS. 27 and 34B, which will be described later, in relation to the above-described embodiment in which a display attribute of at least one among the first information 2511 corresponding to the first application, the second information 2512 corresponding to the second application, and the third information 2513 corresponding to the third application is changed and displayed based on the types of user interactions 2515, 2535, and 2555 and locations information at which the user interactions 2515, 2535, and 2555 are detected.

Figure 26:
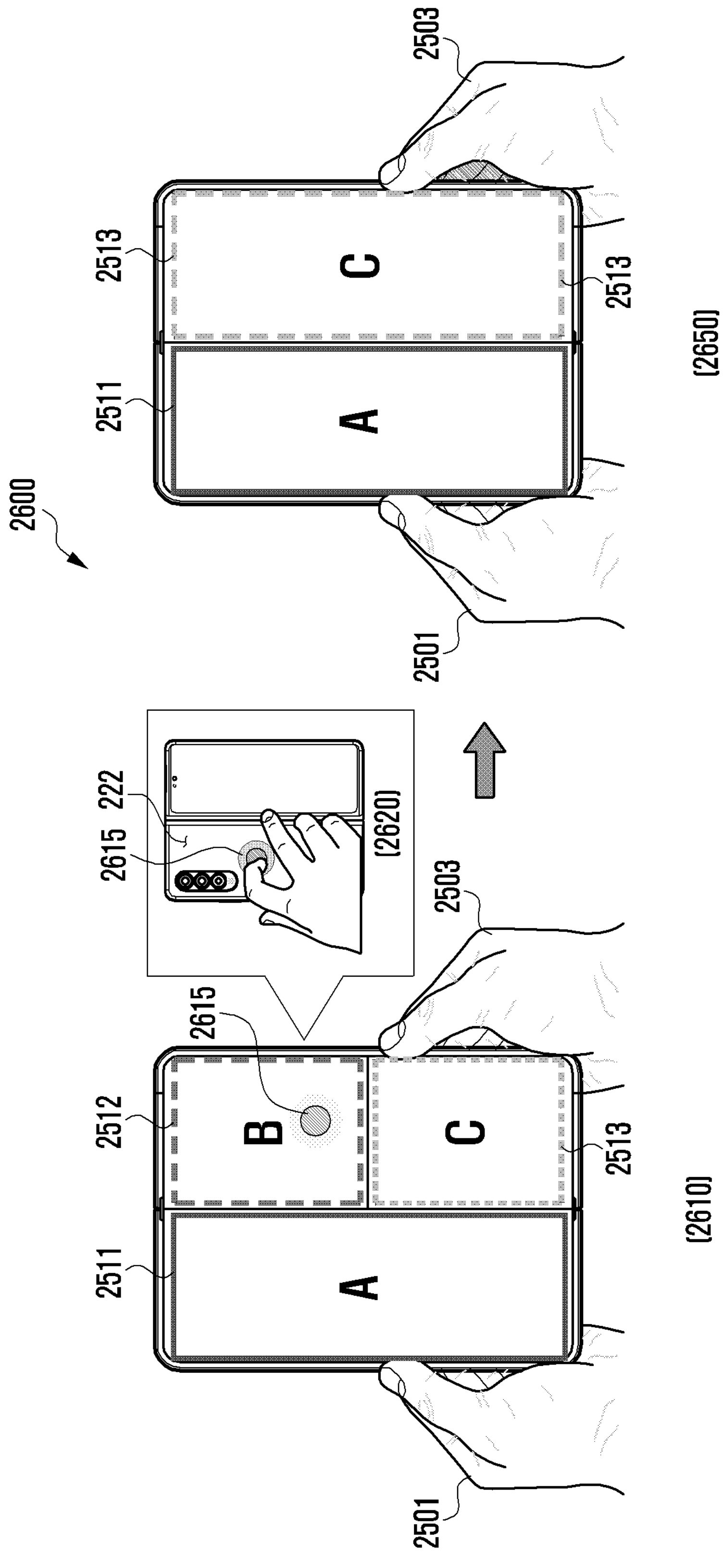
FIG. 26 illustrates a method for controlling a screen according to a user interaction according to an embodiment of the disclosure.

FIG. 26 includes a view 2600 for illustrating a method for controlling a screen according to a user interaction according to an embodiment of the disclosure.

Referring to FIG. 26, a processor (e.g., the processor 550 in FIG. 5) of an electronic device (e.g., the electronic device 501 in FIG. 5) may display information corresponding to each of multiple applications on a first display (e.g., the first display 531 in FIG. 5) when the electronic device 501 is in an unfolded state (e.g., the state in FIGS. 2A and 2B). For example, as illustrated in reference numeral <2610>, the processor 550 may display first information 2511 corresponding to application A in a first area (e.g., a left area) among three areas of the first display 531, may display second information 2512 corresponding to application B in a second area (e.g., an upper right area), and may display third information 2513 corresponding to application C in a third area (e.g., a lower right area).

In an embodiment, the processor 550 may acquire sensor information through a sensor circuit (e.g., the sensor circuit 540 in FIG. 5). For example, the sensor circuit 540 may include an inertial sensor (e.g., the inertial sensor 541 in FIG. 5) and/or a grip sensor (e.g., the grip sensor 543 in FIG. 5). The disclosure is not limited thereto. The sensor information may further include sensor information acquired through a touch sensor (e.g., a touch sensor of a second display (e.g., the second display 533 in FIG. 5)).

In an embodiment, the processor 550 may detect a user interaction on the second surface 212 or the fourth surface 222 of the electronic device 501, based on the sensor information acquired through the sensor circuit 540 and/or the touch sensor of the second display 533. The processor 550 may identify the type of detected user interaction and/or location information where the user interaction has been detected.

In an embodiment, as illustrated in views depicted by reference numerals <2610> and <2620>, the processor 550 may detect a user interaction 2615 in a partial area of the second surface 212 of the electronic device 501. For example, a partial area of the second surface 212 illustrated in views depicted by reference numerals <2610> and <2620> may be an area corresponding to a second area of the first display 531 (e.g., an area in which the second information 2512 corresponding to application B is displayed).

In an embodiment, the processor 550 may change a display attribute of at least one among the first information 2511 corresponding to the first application, the second information 2512 corresponding to the second application, and the third information 2513 corresponding to the third application, based on the type of the user interactions 2615 and location information at which the user interaction 2615 has been detected.

In an embodiment, the display attribute may include at least one of a size of a window and an arrangement of the window in a display area of the display 530 for displaying the first information corresponding to the first application and the second information corresponding to the second application.

In FIG. 26 according to various embodiments, a description will be made assuming that the type of the user interaction 2615 is a double tap and that a function mapped to the double tap is configured as a function of terminating an application. However, the disclosure is not limited thereto, and the function mapped to a double tap may include a function of rotating a screen, a function of displaying a full screen, or a function of re-executing an application.

In an embodiment, the processor 550 may identify, based on the information about the location information at which the user interaction 2615 has been detected, an application displayed on the first display 531 and corresponding to the location at which the user interaction 2615 has been detected, and may terminate the application. For example, the processor 550 may terminate application B displayed on the first display 531 and corresponding to the location at which the double tap 2615 has been detected, and as illustrated in reference numeral <2650>, may display the first information 2511 corresponding to application A in a first area (e.g., a left area) of the first display 531, and may the third information 2513 corresponding to application C in a second area (e.g., a right area).

Figure 27:
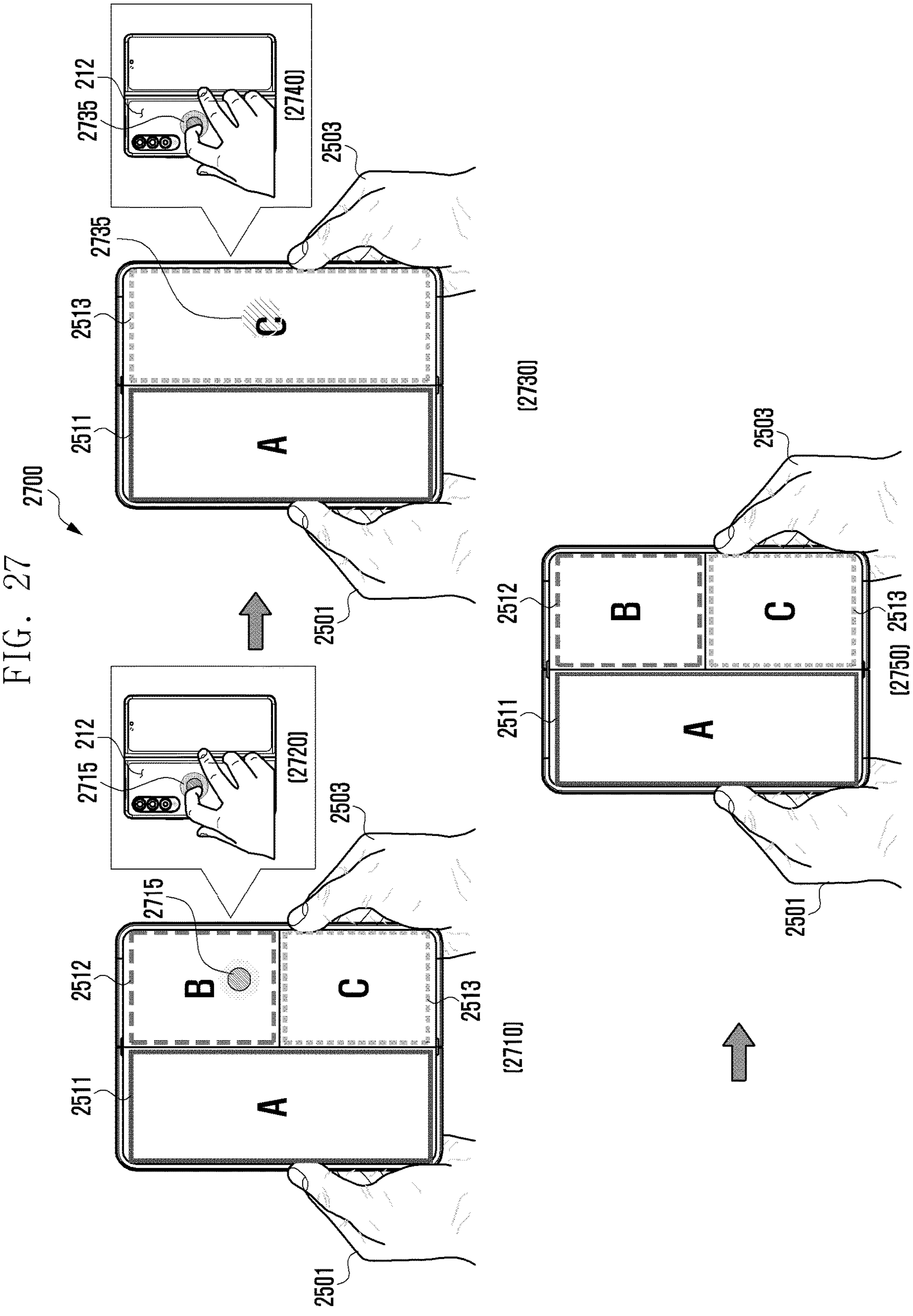
FIG. 27 illustrates a method for controlling a screen according to a user interaction according to an embodiment of the disclosure.

FIG. 27 includes a view 2700 for illustrating a method for controlling a screen according to a user interaction according to an embodiment of the disclosure.

Reference numerals <2710>, <2720>, and <2730> in FIG. 27 according to various embodiments are the same as the reference numerals <2610>, <2620>, and <2650> in FIG. 26 described above, and thus a detailed description thereof may be replaced with the description in FIG. 26.

Referring to FIG. 27, as illustrated in reference numeral <2710>, a processor (e.g., the processor 550 in FIG. 5) of an electronic device (e.g., the electronic device 501 in FIG. 5) may detect a first user interaction 2715 in a partial area of the second surface 212 of the electronic device 501 in a state in which first information 2511 about application A is displayed in a first area (e.g., a left area) among three areas of the first display 531, second information 2512 corresponding to application B is displayed in a second area (e.g., an upper right area), and third information 2513 corresponding to application C is displayed in a third area (e.g., a lower right area). For example, a partial area of the second surface 212 illustrated in views depicted by reference numerals <2710> and <2720> may be an area corresponding to a second area of the first display 531 (e.g., an area in which the second information 2512 corresponding to application B is displayed).

In an embodiment, the processor 550 may change a display attribute of at least one among the first information 2511 corresponding to the first application, the second information 2512 corresponding to the second application, and the third information 2513 corresponding to the third application, based on the type of the first user interactions 2715 and location information at which the first user interaction 2715 has been detected.

In FIG. 27 according to various embodiments, a description will be made assuming that the type of the first user interaction 2715 is a double tap and that a function mapped to the double tap is configured as a function of terminating an application.

In an embodiment, the processor 550 may terminate, based on the information about the location information at which the user interaction 2715 has been detected, application B displayed on the first display 531 and corresponding to the location at which the first user interaction 2715 has been detected, and as illustrated in reference numeral <2730>, may display the first information 2511 corresponding to application A in a first area (e.g., a left area) of the first display 531, and may the third information 2513 corresponding to application C in a second area (e.g., a right area).

In an embodiment, as illustrated in views depicted by reference numerals <2730> and <2740>, the processor 550 may detect a second user interaction 2735 in a partial area of the second surface 212 of the electronic device 501. For example, a partial area of the second surface 212 illustrated in views depicted by reference numerals <2730> and <2740> may be an area corresponding to a second area of the first display 531 (e.g., the area in which the second information 2512 corresponding to application B is displayed).

In FIG. 27 according to various embodiments, a description will be made assuming that the type of the second user interaction 2735 is a triple tap and that a function mapped to the triple tap is configured as a function of re-executing a terminated application. However, the disclosure is not limited thereto, and the function mapped to a triple tap may include a function of rotating a screen, a function of displaying a full screen, or a function of changing an application.

In an embodiment, the processor 550 may re-execute the terminated application B, based on the detection of the second user interaction 2735, and as illustrated in reference numeral <2750>, may display the first information 2511 corresponding to application A in a first area (e.g., a left area)

of three areas of the first display 531, may display the second information 2512 corresponding to the re-executed application B in a second area (e.g., an upper right area), and may display the third information 2513 corresponding to application C in a third area (e.g., a lower right area).

Figure 28A:
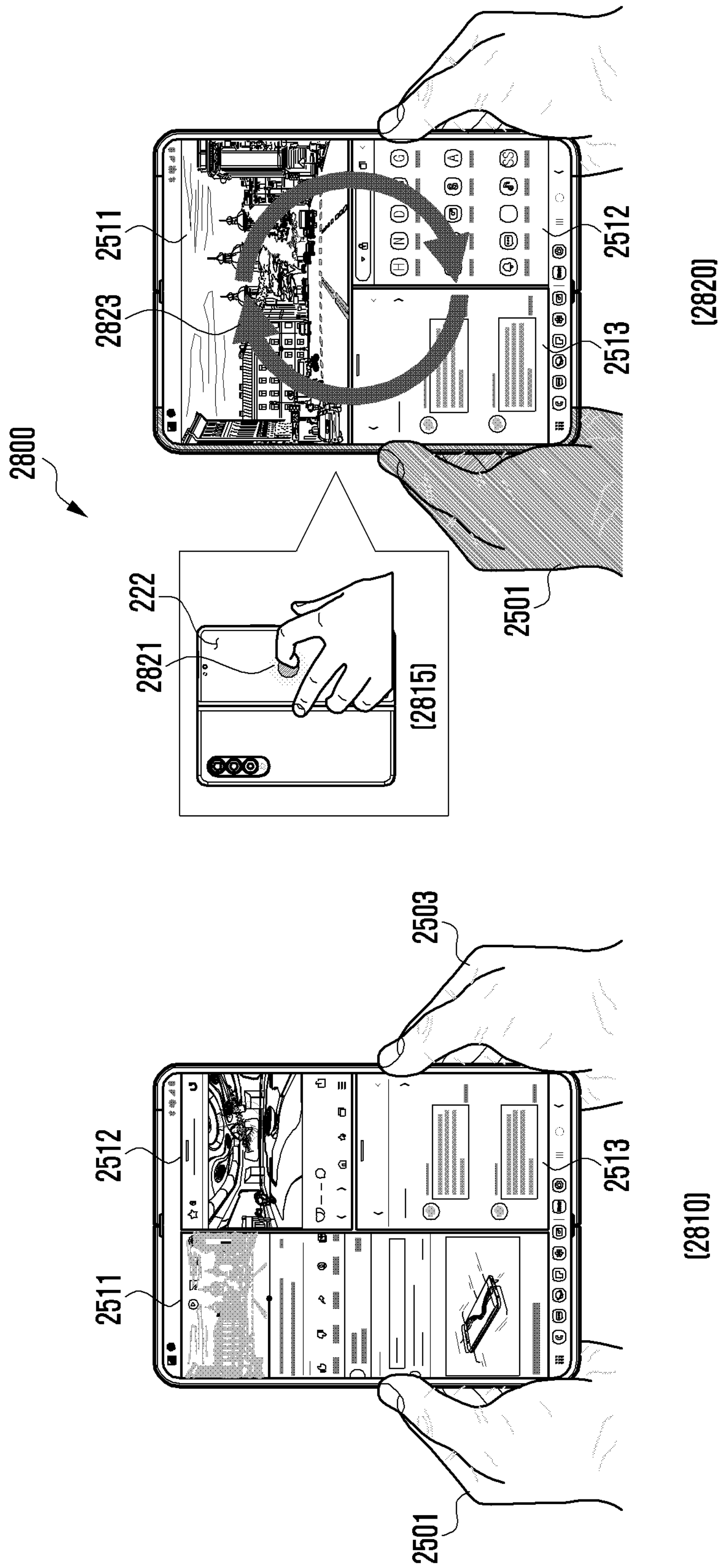
FIGS. 28A and 28B illustrate a method for controlling a screen according to a user interaction according to an embodiment of the disclosure.
Figure 28B:
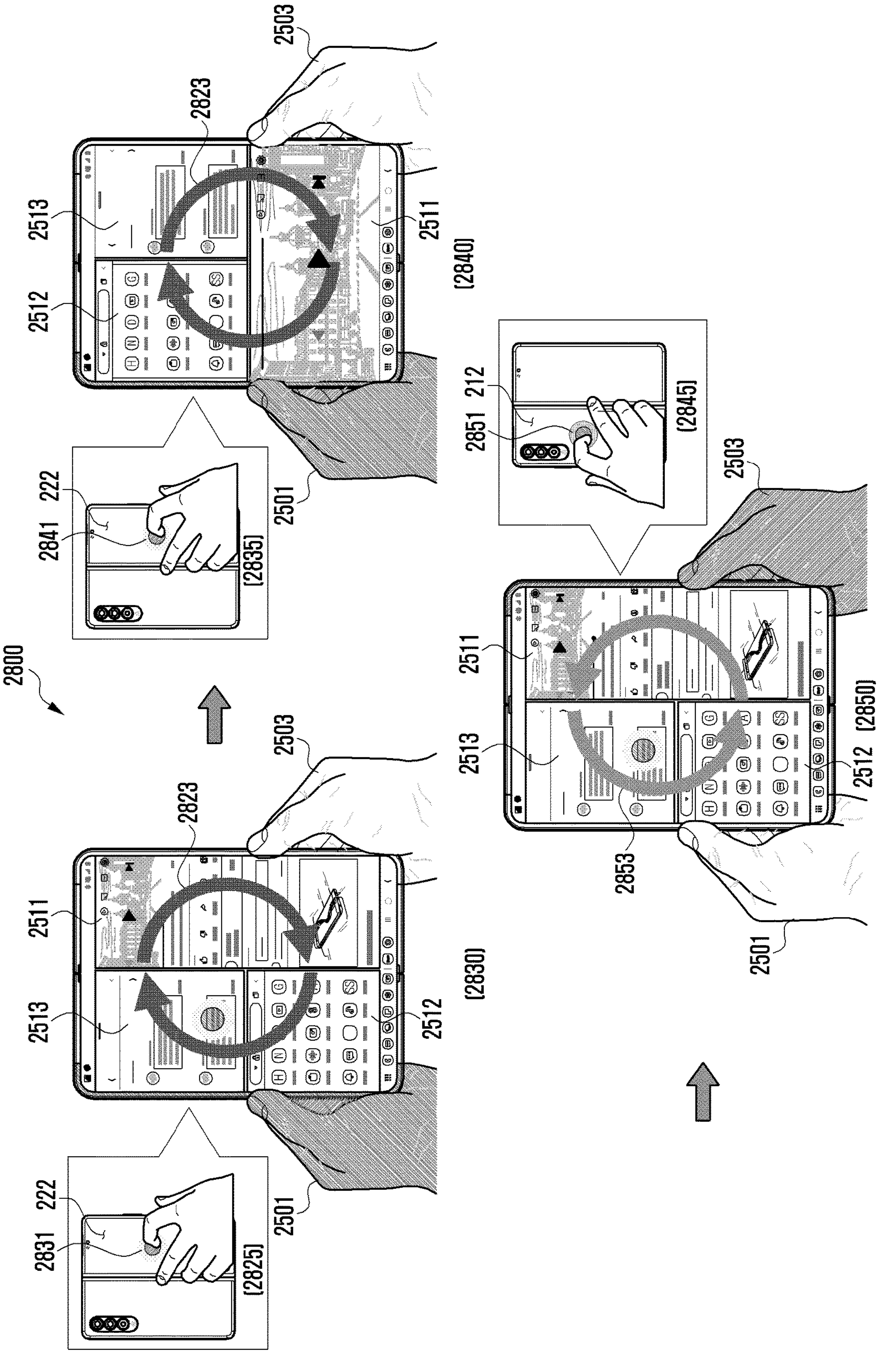

FIGS. 28A and 28B are views 2800 illustrating a method for controlling a screen according to a user interaction according to an embodiment of the disclosure.

Referring to FIGS. 28A and 28B, as illustrated in reference numeral <2810>, a processor (e.g., the processor 550 in FIG. 5) of an electronic device (e.g., the electronic device 501 in FIG. 5) may display first information 2511 corresponding to application A in a first area (e.g., a left area) among three areas of the first display 531, may display second information 2512 corresponding to application B in a second area (e.g., an upper right area), and may display third information 2513 corresponding to application C in a third area (e.g., a lower right area).

In an embodiment, the processor 550 may acquire sensor information through a sensor circuit (e.g., the sensor circuit 540 in FIG. 5). For example, the sensor circuit 540 may include an inertial sensor (e.g., the inertial sensor 541 in FIG. 5) and/or a grip sensor (e.g., the grip sensor 543 in FIG. 5). The disclosure is not limited thereto. The sensor information may further include sensor information acquired through a touch sensor (e.g., a touch sensor of a second display (e.g., the second display 533 in FIG. 5)).

In an embodiment, the processor 550 may detect a user interaction 2821 on the second surface 212 or the fourth surface 222 of the electronic device 501, based on the sensor information acquired through the sensor circuit 540 and/or the touch sensor of the second display 533. The processor 550 may identify the type of detected user interaction 2821 and/or location information where the user interaction 2821 has been detected.

In an embodiment, as illustrated in reference numeral <2815>, the processor 550 may detect the user interaction 2821 by a left hand 2501 in a partial area of the fourth surface 222 of the electronic device 501. For example, a partial area of the fourth surface 222 illustrated in reference numeral <2815> may be an area corresponding to a second area of the first display 531 (e.g., an area in which the first information 2511 corresponding to application A is displayed).

In an embodiment, the processor 550 may change a display attribute of at least one among the first information 2511 corresponding to the first application, the second information 2512 corresponding to the second application, and the third information 2513 corresponding to application C, based on the type of the user interactions 2821 and the location information at which the user interaction 2821 has been detected.

In FIGS. 28A and 28B according to various embodiments, a description will be made assuming that the type of the user interaction 2821 is a triple tap. In addition, a description will be made assuming that a function mapped when the triple tap 2821 is detected on the fourth surface 222 of the second housing 220 is configured as a function of rotating a window in a first direction and displaying the rotated window. In addition, a description will be made assuming that a function mapped when the triple tap 2821 is detected on the second surface 212 of the first housing 210 is configured as a function of rotating a window in a second direction (e.g., a direction opposite to the first direction) and displaying the rotated window.

In an embodiment, the processor 550 may display the first information 2511 corresponding to the first application, the second information 2512 corresponding to the second application, and the third information 2513 corresponding to application C by rotating (2823) a window in the first direction, based on the detection of the triple tap 2821 on the fourth surface 222 of the second housing 220. For example, as illustrated in reference numeral <2820>, the processor 550 may display the first information 2511 corresponding to application A in a first area (e.g., an upper area) among three areas of the first display 531, may display the second information 2512 corresponding to application B in a second area (e.g., a lower right area), and may display the third information 2513 corresponding to application C in a third area (e.g., a lower left area).

Referring to FIG. 28B, the processor 550 may display information corresponding to each of applications by rotating (2823) a window in the first direction, based on detection of a triple tap 2831 by the left hand 2501 on the fourth surface 222 of the second housing 220 as illustrated in reference numeral <2825> according to an embodiment. For example, as illustrated in reference numeral <2830>, the processor 550 may display the third information 2513 corresponding to application C in a first area (e.g., an upper left area) among three areas of the first display 531, may display the first information 2511 corresponding to application A in a second area (e.g., a right area), and may display the second information 2512 corresponding to application B in a third area (e.g., a lower left area).

In an embodiment, the processor 550 may display information corresponding to each of applications by rotating (2823) a window in the first direction, based on detection of a triple tap 2841 by the left hand 2501 on the fourth surface 222 of the second housing 220 as illustrated in reference numeral <2835>. For example, as illustrated in reference numeral <2840>, the processor 550 may display the second information 2512 corresponding to application B in a first area (e.g., an upper left area) among three areas of the first display 531, may display the third information 2513 corresponding to application C in a second area (e.g., an upper right area), and may display the first information 2511 corresponding to application A in a third area (e.g., a lower area).

In an embodiment, the processor 550 may display information about each of applications by rotating (2853) a window in the second direction, based on detection of a triple tap 2851 by a right hand 2503 on the second surface 212 of the first housing 210 as illustrated in reference numeral <2845>. For example, as illustrated in reference numeral <2850>, the processor 550 may display the third information 2513 corresponding to application C in a first area (e.g., an upper left area) among three areas of the first display 531, may display the first information 2511 corresponding to application A in a second area (e.g., a right area), and may display the second information 2512 corresponding to application B in a third area (e.g., a lower left area).

Figure 29A:
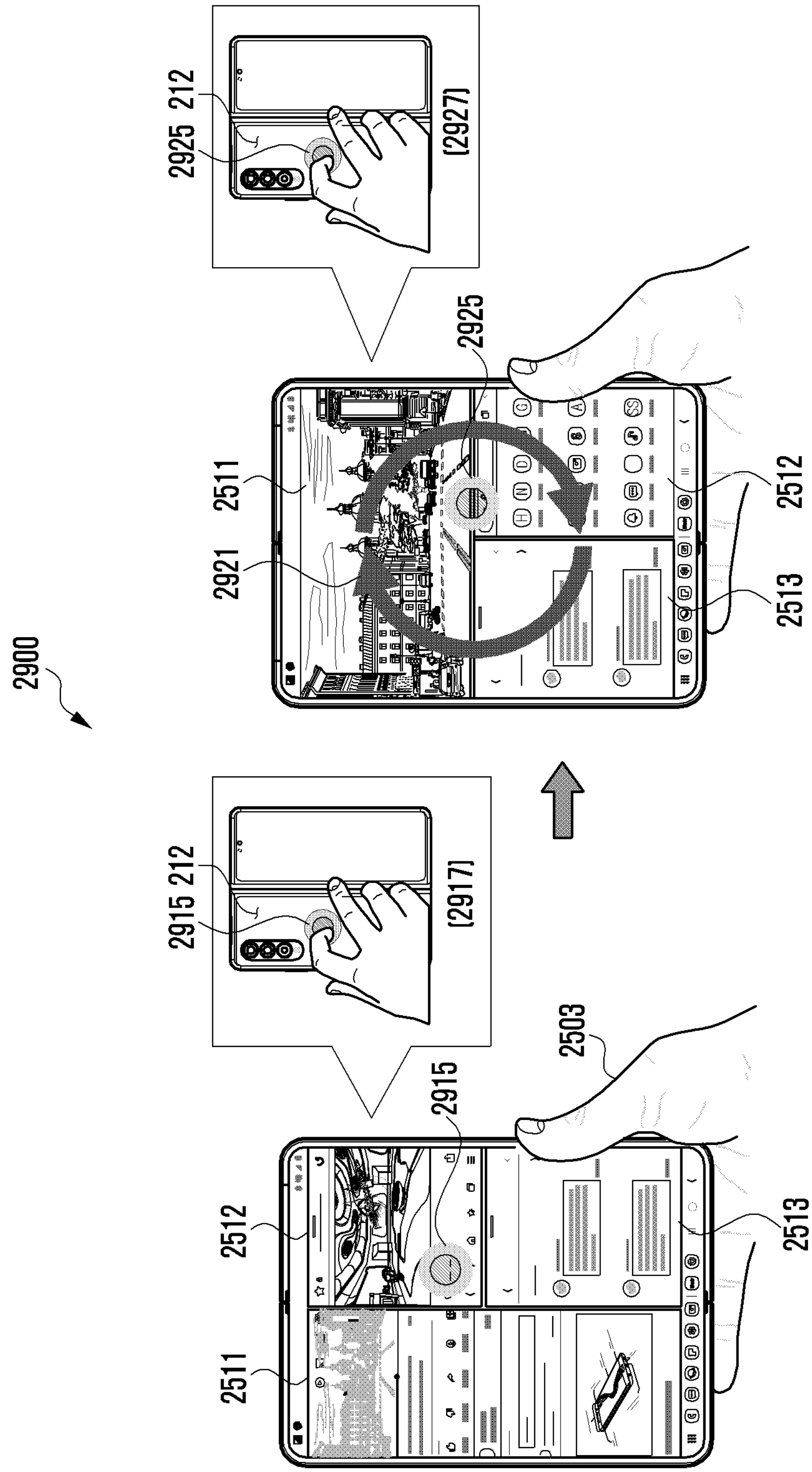
FIGS. 29A and 29B illustrate a method for controlling a screen according to a user interaction according to an embodiment of the disclosure.
Figure 29B:
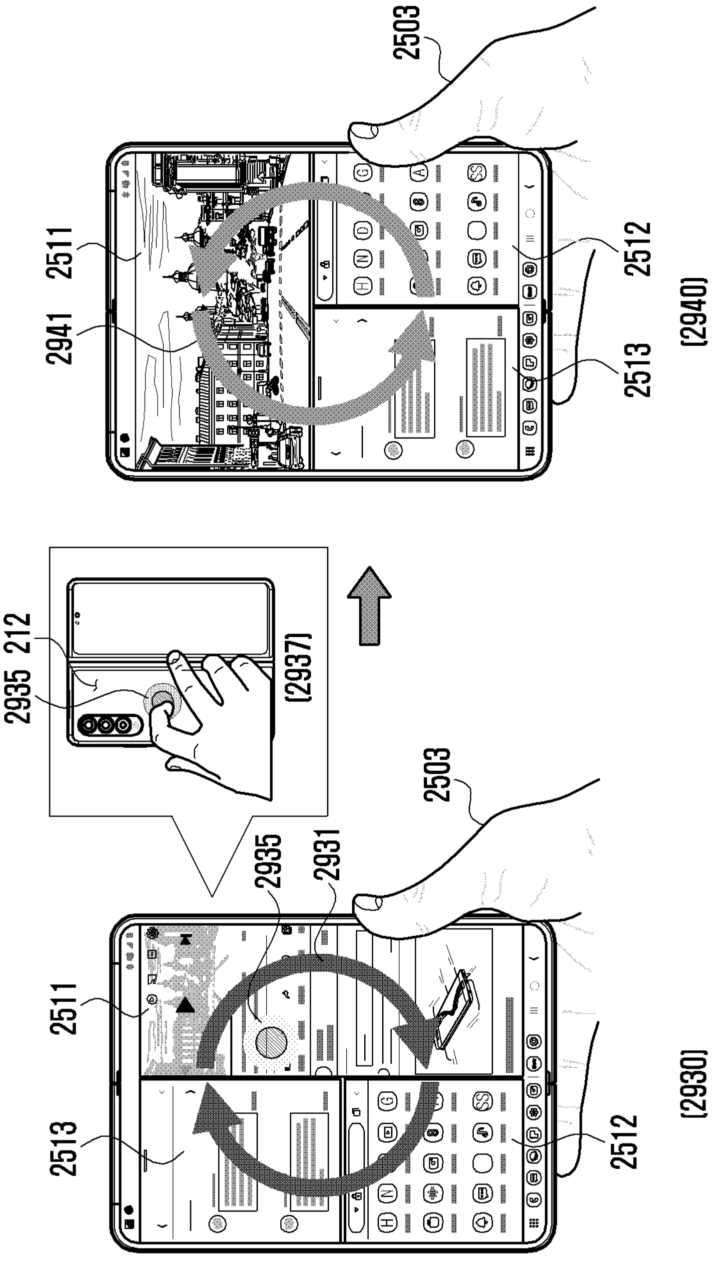

FIGS. 29A and 29B are views 2900 illustrating a method for controlling a screen according to a user interaction according to an embodiment of the disclosure.

Referring to FIGS. 29A and 29B, as illustrated in reference numeral <2910>, a processor (e.g., the processor 550 in FIG. 5) of an electronic device (e.g., the electronic device 501 in FIG. 5) may display first information 2511 corresponding to application A in a first area (e.g., a left area) among three areas of the first display 531, may display second information 2512 corresponding to application B in a second area (e.g., an upper right area), and may display third information 2513 corresponding to application C in a third area (e.g., a lower right area).

In an embodiment, the processor 550 may acquire sensor information through a sensor circuit (e.g., the sensor circuit 540 in FIG. 5). For example, the sensor circuit 540 may include an inertial sensor (e.g., the inertial sensor 541 in FIG. 5) and/or a grip sensor (e.g., the grip sensor 543 in FIG. 5). The disclosure is not limited thereto. The sensor information may further include sensor information acquired through a touch sensor (e.g., a touch sensor of a second display (e.g., the second display 533 in FIG. 5)).

In an embodiment, the processor 550 may detect a user interaction on the second surface 212 or the fourth surface 222 of the electronic device 501, based on the sensor information acquired through the sensor circuit 540 and/or the touch sensor of the second display 533. The processor 550 may identify the type of detected user interaction and/or location information where the user interaction has been detected.

In an embodiment, as illustrated in reference numeral <2917>, the processor 550 may detect a user interaction 2915 in a partial area of the second surface 212 of the electronic device 501.

In an embodiment, the processor 550 may change a display attribute of at least one among the first information 2511 corresponding to the first application, the second information 2512 corresponding to the second application, and the third information 2513 corresponding to application C, based on the type of the user interaction 2915 and the location information at which the user interaction 2915 has been detected.

In FIGS. 29A and 29B according to various embodiments, a description will be made assuming that the type of user interaction 2915 is a double tap or a triple tap and that different functions are performed based on the detection of the double tap or triple tap on the second surface 212 of the first housing 210. For example, a description will be made assuming that a function mapped when a double tap is detected on the second surface 212 of the first housing 210 is configured as a function of rotating a window in a first direction and displaying the rotated window. In addition, a description will be made assuming that a function mapped when a triple tap is detected on the second surface 212 of the first housing 210 is configured as a function of rotating a window in a second direction (e.g., a direction opposite to the first direction) and displaying the rotated window.

In an embodiment, the processor 550 may display the first information 2511 corresponding to the first application, the second information 2512 corresponding to the second application, and the third information 2513 corresponding to application C by rotating (2921) a window in the first direction, based on the detection of the double tap 2915 on the second surface 212 of the first housing 210 as illustrated in reference numeral <2917>. For example, as illustrated in reference numeral <2920>, the processor 550 may display the first information 2511 corresponding to application A in a first area (e.g., an upper area) among three areas of the first display 531, may display the second information 2512 corresponding to application B in a second area (e.g., a lower right area), and may display the third information 2513 corresponding to application C in a third area (e.g., a lower left area).

Referring to FIG. 29B, the processor 550 may display the first information 2511 corresponding to the first application, the second information 2512 corresponding to the second application, and the third information 2513 corresponding to application C by rotating (2931) a window in the first direction, based on the detection of a triple tap 2925 on the second surface 212 of the first housing 210 as illustrated in reference numeral <2927>. For example, as illustrated in reference numeral <2930>, the processor 550 may display the third information 2513 corresponding to application C in a first area (e.g., an upper left area) among three areas of the first display 531, may display the first information 2511 corresponding to application A in a second area (e.g., a right area), and may display the second information 2512 corresponding to application B in a third area (e.g., a lower left area).

In an embodiment, the processor 550 may display the first information 2511 corresponding to the first application, the second information 2512 corresponding to the second application, and the third information 2513 corresponding to application C by rotating (2941) a window in the second direction, based on detection of a triple tap 2935 on the second surface 212 of the first housing 210 as illustrated in reference numeral <2937>. For example, as illustrated in reference numeral <2940>, the processor 550 may display the first information 2511 corresponding to application A in a first area (e.g., an upper area) among three areas of the first display 531, may display the second information 2512 corresponding to application B in a second area (e.g., a lower right area), and may display the third information 2513 corresponding to application C in a third area (e.g., a lower left area).

Figure 30:
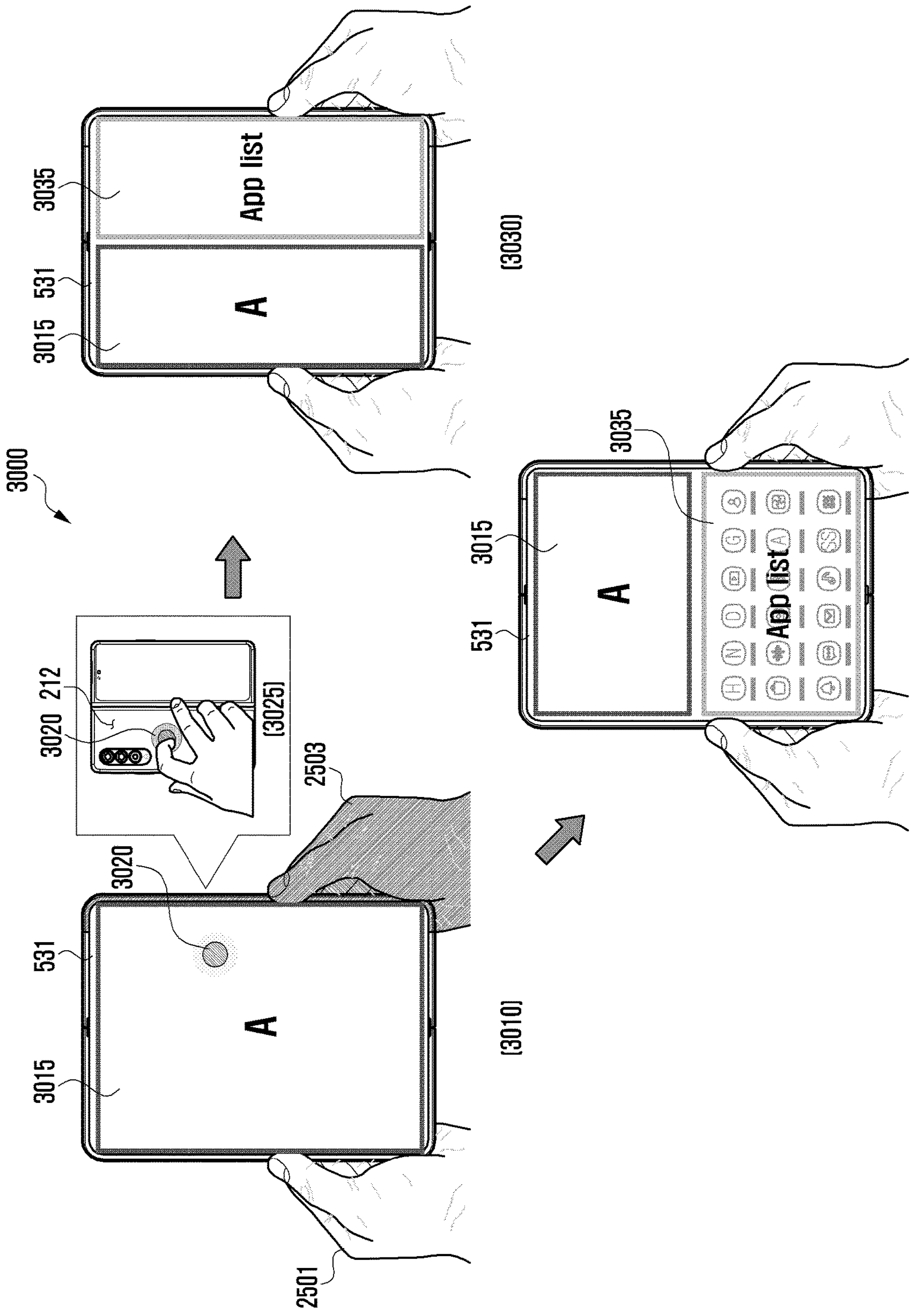
FIG. 30 illustrates a method for controlling a screen according to a user interaction according to an embodiment of the disclosure.

FIG. 30 includes a view 3000 for illustrating a method for controlling a screen according to a user interaction according to an embodiment of the disclosure.

Referring to FIG. 30, as illustrated in reference numeral <3010>, a processor (e.g., the processor 550 in FIG. 5) of an electronic device (e.g., the electronic device 501 in FIG. 5) may display first information 3015 corresponding to application A on the first display 531.

In an embodiment, the processor 550 may acquire sensor information through a sensor circuit (e.g., the sensor circuit 540 in FIG. 5). For example, the sensor circuit 540 may include an inertial sensor (e.g., the inertial sensor 541 in FIG. 5) and/or a grip sensor (e.g., the grip sensor 543 in FIG. 5). The disclosure is not limited thereto. The sensor information may further include sensor information acquired through a touch sensor (e.g., a touch sensor of a second display (e.g., the second display 533 in FIG. 5)).

In an embodiment, the processor 550 may detect a grip state of the electronic device 501 and a user interaction on the second surface 212 or the fourth surface 222, based on the sensor information acquired through the sensor circuit 540 and/or the touch sensor of the second display 533. The processor 550 may identify information about the grip state of the electronic device 501, the type of detected user interaction, and/or a location where the user interaction has been detected.

In an embodiment, as illustrated in reference numeral <3025>, in a state where the electronic device 501 is gripped with both hands 2501 and 2503, the processor 550 may detect a user interaction 3020 in a partial area of the second surface 212 of the electronic device 501.

In an embodiment, the processor 550 may change a display attribute of the first information 3015 corresponding to application A on the first display 531, based on the type of the user interaction 3020 and location information where the user interaction 3020 has been detected.

In FIG. 30 according to various embodiments, a description will be made assuming that the type of the user interaction 3020 is a double tap and that the display area of the first display 531 is divided into multiple areas, based on detection of the double tap on the second surface 212 of the first housing 210, and then multiple pieces of information are displayed.

In an embodiment, the processor 550 may divide the display area of the first display 531 into two areas as illustrated in reference numeral <3030>, based on the detection of the double tap 3020 on the second surface 212 of the first housing 210. The processor 550 may display the first information 3015 corresponding to application A in a first area (e.g., a left area) of the two separate areas, and may display an application list 3035 in a second area (e.g., a right area). The application list 3035 may include at least one application frequently used by the user.

In an embodiment, the processor 550 may display newly executed information (e.g., the application list 3035) in an area (e.g., the second area (e.g., the right area)) of the first display 531 corresponding to the second surface 212 on which the double tap 3020 has been detected.

In another embodiment, the processor 550 may divide the display area of the first display 531 into two areas as illustrated in reference numeral <3050>, based on the detection of the double tap 3020 on the second surface 212 of the first housing 210. The processor 550 may display the first information 3015 corresponding to application A in a first area (e.g., an upper area) of the two separate areas, and may display the application list 3035 in a second area (e.g., a lower area).

Figure 31:
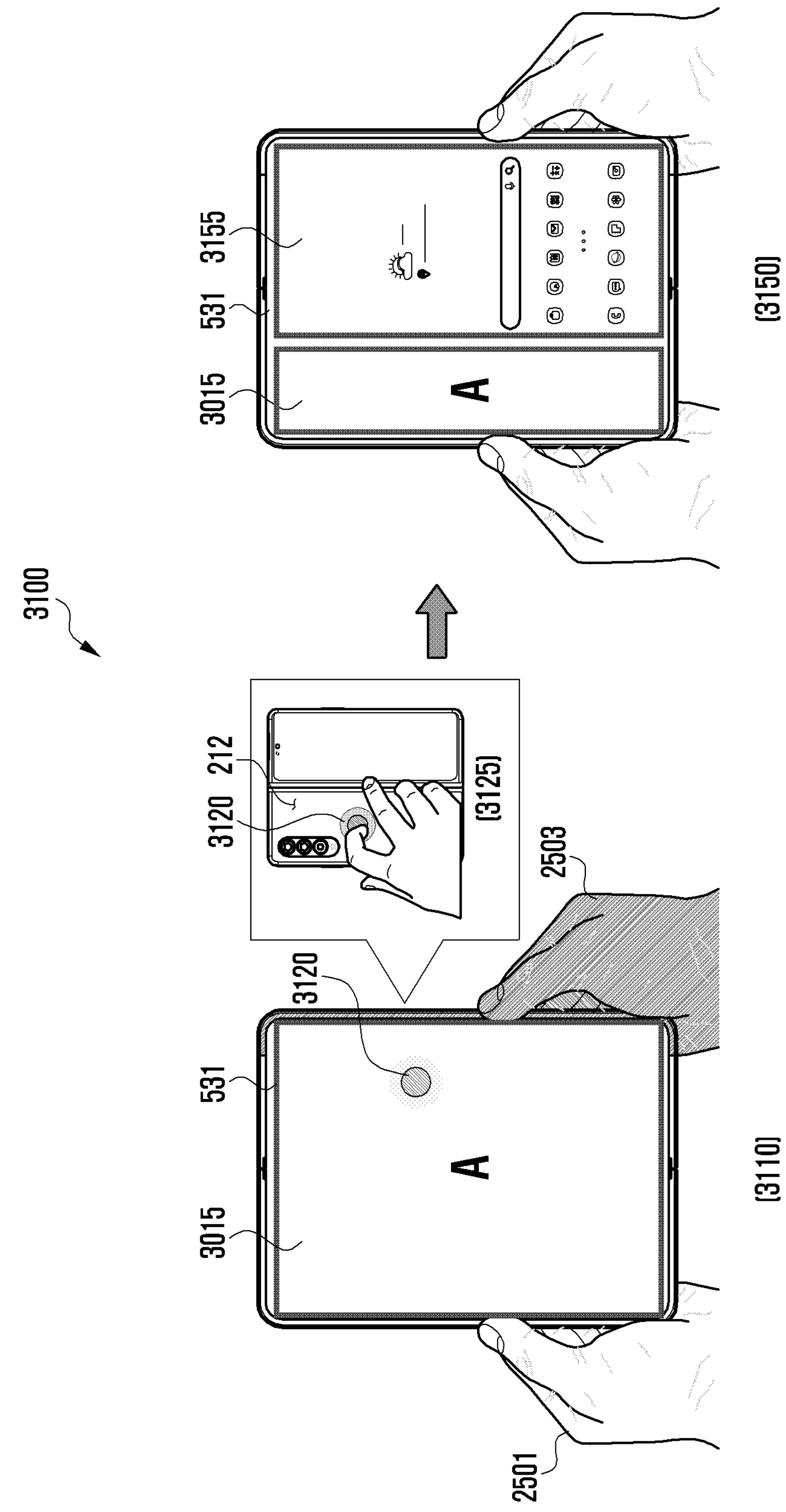
FIG. 31 illustrates a method for controlling a screen according to a user interaction according to an embodiment of the disclosure.

FIG. 31 includes a view 3100 for illustrating a method for controlling a screen according to a user interaction according to an embodiment of the disclosure.

Reference numeral <3110> in FIG. 31 according to various embodiments is the same as reference numeral <3010> in FIG. 30 described above, and thus a detailed description thereof may be replaced with the description in FIG. 30.

Referring to FIG. 31, as illustrated in reference numeral <3110>, in the state where first information 3015 corresponding to application A is displayed on the first display 531, a processor (e.g., the processor 550 in FIG. 5) of an electronic device (e.g., the electronic device 501 in FIG. 5) may acquire sensor information through a sensor circuit (e.g., the sensor circuit 540 in FIG. 5) (e.g., an inertial sensor (e.g., the inertial sensor 541 in FIG. 5) and/or a grip sensor (e.g., the grip sensor 543 in FIG. 5)) and/or a touch sensor (e.g., a touch sensor of a second display (e.g., the second display 533 in FIG. 5)).

In an embodiment, the processor 550 may detect a grip state of the electronic device 501 and a user interaction on the second surface 212 or the fourth surface 222, based on the acquired sensor information. The processor 550 may identify information about the grip state of the electronic device 501, the type of detected user interaction, and/or a location where the user interaction has been detected.

In an embodiment, in a state where the electronic device 501 is gripped with both hands 2501 and 2503, the processor 550 may detect, as illustrated in reference numeral <3125>, a user interaction 3120 in a partial area of the second surface 212 of the electronic device 501.

In an embodiment, the processor 550 may change a display attribute of the first information 3015 corresponding to application A on the first display 531, based on the type of the user interaction 3120 and location information where the user interaction 3120 has been detected.

In FIG. 31 according to various embodiments, a description will be made assuming that the type of the user interaction is a double tap and that the display area of the first display 531 is divided into multiple areas, based on detection of the double tap on the second surface 212 of the first housing 210, and then multiple pieces of information are displayed.

In an embodiment, as illustrated in reference numeral <3150>, the processor 550 may divide the display area of the first display 531 into two areas, based on the detection of the double tap 3120 on the second surface 212 of the first housing 210. The processor 550 may display the first information 3015 corresponding to application A in a first area (e.g., a left area) of the two separate areas, and may display a home screen 3155 in a second area (e.g., a right area).

In an embodiment, the processor 550 may display newly executed information (e.g., the home screen 3155) in an area (e.g., the second area (e.g., the right area)) of the first display 531 corresponding to the second surface 212 on which the double tap 3120 has been detected. However, the disclosure is not limited to the display of the home screen 3155 in the second area. As such, according to another embodiment, information corresponding to another application executable by the electronic device may be displayed in the second area. The another application executable by the electronic device may be a camera application, a music application or a preselected application.

Figure 32:
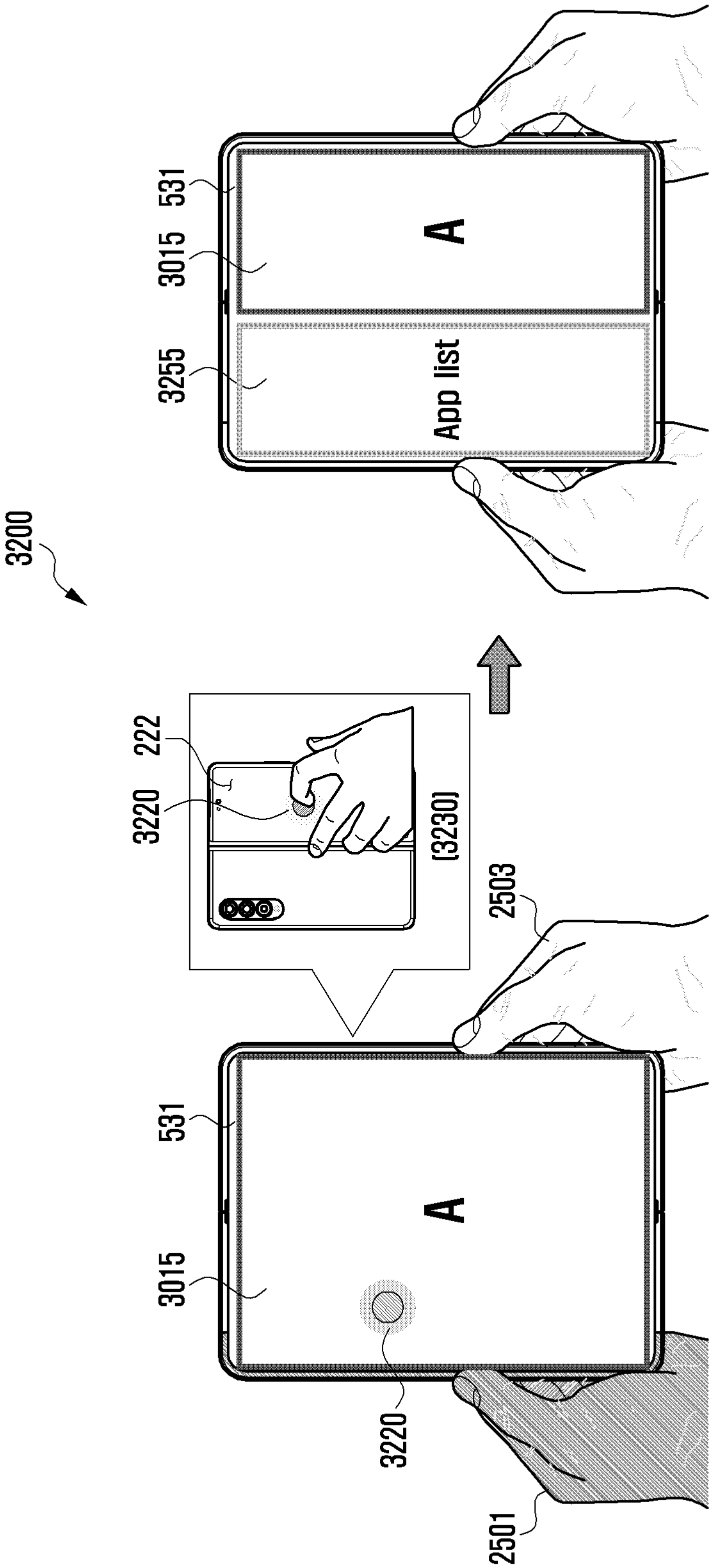
FIG. 32 illustrates a method for controlling a screen according to a user interaction according to an embodiment of the disclosure.

FIG. 32 includes a view for 3200 illustrating a method for controlling a screen according to a user interaction according to an embodiment of the disclosure.

Reference numeral <3210> in FIG. 32 according to various embodiments is the same as reference numeral <3010> in FIG. 30 described above, and thus a detailed description thereof may be replaced with the description in FIG. 30.

Referring to FIG. 32, as illustrated in reference numeral <3210>, in the state where first information 3015 corresponding to application A is displayed on the first display 531, a processor (e.g., the processor 550 in FIG. 5) of an electronic device (e.g., the electronic device 501 in FIG. 5) may acquire sensor information through a sensor circuit (e.g., the sensor circuit 540 in FIG. 5) (e.g., an inertial sensor (e.g., the inertial sensor 541 in FIG. 5) and/or a grip sensor (e.g., the grip sensor 543 in FIG. 5)) and/or a touch sensor (e.g., a touch sensor of a second display (e.g., the second display 533 in FIG. 5)).

In an embodiment, the processor 550 may detect a grip state of the electronic device 501 and a user interaction on the second surface 212 or the fourth surface 222, based on the acquired sensor information. The processor 550 may identify information about the grip state of the electronic device 501, the type of detected user interaction, and/or a location where the user interaction has been detected.

In an embodiment, in a state where the electronic device 501 is gripped with both hands 2501 and 2503, the processor 550 may detect, as illustrated in reference numeral <3230>, a user interaction 3220 in a partial area of the fourth surface 222 of the electronic device 501.

In an embodiment, the processor 550 may change a display attribute of the first information 3015 corresponding to application A on the first display 531, based on the type of the user interaction 3220 and location information where the user interaction 3220 has been detected.

In FIG. 32 according to various embodiments, a description will be made assuming that the type of the user interaction is a double tap and that the display area of the first display 531 is divided into multiple areas, based on detection of the double tap on the fourth surface 222 of the second housing 220, and then multiple pieces of information are displayed.

In an embodiment, as illustrated in reference numeral <3250>, the processor 550 may divide the display area of the first display 531 into two areas, based on the detection of the double tap 3220 on the fourth surface 222 of the second housing 220. The processor 550 may display an application list 3255 in a first area (e.g., a left area) of the two separate areas, and may display the first information 3015 corresponding to application A in a second area (e.g., a right area).

In an embodiment, the processor 550 may display newly executed information (e.g., the application list 3255) in an area (e.g., the first area (e.g., the left area)) of the first display 531 corresponding to the fourth surface 222 on which the double tap 3220 has been detected.

Figure 33:
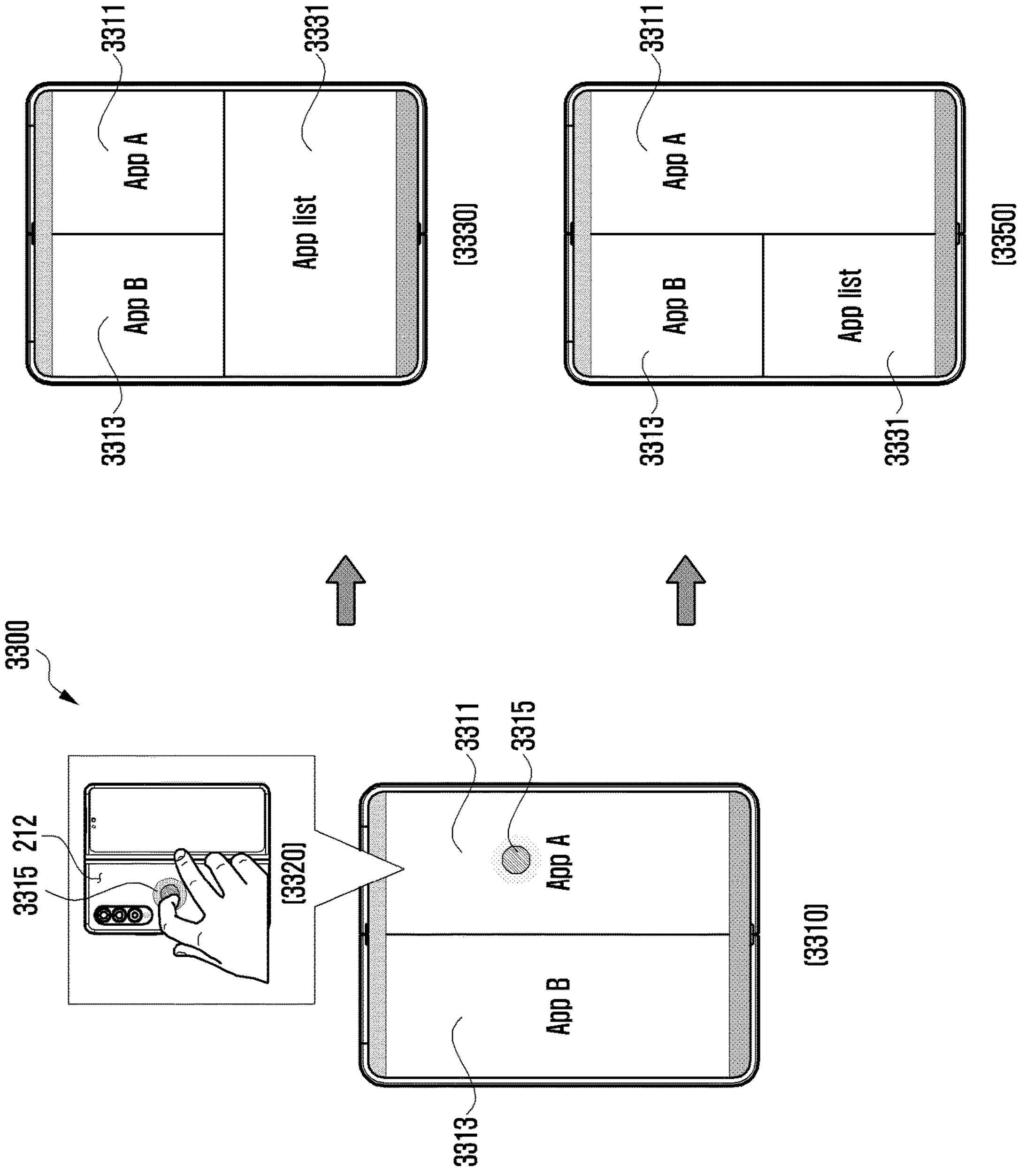
FIG. 33 illustrates a method for controlling a screen according to a user interaction according to an embodiment of the disclosure.

FIG. 33 includes a view 3300 for illustrating a method for controlling a screen according to a user interaction according to an embodiment of the disclosure.

Referring to FIG. 33, as illustrated in reference numeral <3310>, a processor (e.g., the processor 550 in FIG. 5) of an electronic device (e.g., the electronic device 501 in FIG. 5) may display second information 3313 corresponding to application B in a first area (e.g., a left area), and may display first information 3311 corresponding to application A in a second area (e.g., a right area).

In an embodiment, the processor 550 may acquire sensor information through a sensor circuit (e.g., the sensor circuit 540 in FIG. 5), for example, an inertial sensor (e.g., the inertial sensor 541 in FIG. 5) and/or a grip sensor (e.g., the grip sensor 543 in FIG. 5). The disclosure is not limited thereto, and the processor 550 may further acquire sensor information through a touch sensor (e.g., a touch sensor of a second display (e.g., the second display 533 in FIG. 5)). The processor 550 may detect a grip state of the electronic device 501 and a user interaction on the second surface 212 or the fourth surface 222, based on the sensor information acquired through the sensor circuit 540 and/or the touch sensor of the second display 533. The processor 550 may identify information about the grip state of the electronic device 501, the type of detected user interaction, and/or a location where the user interaction has been detected.

In an embodiment, as illustrated in reference numeral <3320>, the processor 550 may detect a user interaction 3315 in a partial area of the second surface 212 of the electronic device 501.

In an embodiment, the processor 550 may change display attributes of the first information 3311 corresponding to application A and the second information 3313 corresponding to application B, which are displayed on the first display 531, based on the type of the user interaction 3315 and location information where the user interaction 3315 has been detected.

In FIG. 33 according to various embodiments, a description will be made assuming that the type of the user interaction is a double tap and that the display area of the first display 531 is divided into multiple areas, based on detection of the double tap on the second surface 212 of the first housing 210, and then multiple pieces of information are displayed.

In an embodiment, the processor 550 may divide the display area of the first display 531 into three areas as illustrated in reference numeral <3330>, based on the detection of the double tap 3315 on the second surface 212 of the first housing 210. The processor 550 may display the second information 3313 corresponding to application B in a first area (e.g., an upper left area) of the three separate areas, may display the first information 3311 corresponding to application A in a second area (e.g., an upper right area), and may display an application list 3331 in a third area (e.g., a lower area).

The disclosure is not limited thereto, and the processor 550 may divide the display area of the first display 531 into three areas as illustrated in reference numeral <3350>, based on the detection of the double tap 3315 on the second surface 212 of the first housing 210. The processor 550 may display the second information 3313 corresponding to application B in a first area (e.g., an upper left area) of the three separated areas, may display the first information 3311 corresponding to application A in a second area (e.g., a right area), and may display the application list 3331 in a third area (e.g., a lower left area).

Figure 34A:
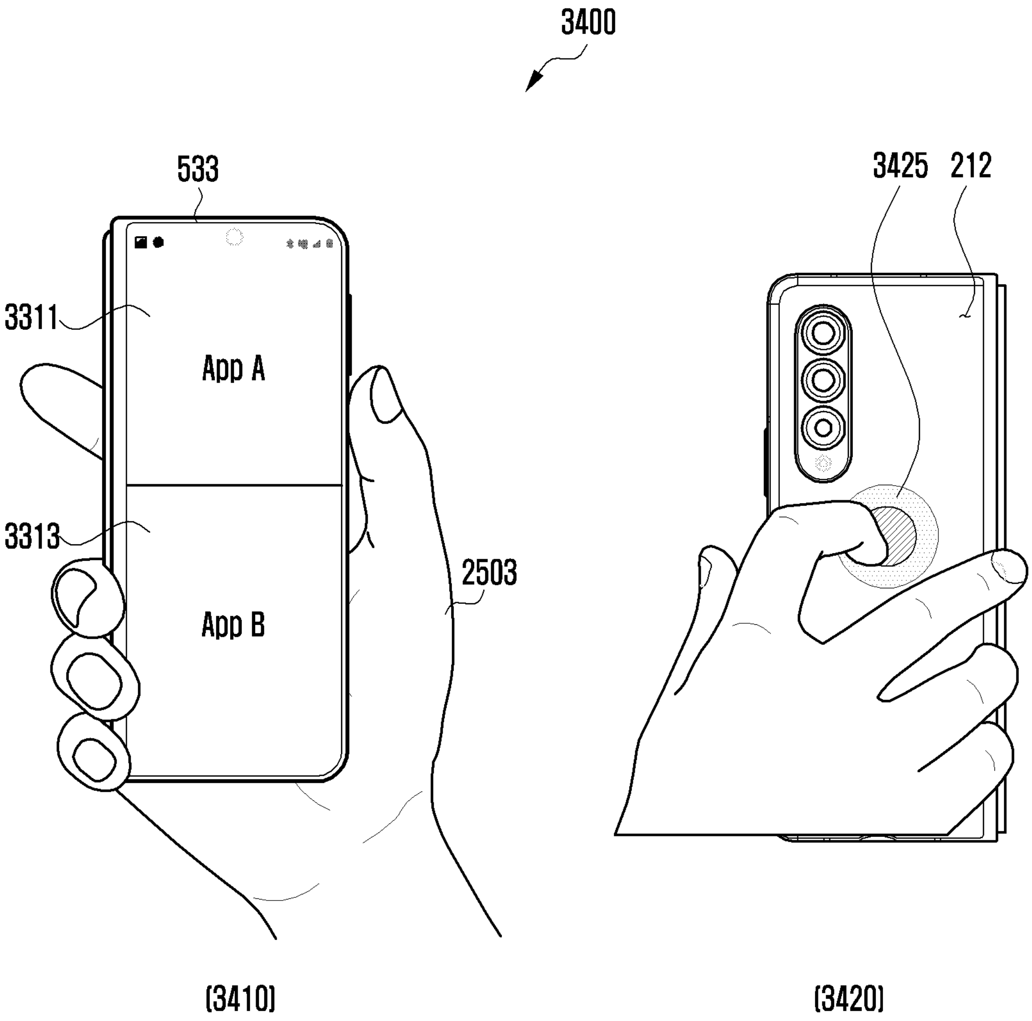
FIGS. 34A and 34B illustrate a method for controlling a screen according to a user interaction according to an embodiment of the disclosure.
Figure 34B:
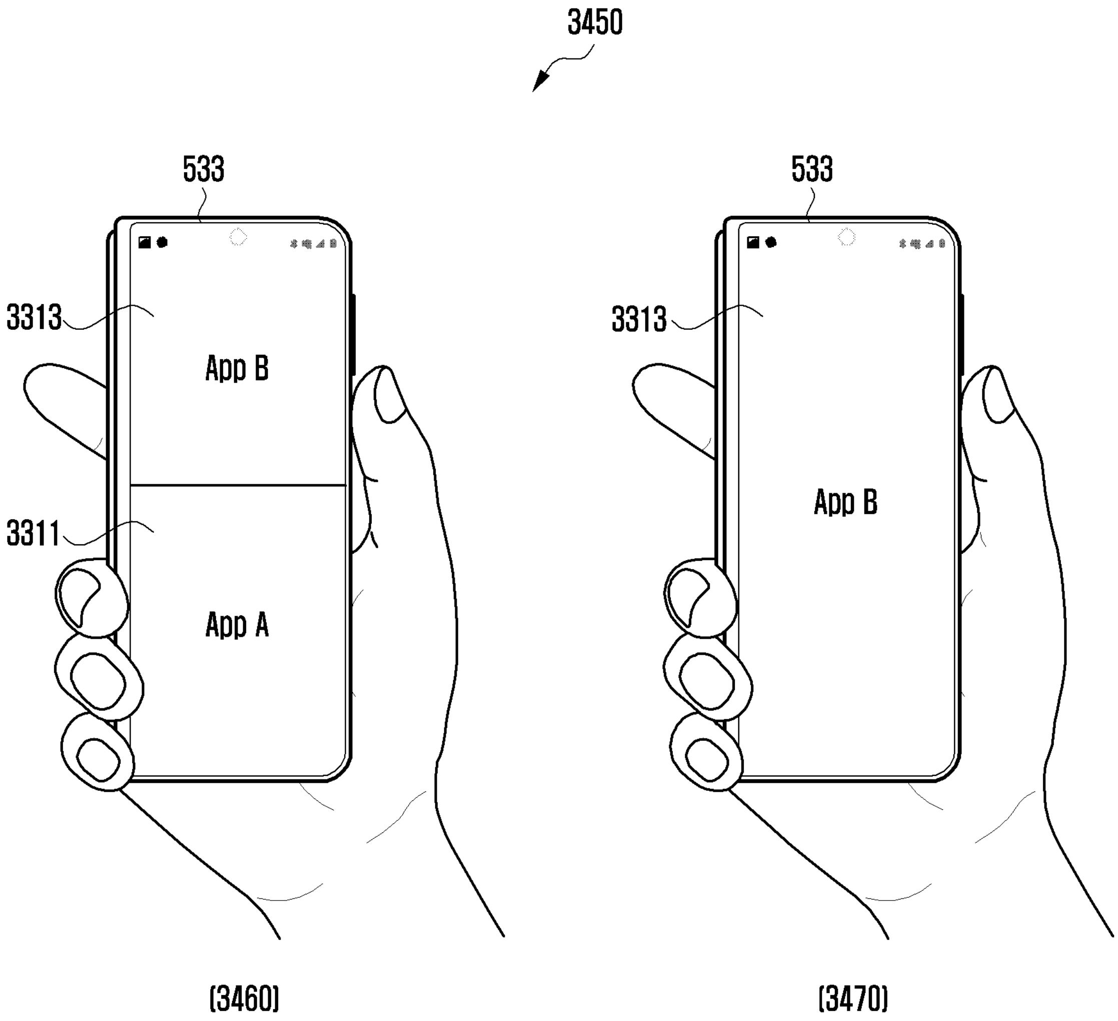

FIGS. 34A and 34B are views 3400 and 3450 illustrating a method for controlling a screen according to a user interaction according to an embodiment of the disclosure.

Referring to FIGS. 34A and 34B, as illustrated in reference numeral <3410>, when an electronic device (e.g., the electronic device 501 in FIG. 5) is in a folded state, a processor (e.g., the processor 550 in FIG. 5) may display first information 3311 corresponding to application A in a first area (e.g., an upper area) of a second display (e.g., the second display 533 in FIG. 5), and may display second information 3313 corresponding to application B in a second area (e.g., an upper area).

In an embodiment, the processor 550 may acquire sensor information through a sensor circuit (e.g., the sensor circuit 540 in FIG. 5), for example, an inertial sensor (e.g., the inertial sensor 541 in FIG. 5) and/or a grip sensor (e.g., the grip sensor 543 in FIG. 5). The disclosure is not limited thereto, and the processor 550 may further acquire sensor information through a touch sensor (e.g., a touch sensor of a second display (e.g., the second display 533 in FIG. 5)). The processor 550 may detect a grip state of the electronic device 501 and a user interaction on the second surface 212 or the fourth surface 222, based on the sensor information acquired through the sensor circuit 540 and/or the touch sensor of the second display 533. The processor 550 may identify information about the grip state of the electronic device 501, the type of detected user interaction, and/or a location where the user interaction has been detected.

In an embodiment, as illustrated in reference numeral <3420>, the processor 550 may detect a user interaction 3425 in a partial area of the second surface 212 of the electronic device 501.

In an embodiment, the processor 550 may change display attributes of the first information 3311 corresponding to application A and/or the second information 3313 corresponding to application B, which are displayed on the second display 533, based on the type of the user interaction 3425 and location information where the user interaction 3425 has been detected.

In FIGS. 34A and 34B according to various embodiments, a description will be made assuming that the type of the user interaction 3425 is a double tap and that based on the detection of the double tap on the second surface 212 of the first housing 210, a display location is changed (e.g., a window is changed), or an application, displayed on the second display 533 and corresponding to a location where the double tap has been, is terminated.

In an embodiment, based on the detection of the double tap 3425 on the second surface 212 of the first housing 210, the processor 550 may display, as illustrated in reference numeral <3460>, the second information 3313 corresponding to application B in a first area (e.g., an upper area) of the second display (e.g., the second display 533 in FIG. 5) and the first information 3311 corresponding to application A in a second area (e.g., an upper area).

In an embodiment, based on the detection of the double tap 3425 on the second surface 212 of the first housing 210, the processor 550 may terminate application A displayed on the second display 533 and corresponding to the location where the double tap 3425 has been detected, and may display the second information 3313 corresponding to application B on the second display 533 as illustrated in reference numeral <3470>.

Figure 35A:
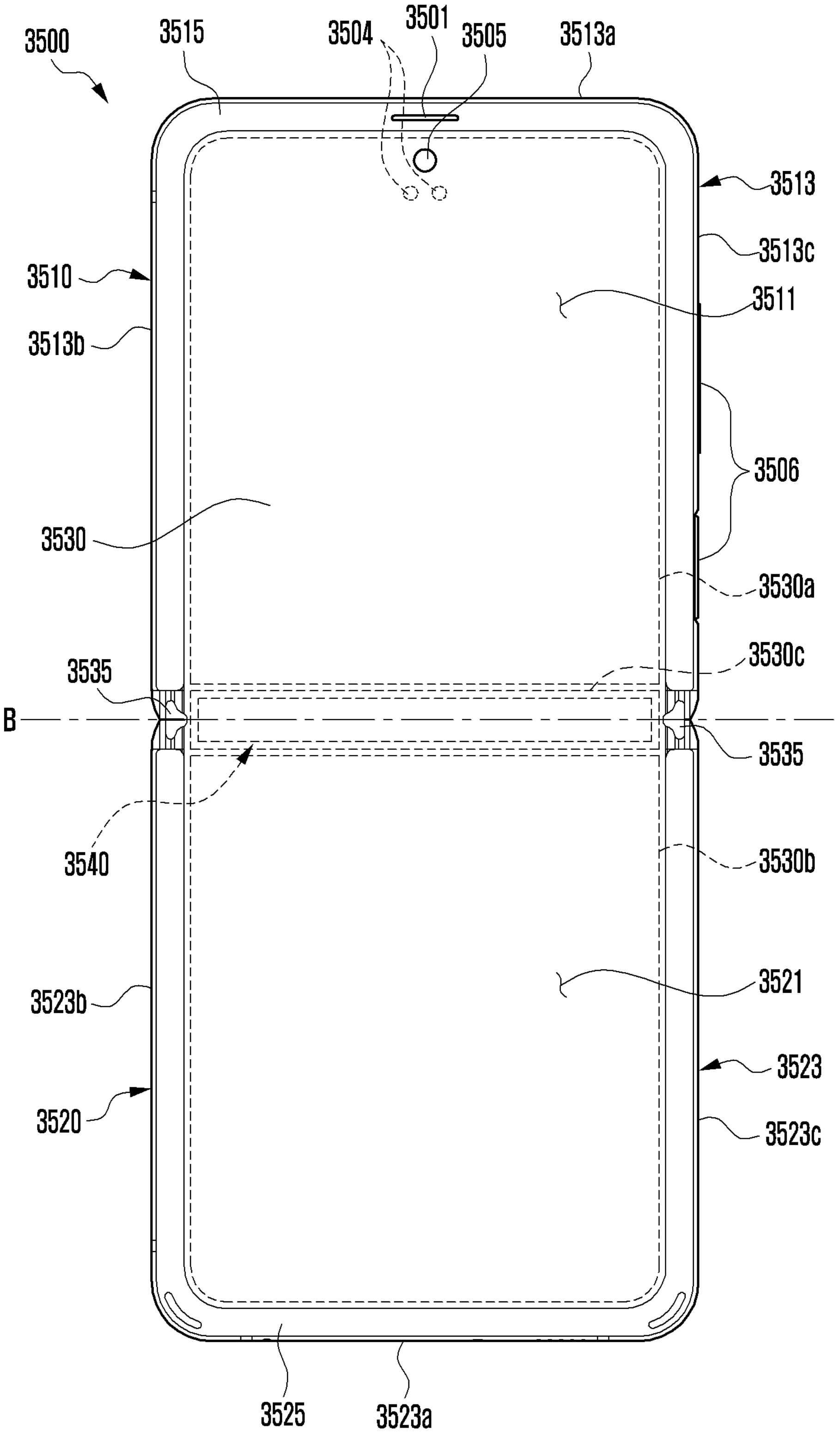
FIG. 35A is a plan view illustrating a front surface of an electronic device according to an embodiment of the disclosure while the electronic device is in an unfolded state.
Figure 35B:
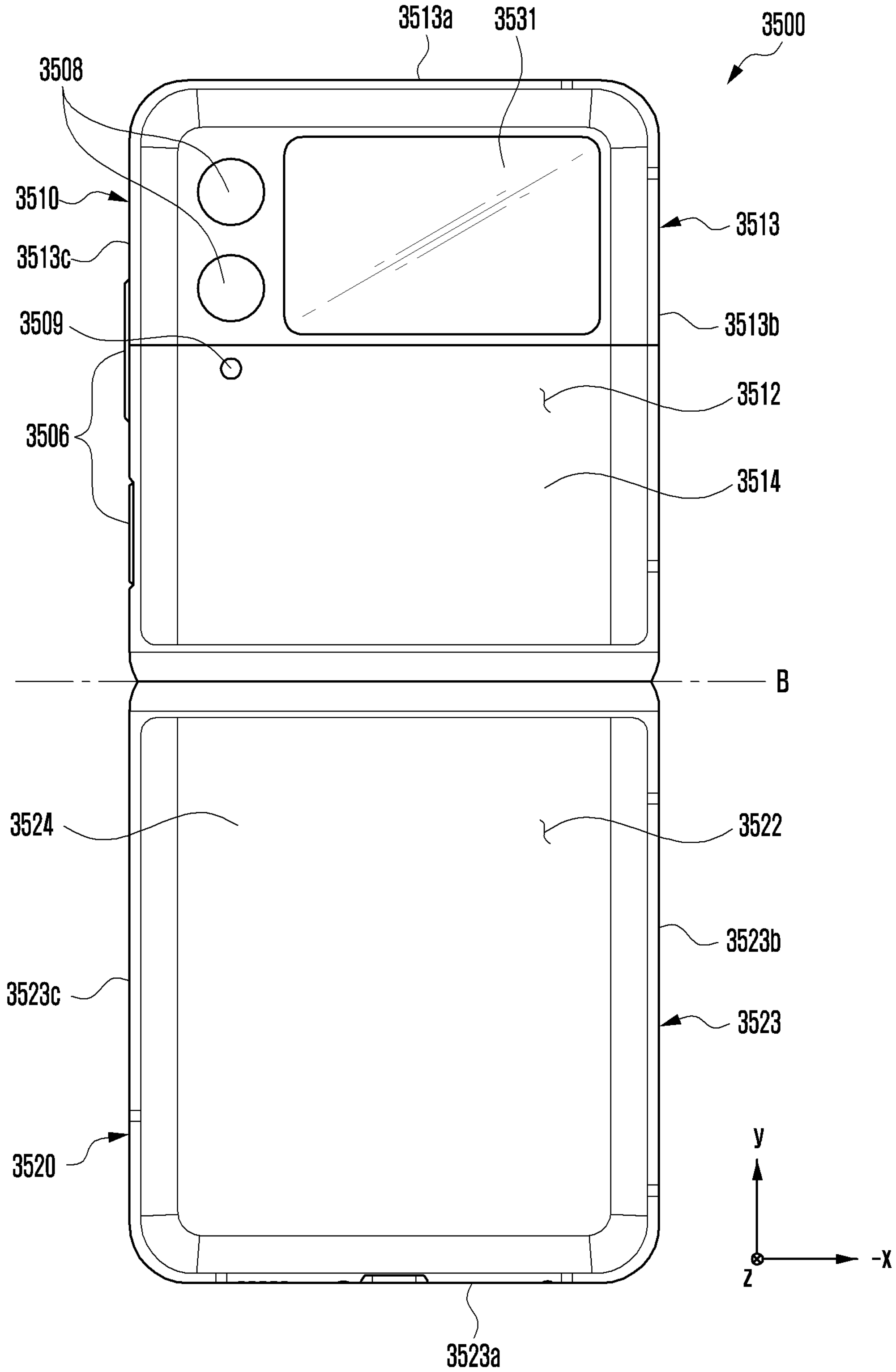
FIG. 35B is a plan view illustrating a rear surface of an electronic device according to an embodiment of the disclosure while the electronic device is in an unfolded state.

FIG. 35A is a plan view illustrating the front of the electronic device 3500 in an unfolded state according to another embodiment of the disclosure. FIG. 35B is a plan view illustrating the back of the electronic device 3500 in an unfolded state according to another embodiment of the disclosure.

Figure 36A:
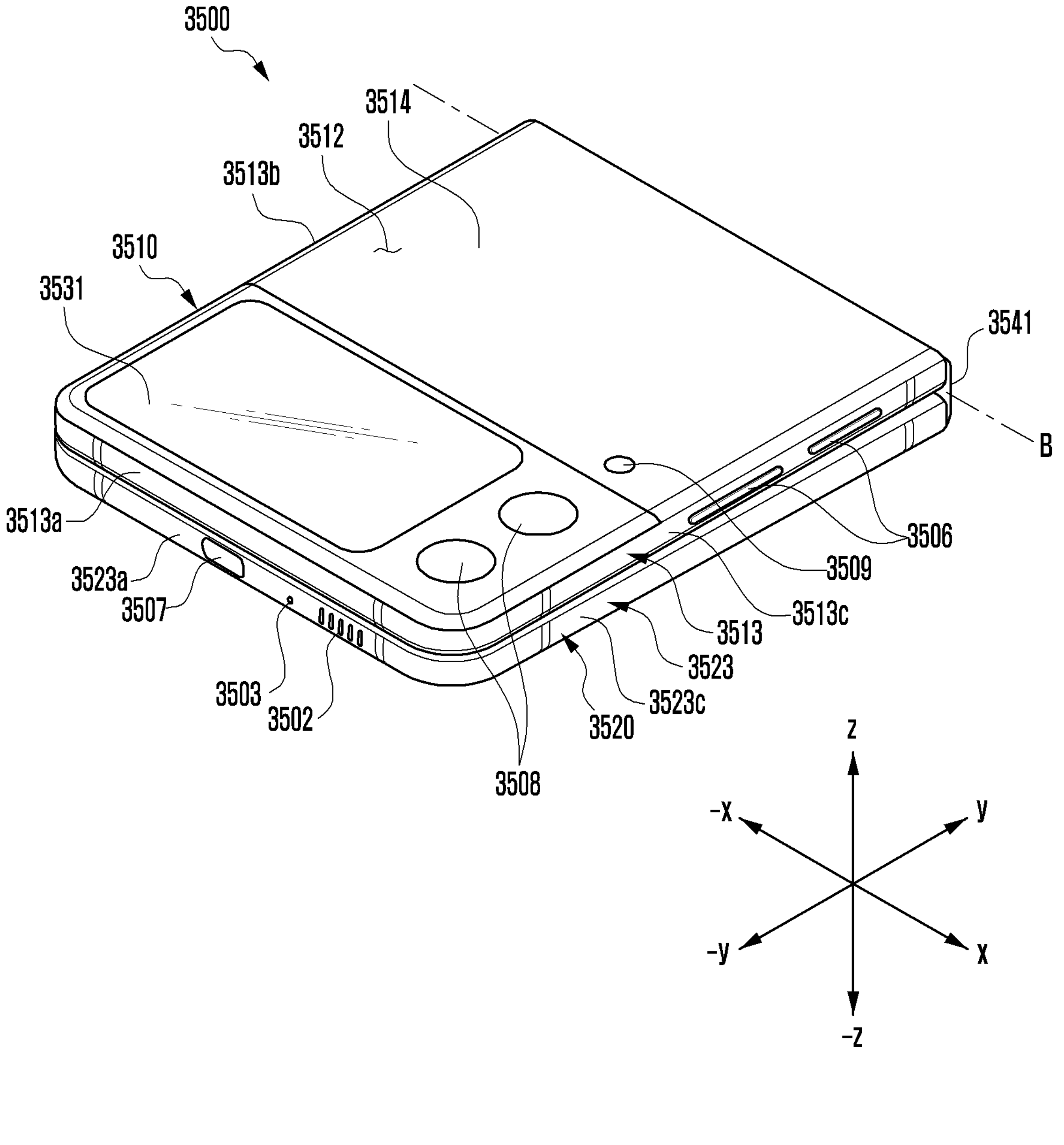
FIG. 36A is a perspective view illustrating a folded state of an electronic device according to an embodiment of the disclosure.
Figure 36B:
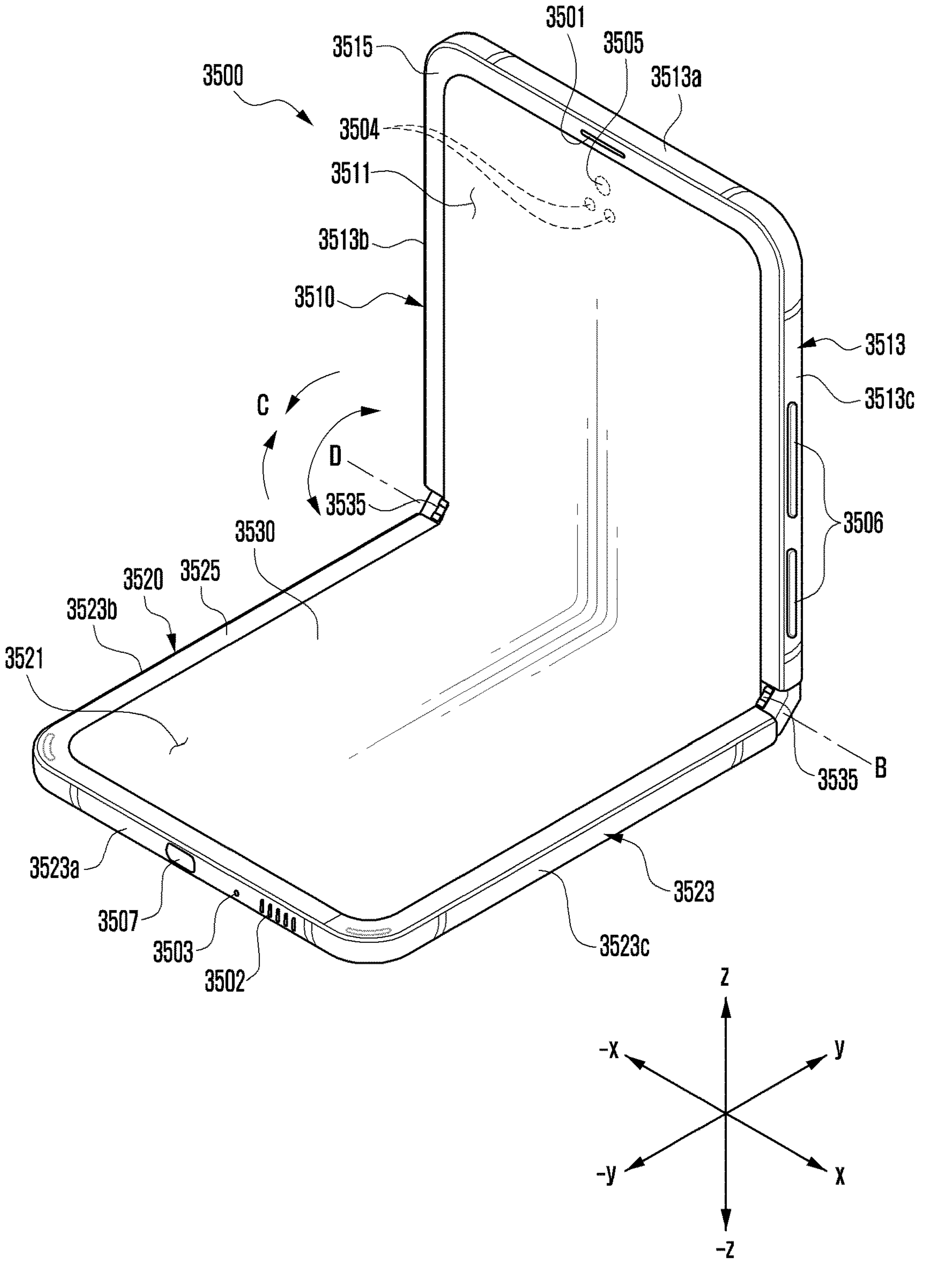
FIG. 36B is a perspective view illustrating an intermediate state of an electronic device according to an embodiment of the disclosure.

FIG. 36A is a perspective view of the electronic device 3500 in a folded state according to another embodiment of the disclosure. FIG. 36B is a perspective view of the electronic device 3500 in an intermediate state according to another embodiment of the disclosure.

An electronic device 3500 illustrated in FIGS. 35A, 35B, 36A, and 36B may be at least partially similar to the electronic device 101 illustrated in FIG. 1, the electronic device 200 illustrated in FIGS. 2A, 2B, 3A, 3B, and 4, or the electronic device 501 illustrated in FIG. 5, or may include a different embodiment.

With reference to FIGS. 35A, 35B, 36A, and 36B, the electronic device 3500 may include a pair of housings 3510 and 3520 (e.g., foldable housings) (e.g., a first housing 210 and a second housing 220 in FIG. 2A) hinge mechanism 340 in FIG. 3B) that are rotatably coupled as to allow folding relative to a hinge mechanism (e.g., hinge mechanism 3540 in FIG. 35A) (e.g., hinge plate 320 in FIG. 4). In certain embodiments, the hinge mechanism 3540 may be provided in the X-axis direction or in the Y-axis direction. In certain embodiments, two or more hinge mechanisms 3540 may be arranged to be folded in a same direction or in different directions. According to an embodiment, the electronic device 3500 may include a flexible display 3530 (e.g., foldable display) (e.g., a first display 230 in FIG. 2A, a first display 531 in FIG. 5) provided in an area formed by the pair of housings 3510 and 3520. According to an embodiment, the first housing 3510 and the second housing 3520 may be provided on both sides about the folding axis (axis B), and may have a substantially symmetrical shape with respect to the folding axis (axis B). According to an embodiment, the angle or distance between the first housing 3510 and the second housing 3520 may vary, depending on whether the state of the electronic device 3500 is a flat or unfolded state, a folded state, or an intermediate state.

According to certain embodiments, the pair of housings 3510 and 3520 may include a first housing 3510 (e.g., first housing structure) coupled to the hinge mechanism 3540, and a second housing 3520 (e.g., second housing structure) coupled to the hinge mechanism 3540. According to an embodiment, in the unfolded state, the first housing 3510 may include a first surface 3511 facing a first direction (e.g., front direction) (z-axis direction), and a second surface 3512 facing a second direction (e.g., rear direction) (negative z-axis direction) opposite to the first surface 3511. According to an embodiment, in the unfolded state, the second housing 3520 may include a third surface 3521 facing the first direction (z-axis direction), and a fourth surface 3522 facing the second direction (negative z-axis direction). According to an embodiment, the electronic device 3500 may be operated in such a manner that the first surface 3511 of the first housing 3510 and the third surface 3521 of the second housing 3520 face substantially the same first direction (z-axis direction) in the unfolded state, and the first surface 3511 and the third surface 3521 face one another in the folded state. According to an embodiment, the electronic device 3500 may be operated in such a manner that the second surface 3512 of the first housing 3510 and the fourth surface 3522 of the second housing 3520 face substantially the same second direction (negative z-axis direction) in the unfolded state, and the second surface 3512 and the fourth surface 3522 face one another in opposite directions in the folded state. For example, in the folded state, the second surface 3512 may face the first direction (z-axis direction), and the fourth surface 3522 may face the second direction (negative z-axis direction).

According to certain embodiments, the first housing 3510 may include a first side member 3513 that at least partially forms an external appearance of the electronic device 3500, and a first rear cover 3514 coupled to the first side member 3513 that forms at least a portion of the second surface 3512 of the electronic device 3500. According to an embodiment, the first side member 3513 may include a first side surface 3513*a*, a second side surface 3513*b* extending from one end of the first side surface 3513*a*, and a third side surface 3513*c* extending from the other end of the first side surface 3513*a*. According to an embodiment, the first side member 3513 may be formed in a rectangular shape (e.g., square or rectangle) through the first side surface 3513*a*, second side surface 3513*b*, and third side surface 3513*c*.

According to certain embodiments, the second housing 3520 may include a second side member 3523 that at least partially forms the external appearance of the electronic device 3500, and a second rear cover 3524 coupled to the second side member 3523, forming at least a portion of the fourth surface 3522 of the electronic device 3500. According to an embodiment, the second side member 3523 may include a fourth side surface 3523*a*, a fifth side surface 3523*b* extending from one end of the fourth side surface 3523*a*, and a sixth side surface 3523*c* extending from the other end of the fourth side surface 3523*a*. According to an embodiment, the second side member 3523 may be formed in a rectangular shape through the fourth side surface 3523*a*, fifth side surface 3523*b*, and sixth side surface 3523*c*.

According to certain embodiments, the pair of housings 3510 and 3520 are not limited to the shape and combinations illustrated herein, and may be implemented with a combination of other shapes or parts. For example, in certain embodiments, the first side member 3513 may be integrally formed with the first rear cover 3514, and the second side member 3523 may be integrally formed with the second rear cover 3524.

According to certain embodiments, the flexible display 3530 may be provided to extend from the first surface 311 of the first housing 3510 across the hinge mechanism 3540 to at least a portion of the third surface 3521 of the second housing 3520. For example, the flexible display 3530 may include a first region 3530*a* substantially corresponding to the first surface 3511, a second region 3530*b* corresponding to the second surface 3521, and a third region 3530*c* (e.g., the bendable region) connecting the first region 3530*a* and the second region 3530*b* and corresponding to the hinge mechanism 3540. According to an embodiment, the electronic device 3500 may include a first protection cover 3515 (e.g., first protection frame or first decoration member) coupled along the periphery of the first housing 3510. According to an embodiment, the electronic device 3500 may include a second protection cover 3525 (e.g., second protection frame or second decoration member) coupled along the periphery of the second housing 3520. According to an embodiment, the first protection cover 3515 and/or the second protection cover 3525 may be formed of a metal or polymer material. According to an embodiment, the first protection cover 3515 and/or the second protection cover 3525 may be used as a decorative member. According to an embodiment, the flexible display 3530 may be positioned such that the periphery of the first region 3530*a* is interposed between the first housing 3510 and the first protection cover 3515. According to an embodiment, the flexible display 3530 may be positioned such that the periphery of the second region 3530*b* is interposed between the second housing 3520 and the second protection cover 3525. According to an embodiment, the flexible display 3530 may be positioned such that the periphery of the flexible display 3530 corresponding to a protection cap 3535 is protected through the protection cap provided in a region corresponding to the hinge mechanism 3540. Consequently, the periphery of the flexible display 3530 may be substantially protected from the outside. According to an embodiment, the electronic device 3500 may include a hinge housing 3541 (e.g., hinge cover) that is provided so as to support the hinge mechanism 3540. The hinge housing 3541 may further be exposed to the outside when the electronic device 3500 is in the folded state, and be invisible as viewed from the outside when retracted into a first space (e.g., internal space of the first housing 3510) and a second space (e.g., internal space of the second housing 3520) when the electronic device 3500 is in the unfolded state. In certain embodiments, the flexible display 3530 may be provided to extend from at least a portion of the second surface 3512 to at least a portion of the fourth surface 3522. In this case, the electronic device 3500 may be folded so that the flexible display 3530 is exposed to the outside (out-folding scheme).

According to certain embodiments, the electronic device 3500 may include a sub-display 3531 (e.g., a second display 533 in FIG. 5) provided separately from the flexible display 3530. According to an embodiment, the sub-display 3531 may be provided to be at least partially exposed on the second surface 3512 of the first housing 3510, and may display status information of the electronic device 3500 in place of the display function of the flexible display 3530 in case of the folded state. According to an embodiment, the sub-display 3531 may be provided to be visible from the outside through at least some region of the first rear cover 3514. In certain embodiments, the sub-display 3531 may be provided on the fourth surface 3522 of the second housing 3520. In this case, the sub-display 3531 may be provided to be visible from the outside through at least some region of the second rear cover 3524.

According to certain embodiments, the electronic device 3500 may include at least one of an input device 3503 (e.g., microphone), sound output devices 3501 and 3502, a sensor module 3504, camera devices 3505 and 3508, a key input device 3506, or a connector port 3507. In the illustrated embodiment, the input device 3503 (e.g., microphone), sound output devices 3501 and 3502, sensor module 3504, camera devices 3505 and 3508, a flash 3509 key input device 3506, and connector port 3507 indicate a hole or shape formed in the first housing 3510 or the second housing 3520, but may be defined to include a substantial electronic component (e.g., input device, sound output device, sensor module, or camera device) that is provided inside the electronic device 3500 and operated through a hole or a shape.

According to certain embodiments, the input device 3503 (e.g., microphone), the sound output devices 3501 and 3502, the sensor module 3504, the camera devices 3505 and 3508, the flash 3509, the key input device 3506, or the connector port 3507 is same as the input device 215, the sound output devices 227 and 228, the sensor modules 217*a*, 217*b*, and 226, the camera modules 216*a*, 216*b*, and 225, the flash 218, the key input device 219, or the connector port 229 illustrated in FIGS. 2A and 2B described above, a description thereof will be omitted.

With reference to FIG. 36B, the electronic device 3500 may be operated to remain in an intermediate state through the hinge mechanism (e.g., hinge device 3540 in FIG. 35A). In this case, the electronic device 3500 may control the flexible display 3530 to display different pieces of content on the display area corresponding to the first surface 3511 and the display area corresponding to the third surface 3521. According to an embodiment, the electronic device 3500 may be operated substantially in an unfolded state (e.g., unfolded state of FIG. 35A) and/or substantially in a folded state (e.g., folded state of FIG. 36A) with respect to a specific inflection angle (e.g., angle between the first housing 3510 and the second housing 3520 in the intermediate state) through the hinge mechanism (e.g., hinge mechanism 3540 in FIG. 35A). For example, when a pressing force is applied in the unfolding direction (D direction) in a state where the electronic device 3500 is unfolded at a specific inflection angle, through the hinge mechanism (e.g., hinge mechanism 3540 in FIG. 35A), the electronic device 3500 may be transitioned to an unfolded state (e.g., unfolded state of FIG. 35A). For example, when a pressing force is applied in the folding direction (C direction) in a state where the electronic device 3500 is unfolded at a specific inflection angle, through the hinge mechanism (e.g., hinge mechanism 3540 in FIG. 35A), the electronic device 3500 may be transitioned to a closed state (e.g., folded state of FIG. 36A). In an embodiment, the electronic device 3500 may be operated to remain in an unfolded state at various angles through the hinge mechanism (e.g., hinge mechanism 3540 in FIG. 35A).

Figure 37:
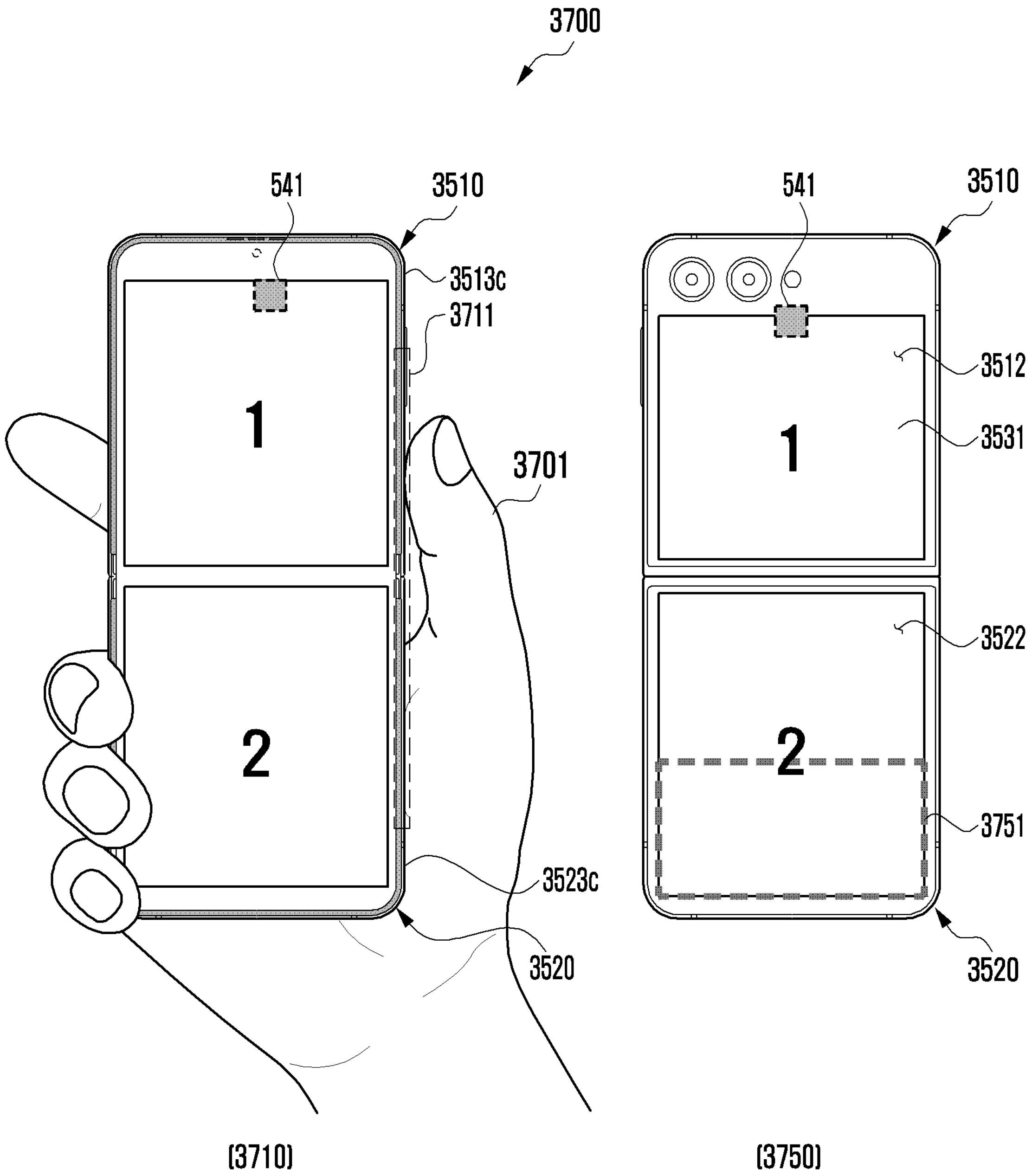
FIG. 37 illustrates a method for correcting sensor data of a user interaction according to an embodiment of the disclosure.

FIG. 37 includes a view 3700 for illustrating a method for correcting sensor data of a user interaction according to an embodiment of the disclosure.

Referring to FIG. 37, an electronic device (e.g., the electronic device 3500 in FIG. 35A) may acquire sensor information through a sensor circuit (e.g., the sensor circuit 540 in FIG. 5) in an unfolded state (e.g., the state in FIGS. 35A and 35B). For example, the sensor circuit 540 may include an inertial sensor (e.g., the inertial sensor 541 in FIG. 5) and/or a grip sensor (e.g., the grip sensor 543 in FIG. 5).

In an embodiment, the processor 550 may detect, based on the sensor information acquired through the sensor circuit 540, a grip state of the electronic device 3500 and/or a user interaction on a rear surface (e.g., the second surface 3512 or the fourth surface 3522) of the electronic device 3500. The processor 550 may identify the type of the detected user interaction and/or location information where the user interaction has been detected.

In an embodiment, the inertial sensor 541 may be provided in an inner space of the first housing 3510 of the electronic device 3500. The processor (e.g., the processor 550 in FIG. 5) may acquire information related to the posture of the electronic device 3500 and/or sensor information related to the movement of the electronic device 3500 through the inertial sensor 541.

In an embodiment, the grip sensor 543 may be provided on at least a partial area of a side surface of the electronic device 3500. For example, the grip sensor 543 may include a first grip sensor 3711, which is provided on a partial area of the third side surface 3513*c* of the first housing 3510 and a partial area of the sixth side surface 3523*c* of the second housing 3520, and a second grip sensor 3751, which is provided in a partial area of the fourth surface 3522 of the second housing 3520.

In an embodiment, the processor 550 may estimate (or predict), based on sensor information acquired through the inertial sensor 541, the first grip sensor 3711, and/or the second grip sensor 3751, information about the grip state of the electronic device 3500, the type of detected user interaction, and/or location information where the user interaction has been detected, and may correct sensor data of the detected user interaction.

Figure 38:
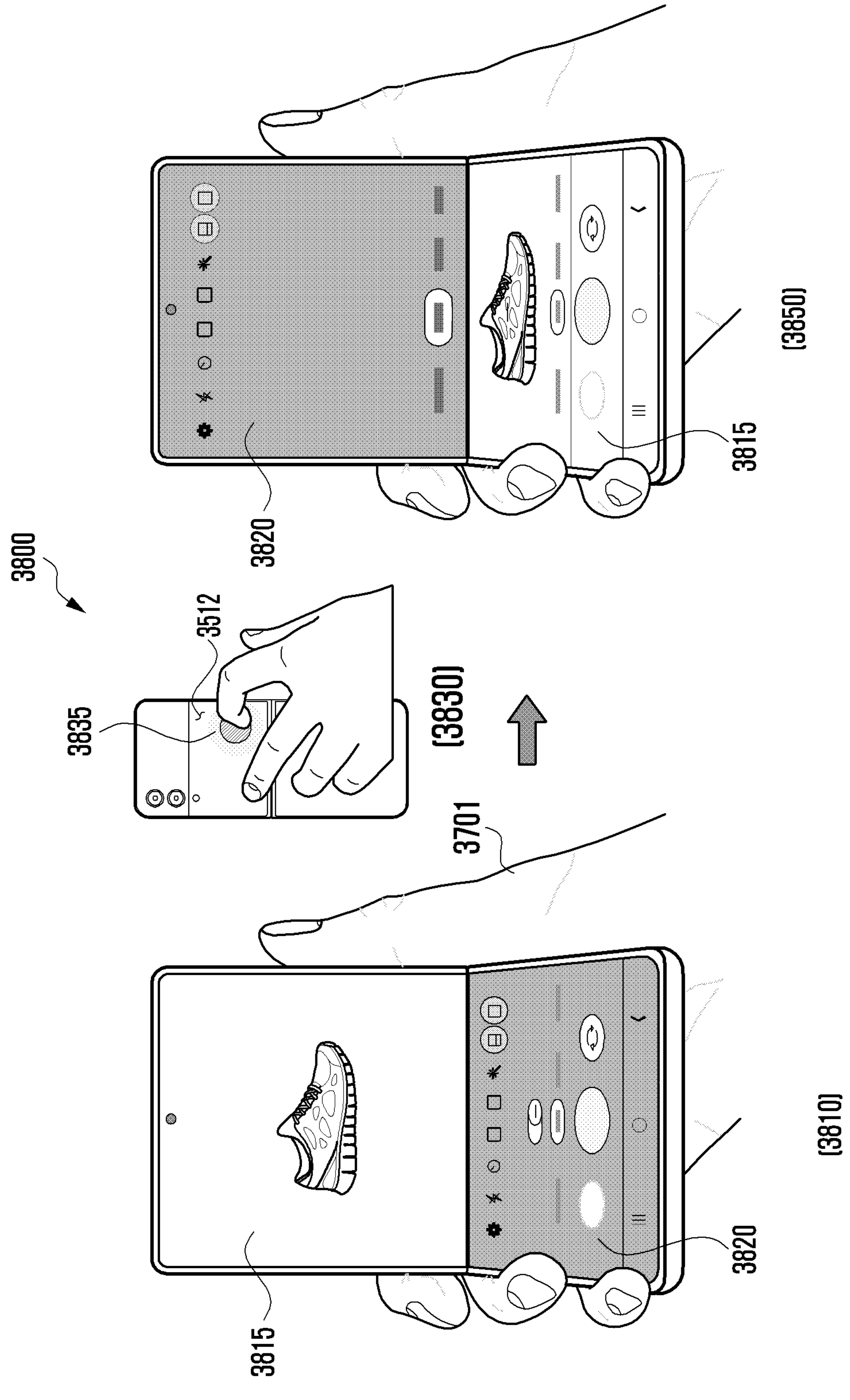
FIG. 38 illustrates a method for controlling a screen according to a user interaction according to an embodiment of the disclosure.

FIG. 38 includes a view 3800 for illustrating a method for controlling a screen according to a user interaction according to an embodiment of the disclosure.

Referring to FIG. 38, as illustrated in reference numeral <3810>, an electronic device (e.g., the electronic device 3500 in FIG. 35A) may be in an intermediate state (e.g., the state in FIG. 36B) in which a screen of a camera application is displayed on a first display (e.g., the first display 3530 in FIG. 35A).

In an embodiment, a processor (e.g., the processor 550 in FIG. 5) may display a preview image 3815 acquired through a camera (e.g., the camera devices 3505 and 3508 in FIGS. 35A and 35B) in a first area (e.g., an upper area) of the first display 3530 of the electronic device 3500, and may display, in a second area (e.g., a lower area), a screen 3820 including at least one item for controlling a camera function.

In an embodiment, the processor 550 may acquire sensor information through a sensor circuit (e.g., the sensor circuit 540 in FIG. 5), for example, an inertial sensor (e.g., the inertial sensor 541 in FIG. 5) and/or a grip sensor (e.g., the grip sensor 543 in FIG. 5). The processor 550 may detect, based on the sensor information acquired through the sensor circuit 540, the posture of the electronic device 3500, the movement of the electronic device 3500, the grip state of the electronic device 3500, and a user interaction on the second surface 3512 or the fourth surface 3522. The processor 550 may correct sensor data of the detected user interaction, based on the posture of the electronic device 3500, the movement of the electronic device 3500, and/or the grip state of the electronic device 3500, and may identify, based on the corrected sensor data, the type of the detected user interaction and/or location information where the user interaction has been detected.

In an embodiment, as illustrated in reference numeral <3830>, the processor 550 may detect a user interaction 3835 in a partial area of the second surface 3512 of the electronic device 3500.

In an embodiment, based on the type of the user interaction 3835 and location information where the user interaction 3835 has been detected, the processor 550 may change a display attribute of the camera application screen displayed on the first display 3530.

In FIG. 38 according to various embodiments, a description will be made assuming that the type of the user interaction 3835 is a double tap and that a display area (e.g., a window) is changed based on the detection of the double tap on the second surface 3512 of the first housing 3510.

In an embodiment, as illustrated in reference numeral <3850>, based on the detection of the double tap 3835 on the second side 3512 of the first housing 3510, the processor 550 may display, in the first area (e.g., the upper area) of the first display 3530, the screen 3820 including at least one item for controlling a camera function, and may display, in the second area (e.g., the lower area), the preview image 3815 acquired through the camera (e.g., the camera devices 3505 and 3508 in FIGS. 35A and 35B).

Figure 39:
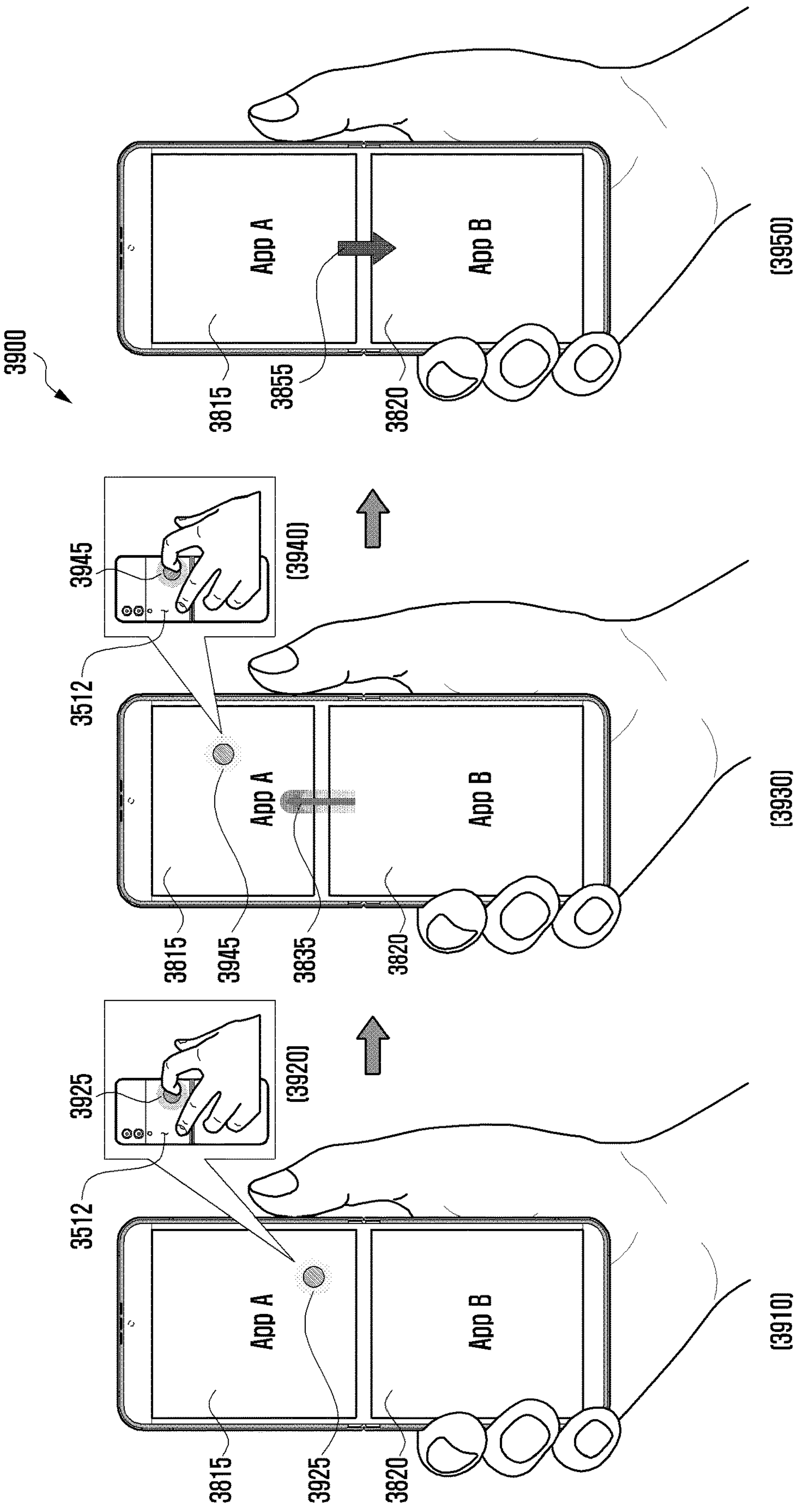
FIG. 39 illustrates a method for controlling a screen according to a user interaction according to an embodiment of the disclosure.

FIG. 39 includes a view 3900 for illustrates a method for controlling a screen according to a user interaction according to an embodiment of the disclosure.

Referring to FIG. 39, as illustrated in reference numeral <3910>, when an electronic device (e.g., the electronic device 3500 in FIG. 35A) is in an unfolded state (e.g., the state in FIGS. 35A and 35B), first information 3815 corresponding to application A may be displayed in a first area (e.g., an upper area) of a first display (e.g., the first display 3530 in FIG. 35A), and second information 3820 corresponding to application B may be displayed in a second area (e.g., a lower area).

In an embodiment, the processor 550 may acquire sensor information through a sensor circuit (e.g., the sensor circuit 540 in FIG. 5), for example, an inertial sensor (e.g., the inertial sensor 541 in FIG. 5) and/or a grip sensor (e.g., the grip sensor 543 in FIG. 5). The processor 550 may detect, based on the sensor information acquired through the sensor circuit 540, the posture of the electronic device 3500, the movement of the electronic device 3500, the grip state of the electronic device 3500, and a user interaction on a second surface (e.g., the second surface 3512 in FIG. 35B or a fourth surface (e.g., the fourth surface 3522 in FIG. 35B). The processor 550 may correct sensor data of the detected user interaction, based on the posture of the electronic device 3500, the movement of the electronic device 3500, and/or the grip state of the electronic device 3500, and may identify, based on the corrected sensor data, the type of the detected user interaction and/or location information where the user interaction has been detected.

In an embodiment, as illustrated in reference numeral <3920>, the processor 550 may detect a user interaction 3925 in a partial area of the second surface 3512 of the electronic device 3500.

In an embodiment, based on the type of the user interaction 3925 and location information where the user interaction 3925 has been detected, the processor 550 may change a display attribute of an application displayed on the first display 3530.

In FIG. 39 according to various embodiments, a description will be made assuming that the type of the user interaction 3925 is a double tap or a triple tap and that the size of an area in which application information is displayed is adjusted based on the detection of the double tap or the triple tap on the second surface 3512 of the first housing 3510.

In an embodiment, based on the detection of the double tap 3925 on the second side 3512 of the first housing 3510, the processor 550 may adjust (3835) the size of the first area (e.g., the upper area) displaying the first information 3815 corresponding to application A to a second size smaller than a first size and the size of the second area (e.g., the lower area) displaying the second information 3820 corresponding to application B to a third size larger than the first size as illustrated in reference numeral <3930>.

In an embodiment, based on the detection of a triple tap 3945 on the second face 3512 of the first housing 3510 as illustrated in reference numeral <3940>, the processor 550 may adjust (3855) the size of the first area (e.g., the upper area) displaying the first information 3815 corresponding to application A to the first size larger than the second size and the size of the second area (e.g., the lower area) displaying the second information 3820 corresponding to application B to the first size smaller than the third size as illustrated in reference numeral <3950>.

In FIGS. 2A to 39 according to various embodiments, the electronic device has been described as the foldable electronic device 200 or 3500, but the disclosure is not limited thereto. For example, the electronic device may include a slidable electronic device. In this regard, various embodiments will be described with reference to FIGS. 40A and 40B to be described later.

Figure 40A:
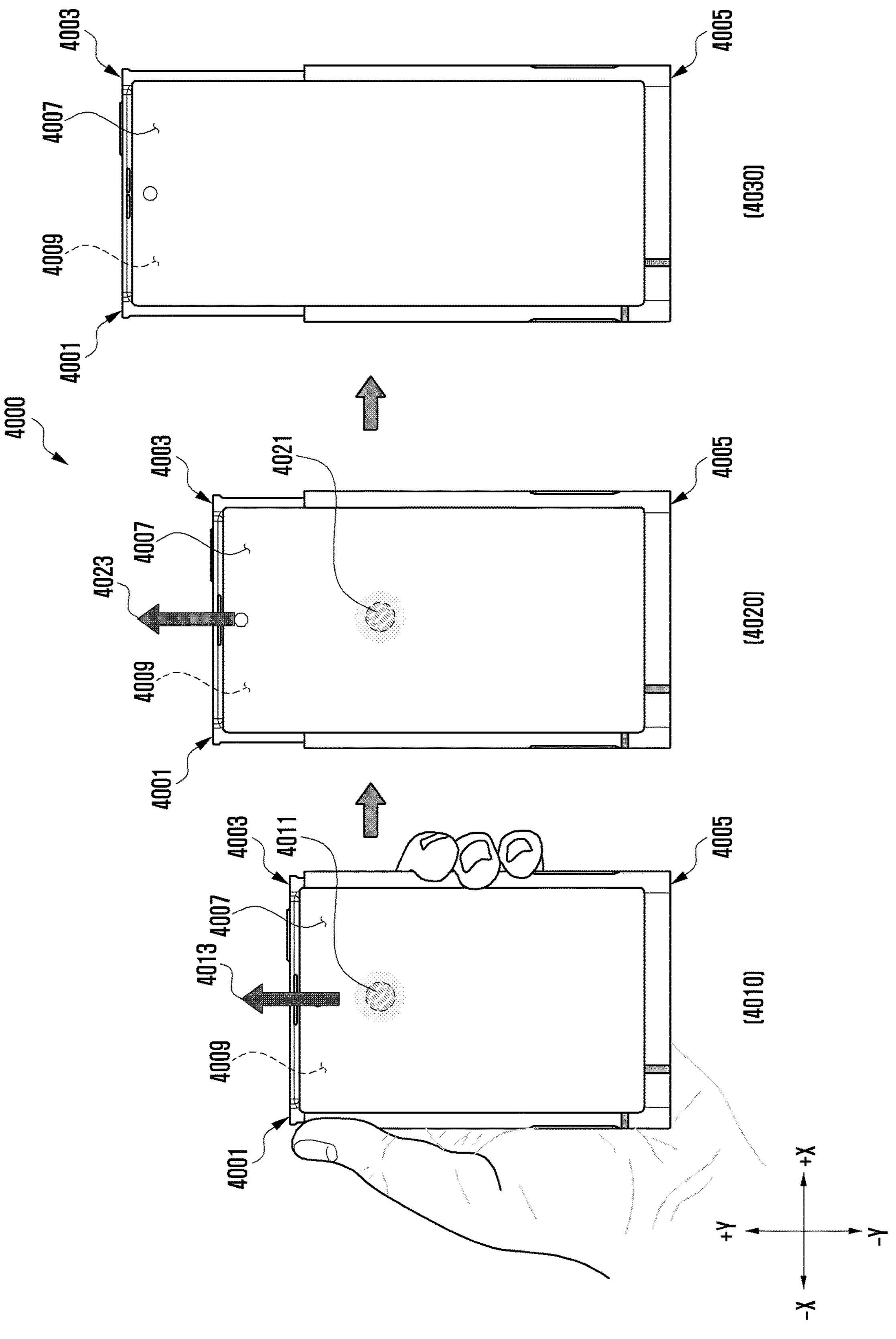
FIGS. 40A and 40B illustrate a method for controlling a screen according to a user interaction according to an embodiment of the disclosure.
Figure 40B:
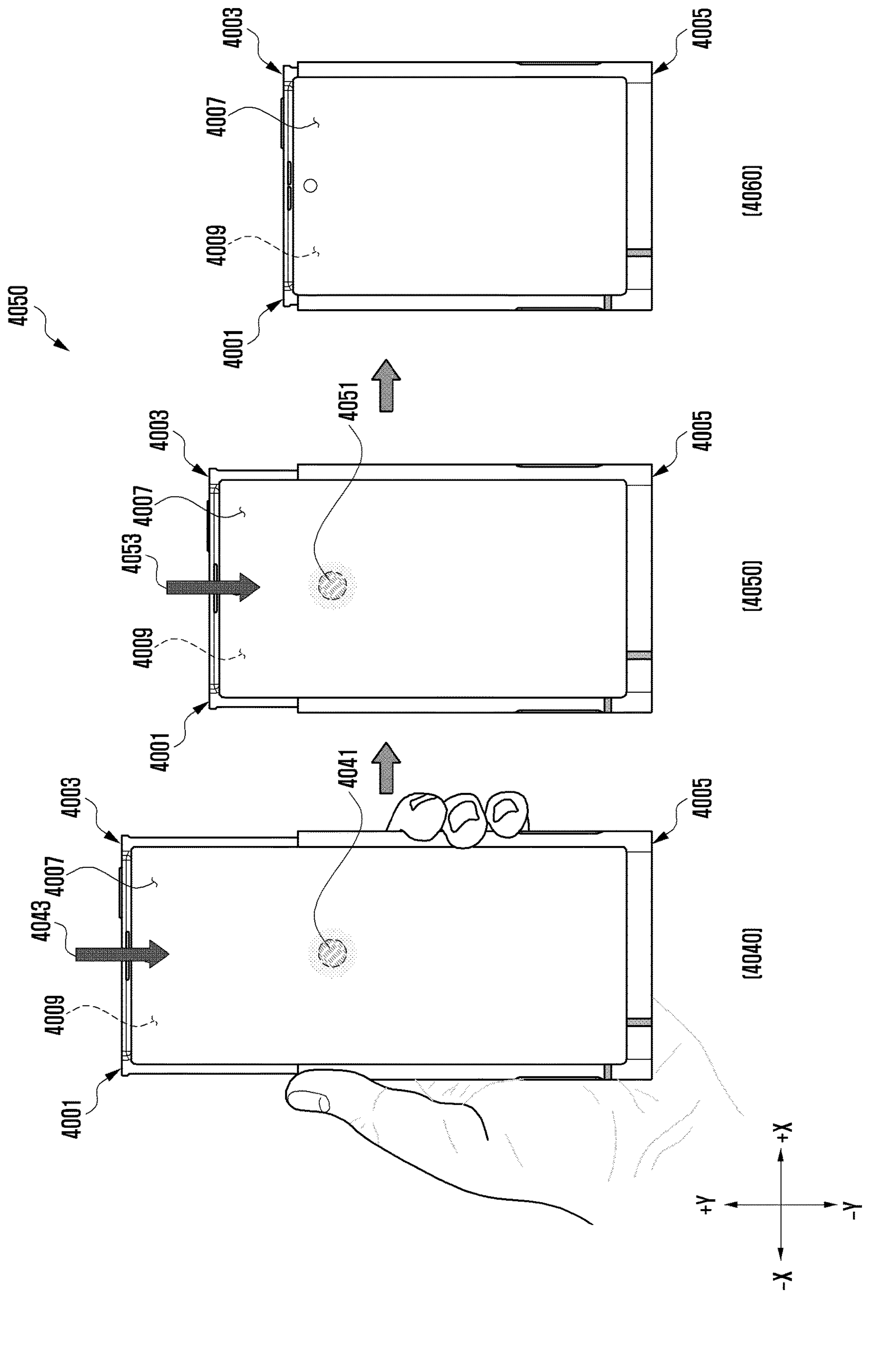

FIGS. 40A and 40B are views 4000 and 4050 illustrating a method for controlling a screen according to a user interaction according to an embodiment of the disclosure.

An electronic device illustrated in FIGS. 40A and 40B according to various embodiments may be a slidable electronic device.

An electronic device 4001 illustrated in FIGS. 40A and 40B may be at least partially similar to the electronic device 101 illustrated in FIG. 1, the electronic device 200 illustrated in FIGS. 2A, 2A, 2B, 3A, 3B, and 4, the electronic device 501 illustrated in FIG. 5, or the electronic device 3500 illustrated in FIGS. 35A, 35B, 36A, and 36B, or may include a different embodiment.

Referring to FIGS. 40*a* and 40B, the electronic device 4001 may include a first housing 4003, a second housing 4005 slidably coupled to the first housing 4003 in a designated direction (e.g., the ±y-axis direction), and a flexible display 4007 provided to be supported by at least a portion of each of the first housing 4003 and the second housing 4005. According to an embodiment, the first housing 4003 may include a first housing structure, a moving part, or a slide housing, the second housing 4005 may include a second housing structure, a fixed part, or a base housing, and the flexible display 4007 may include an expandable display or a stretchable display. According to an embodiment, the electronic device 4001 may be configured such that with respect to the second housing 4005 grasped by a user, the first housing 4003 is slid out in a first direction (e.g., the y-axis direction) or slid in in a second direction (e.g., the −y-axis direction) opposite to the first direction (e.g., the y-axis direction).

In an embodiment, as illustrated in reference numeral <4010>, the electronic device 4001 may be in a slide-in state. For example, the slide-in state may imply a state in which the first housing 4003 is slid in the inner space of the second housing 4005.

In an embodiment, in a state in which the electronic device 4001 is slid in, a processor (e.g., the processor 550 in FIG. 5) may acquire sensor information through a sensor circuit (e.g., the sensor circuit 540 in FIG. 5), for example, an inertial sensor (e.g., the inertial sensor 541 in FIG. 5) and/or a grip sensor (e.g., the grip sensor 543 in FIG. 5). The processor 550 may detect a grip state of the electronic device 4001 and a user interaction 4011 on a rear surface 4009, based on the sensor information acquired through the sensor circuit 540. The processor 550 may identify information about the posture of the electronic device 4001, the movement of the electronic device 4001, the grip state of the electronic device 4001, the type of the detected user interaction 4011, and/or a location where the user interaction 4011 has been detected.

In an embodiment, the processor 550 may change the state of the electronic device 4001 based on the type of the user interaction 4011 and the location information in which the user interaction 4011 has been detected.

In FIGS. 40A and 40B according to various embodiments, a description will be made assuming that the type of the user interaction 4011 is a double tap or a triple tap and that the state of the electronic device 4001 is changed from a slide-in state to a slide-out state or from a slide-out state to a slide-in state, based on detection of the double tap or the triple tap on the rear surface 4009 of the electronic device 4001. However, the disclosure is not limited thereto, and functions that can be performed according to the type of user interaction may include an application termination function, an application re-execution function, a screen rotation function, a function of displaying a full screen, a function of changing an application, or a function of displaying a pop-up window.

In an embodiment, the processor 550 may switch the electronic device 4001 to a slide-out state, based on the detection of the double tap 4011 on the rear surface 4009 of the electronic device 4001. For example, based on the detection of the double tap 4011 on the rear surface 4009 of the electronic device 4001, the processor 550 may move (4013) the first housing 4003 from the second housing 4005 in a sliding manner along a designated direction (e.g., the y-axis direction). Accordingly, as illustrated in reference numeral <4020>, the display area of the flexible display 4007 may be varied (e.g., expanded).

In an embodiment, as illustrated in reference numeral <4020>, the processor 550 may switch the electronic device 4001 to a slide-out state, based on the detection of a double tap 4021 on the rear surface 4009 of the electronic device 4001. For example, based on the detection of the double tap 4021 on the rear surface 4009 of the electronic device 4001, the processor 550 may move (4023) the first housing 4003 from the second housing 4005 in a sliding manner along a designated direction (e.g., the y-axis direction). Accordingly, as illustrated in reference numeral <4030>, the display area of the flexible display 4007 may be varied (e.g., expanded).

In an embodiment, as illustrated in reference numeral <4040>, the processor 550 may switch the electronic device 4001 to a slide-in state, based on detection of a triple tap 4041 on the rear surface 4009 of the electronic device 4001. For example, based on the detection of the triple tap 4041 on the rear surface 4009 of the electronic device 4001, the processor 550 may move (4043) the first housing 4003 to the second housing 4005 in a sliding manner along a direction designated direction (e.g., the −y axis direction). Accordingly, as illustrated in reference numeral <4050>, the display area of the flexible display 4007 may be varied (e.g., reduced).

In an embodiment, as illustrated in reference numeral <4050>, the processor 550 may switch the electronic device 4001 to a slide-in state, based on the detection of a triple tap 4051 on the rear surface 4009 of the electronic device 4001. For example, based on the detection of the triple tap 4051 on the rear surface 4009 of the electronic device 4001, the processor 550 may move (4053) the first housing 4003 to the second housing 4005 in a sliding manner along a designated direction (e.g., the −y axis direction). Accordingly, as illustrated in reference numeral <4060>, the display area of the flexible display 4007 may be varied (e.g., reduced).

According to another embodiment, the display area of the flexible display 4007 may be further divided into multiple areas (e.g., a first area and a second area) and the display information displayed in each of the multiple areas may be changed based on the detection of the user interaction on the rear surface 4009 of the electronic device 4001. Moreover, the detection of the user interaction on the rear surface 4009 may be corrected based on the physical state and/or characteristics of the electronic device 4001 (e.g., slide-in state or slide-out state).

Figure 41:
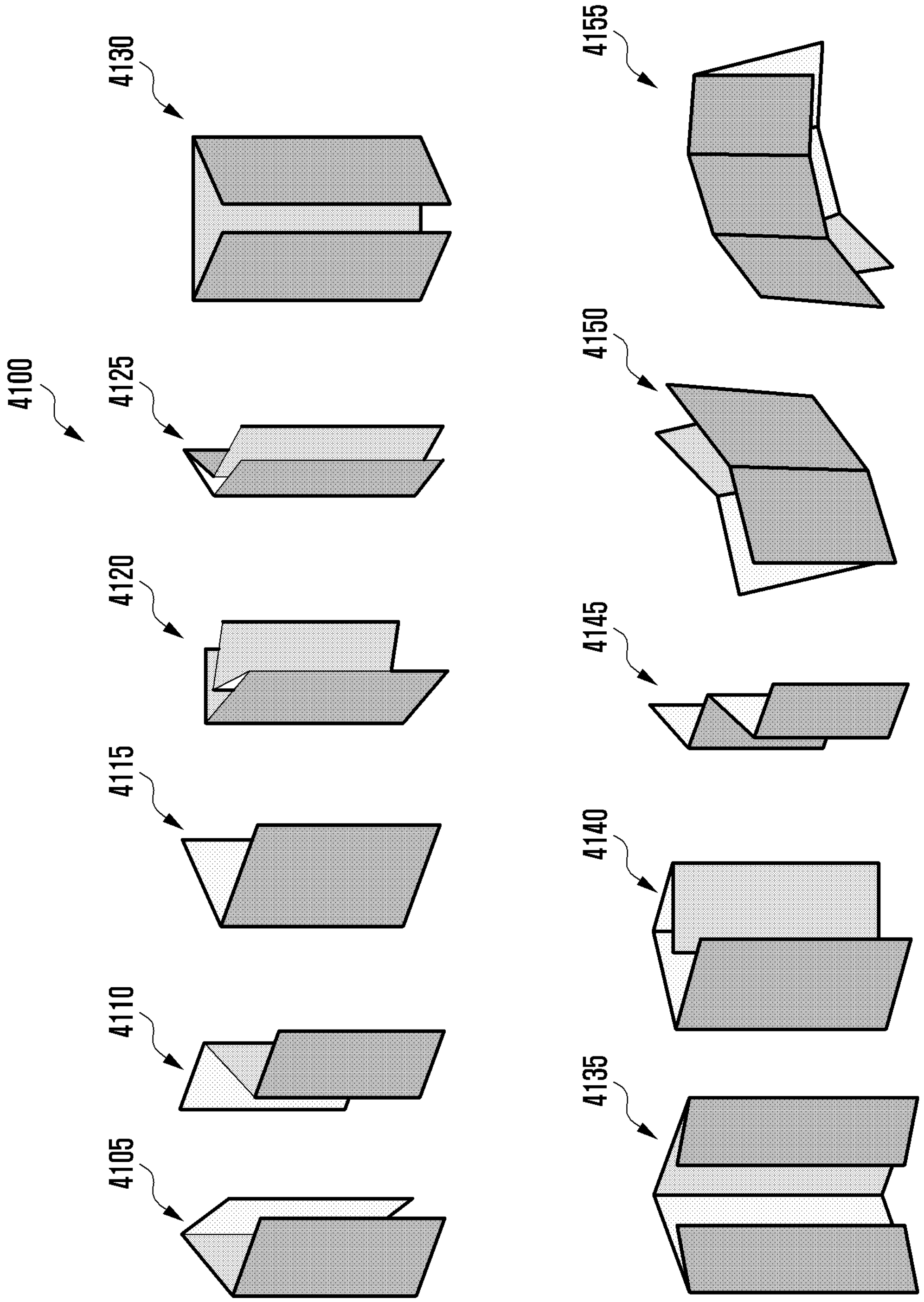
FIG. 41 illustrates various form factors of an electronic device according to an embodiment of the disclosure.

FIG. 41 includes a view 4100 for illustrating various form factors of the electronic device 501 according to an embodiment of the disclosure.

For example, FIG. 41 illustrates examples of various form factors of an electronic device (e.g., the electronic device 501 in FIG. 5) having various display forms.

In an embodiment, the electronic device 501 may include various form factors such as foldables 4105 to 4155.

In an embodiment, as illustrated in FIG. 41, the electronic device 501 may be implemented in various forms, and a display (e.g., the display 530 in FIG. 5) may be provided in various ways depending on the implementation form of the electronic device 501.

In an embodiment, the electronic device 501 (e.g., foldable electronic devices 4105 to 4155) may refer to an electronic device which is foldable so that two different areas of a display (e.g., the display 530 in FIG. 5) face each other substantially or face directions opposite to each other. In general, in a portable state, the display (e.g., the display 530 in FIG. 5) of the electronic device 501 (e.g., the foldable electronic devices 4105 to 4155) is folded so that two different areas face each other or face directions opposite to each other, and in an actual use state, a user may unfold the display so that the two different areas substantially form a flat surface.

In an embodiment, the electronic device 501 (e.g., foldable devices 4105 to 4155) may include a form factor (e.g., 4115) including two display surfaces (e.g., a first display surface and a second display surface) based on one folding axis, and/or a form factor (e.g., 4105, 4110, 4120, 4125, 4130, 4135, 4140, 4145, 4150, or 4155) including at least three display surfaces (e.g., a first display surface, a second display surface, and a third display surface) based on at least two folding axes.

Various embodiments are not limited thereto, and the number of folding axes that the electronic device 501 is not limited. According to an embodiment, depending on the implementation form of the electronic device 501, the display (e.g., the display 530 in FIG. 5) may be folded or unfolded in various ways (e.g., in-folding or out-folding).

Figure 42:
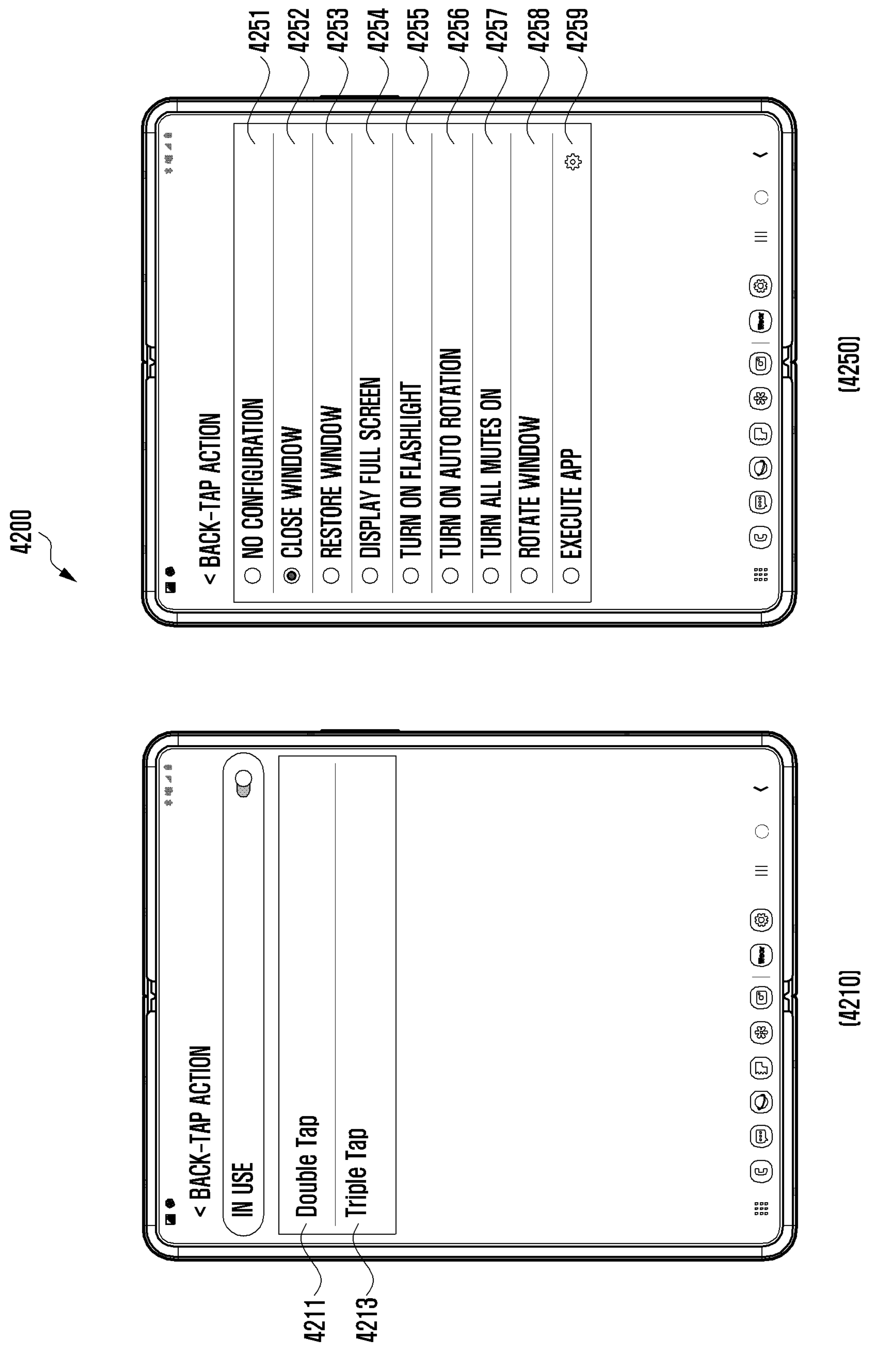
FIG. 42 illustrates a method for configuring a function according to a user interaction according to an embodiment of the disclosure.

FIG. 42 includes a view 4200 for illustrating a method for configuring a function according to a user interaction according to an embodiment of the disclosure.

Referring to FIG. 42, in an unfolded state of an electronic device (e.g., the electronic device 501 in FIG. 5), a processor (e.g., the processor 550 in FIG. 5) may detect an input for configuring a function according to a user interaction. For example, the input for configuring a function according to a user interaction may include an input for selecting an item for configuring a function according to a user interaction and/or a designated input (e.g., a designated gesture or an input detected by a designated input module (e.g., the input module 150 in FIG. 1) mapped to configure a function according to a user interaction).

In an embodiment, based on the detection the input for configuring a function according to a user interaction, the processor 550 may display a first screen 4210 (or a first user interface) for configuring the function according to the user interaction on a first display (e.g., the first display 531 in FIG. 5). The first screen may include a first item 4211 for configuring a function according to a double tap and a second item 4213 for configuring a function according to a triple tap. However, the disclosure is not limited to the items illustrated in FIG. 42. For example, the processor 550 may further display an item for configuring a function according to a user interaction other than a double tap or a triple tap.

In an embodiment, the processor 550 may detect an input for selecting the first item 4211 or the second item 4213 on the first screen. In an embodiment, based on the detection of the input to select one of the first item 4211 or the second item 4213, the processor 550 may display a second screen 4250 (or a second user interface) including a list of configurable functions. For example, the list of functions may include a menu 4251 with no function configuration, a window closing function 4252, a window restoration function 4253, a full screen display function 4254, a flashlight turning-on function 4255, an auto rotation turning-on function 4256, an all mute turning-on function 4257, a window rotation function 4258, and/or an app execution function 4259. However, the disclosure is not limited to the items illustrated in FIG. 42.

The electronic device 501 according to various embodiments may provide convenient usability to a user by changing and displaying a display attribute of application information displayed on the display, based on a user interaction detected on a rear surface of the electronic device 501 in addition to a direct user input (e.g., a touch input) using the first display 531 or the second display 533.

A method for controlling a screen according to a user interaction by an electronic device 501 according to an embodiment of the disclosure may include displaying first information corresponding to a first application on a first display 531. In an embodiment, the method for controlling the screen according to the user interaction may include displaying second information corresponding to a second application and the first information corresponding to the first application on the first display 531 through multiple windows in response to an input for executing the second application. In an embodiment, the method for controlling the screen according to the user interaction may include acquiring sensor information through a sensor circuit 540. In an embodiment, the method for controlling the screen according to the user interaction may include identifying, when a user interaction on a second surface 212 or a fourth surface 222 of the electronic device 501 is identified to be detected based on the sensor information acquired through the sensor circuit 540, a type of the user interaction and location information where the user interaction is detected. In an embodiment, the method for controlling the screen according to the user interaction may include changing a display attribute of at least one of the first information corresponding to the first application and the second information corresponding to the second application, based on the type of the user interaction and the location information where the user interaction is detected. In an embodiment, the method for controlling the screen according to the user interaction may include displaying at least one of the first information and the second information on the first display 531, based on the changed display attribute.

In an embodiment, the identifying of the type of the user interaction and the location information where the user interaction is detected may include correcting sensor data of the detected user interaction, based on the acquired sensor information. In an embodiment, the identifying of the type of the user interaction and the location information where the user interaction is detected may include identifying, based on the corrected sensor data, the type of the user interaction and the location information where the user interaction is detected.

In an embodiment, the changing of the display attribute of the at least one of the first information corresponding to the first application and the second information corresponding to the second application may include changing, based on the type of the user interaction and the location information where the user interaction is detected, the display attribute including at least one of the size of a window and the arrangement of the window within a display area of the first display 531 for displaying at least one of the first information corresponding to the first application and the second information corresponding to the second application.

In an embodiment, the sensor circuit 540 may include at least one of an inertial sensor 541 and a grip sensor 543.

In an embodiment, the sensor information acquired through the sensor circuit 540 may include at least one of first sensor information acquired through the inertial sensor 541, second sensor information acquired through the grip sensor 543, and third sensor information acquired through a touch circuit of a second display 533 provided to be at least partially visible from the outside through the fourth surface 222.

In an embodiment, the first sensor information may include at least one of sensor information related to a posture of the electronic device 501 and sensor information related to movement of the electronic device 501.

In an embodiment, the second sensor information may include at least one of a grip state and a grip pattern of the electronic device 501.

In an embodiment, the third sensor information may include touch information acquired through the touch circuit of the second display 533.

In an embodiment, the correcting of the sensor data of the detected user interaction may include correcting the sensor data of the detected user interaction, based on at least one of the first sensor information, the second sensor information, and the third sensor information.

In an embodiment, the identifying of the type of the user interaction and the location information where the user interaction is detected may include accumulating and storing, in a memory 520, the sensor information acquired through the sensor circuit 540 and the information identified based on the sensor information and related to the type of the user interaction and the location information where the user interaction is detected. In an embodiment, the identifying of the type of the user interaction and the location information where the user interaction is detected may include, learning, through artificial intelligence, the stored sensor information and the stored information based on the sensor information and related to the type of the user interaction and the location information where the user interaction is detected. In an embodiment, the identifying of the type of the user interaction and the location information where the user interaction is detected may include identifying, based on a model generated by the learning, the type of the user interaction and the location information where the user interaction is detected.

In an embodiment, the identifying of the type of the user interaction and the location information where the user interaction is detected may include transmitting the sensor information acquired through the sensor circuit 540 to a server through a wireless communication circuit 510. In an embodiment, the identifying of the type of the user interaction and the location information where the user interaction is detected may include receiving a learning model leaned through machine learning by artificial intelligence from the server and identifying the type of the user interaction and the location information where the user interaction is detected.

A non-transitory computer readable storage medium storing one or more programs, the one or more programs comprising instructions, which, when executed by a processor, cause by an electronic device to display first information corresponding to a first application in a first area on a first display. The one or more programs comprising instructions, which, when executed by the processor, cause by the electronic device to display second information corresponding to a second application in a second area on the first display. The one or more programs comprising instructions, which, when executed by the processor, cause by the electronic device to acquire sensor information through a sensor circuit. The one or more programs comprising instructions, which, when executed by the processor, cause by the electronic device to identify whether a user input is detected on a second surface or a fourth surface of the electronic device, based on the acquired sensor information. The one or more programs comprising instructions, which, when executed by the processor, cause by the electronic device to identify, based on the detected user input, a type of the user input and a location of the user input. The one or more programs comprising instructions, which, when executed by the processor, cause by the electronic device to change a display attribute of at least one of the first information corresponding to the first application and the second information corresponding to the second application, based on the type of the user input and the location of the user input. The one or more programs comprising instructions, which, when executed by the processor, cause by the electronic device to display at least one of the first information and the second information on the first display, based on the changed display attribute.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively,” as “coupled with,” “coupled to,” “connected with,” or “connected to” another element (e.g., a second element), it means that the element may be coupled with the other element directly (e.g., through wires), wirelessly, or via a third element.

As used in connection with various embodiments of the disclosure, the term “module” may include a unit implemented in hardware, software, or firmware, and may interchangeably be used with other terms, for example, “logic,”

"logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a first housing comprising a first surface facing a first direction, a second surface facing a second direction opposite to the first surface, and a first lateral member surrounding a first space between the first surface and the second surface;

a second housing connected to the first housing, and configured to be foldable about a folding axis, the second housing comprising a third surface facing the first direction in an unfolded state, a fourth surface facing the second direction in the unfolded state, and a second lateral member surrounding a second space between the third surface and the fourth surface;

a first display provided on at least a portion of the first surface and at least a portion of the third surface;

a sensor circuit; and a processor operatively connected to the first display and the sensor circuit, wherein the processor is configured to:

display first information corresponding to a first application in a first area on the first display;

display second information corresponding to a second application in a second area on the first display;

acquire sensor information through the sensor circuit;

identify whether a user input is detected on the second surface or the fourth surface based on the acquired sensor information;

identify, based on the user input being detected, a type of the user input and a location at which the user input has been detected;

based on identifying that the type of the user input corresponds to a first user input type and the user input is detected in a first partial area of either the second surface or the fourth surface, display, on the first display, at least one of the first information or the second information according to a first display attribute corresponding to the first user input type; and based on identifying that the type of the user input corresponds to the first user input type and the user input is detected in a second partial area of either the second surface or the fourth surface, display, on the first display, at least one of the first information or the second information according to a second display attribute corresponding to the first user input type.

2. The electronic device of claim 1, wherein the processor is further configured to:

correct sensor data of the detected user input, based on the acquired sensor information; and identify, based on the corrected sensor data, the type of the user input and the location of the user input.

3. The electronic device of claim 1, wherein the processor is further configured to change the display attribute by changing at least one of a size of a window or an arrangement of the window within a display area of the first display for displaying at least one of the first information corresponding to the first application or the second information corresponding to the second application.

4. The electronic device of claim 1, further comprising:

a second display provided in the second housing, and configured to be at least partially visible from outside through the fourth surface, wherein the sensor circuit comprises at least one of an inertial sensor or a grip sensor.

5. The electronic device of claim 4, wherein the sensor information comprises at least one of first sensor information acquired through the inertial sensor, second sensor information acquired through the grip sensor, or third sensor information acquired through a touch circuit of the second display.

6. The electronic device of claim 5, wherein the first sensor information comprises at least one of sensor information related to a posture of the electronic device or sensor information related to movement of the electronic device, wherein the second sensor information comprises at least one of a grip state or a grip pattern of the electronic device, and wherein the third sensor information comprises touch information acquired through the touch circuit of the second display.

7. The electronic device of claim 5, wherein the processor is further configured to correct the sensor data of the detected user input, based on at least one of the first sensor information, the second sensor information, or the third sensor information.

8. The electronic device of claim 1, further comprising a memory, wherein the processor is further configured to:

accumulate and store, in the memory, the sensor information acquired through the sensor circuit, the type of the user input and the location of the user input;

generate an artificial intelligence (AI) model, through a learning process, based on the stored sensor information and the stored type of the user input and the location of the user input; and identify, based on the AI model generated by the learning process, the type of the user input and the location of the user input.

9. The electronic device of claim 1, further comprising a wireless communication circuit, wherein the processor is further configured to:

transmit the sensor information to a server through the wireless communication circuit;

receive an artificial intelligence (AI) model, learned through machine learning based on the sensor information, from the server; and identify the type of the user input and the location of the user input based on the AI model.

10. A method for controlling a screen according to a user interaction by an electronic device including a first housing having a first surface facing a first direction, a second surface facing a second direction opposite, and a second housing connected to the first housing in a foldable manner, and having a third surface facing the first direction in an unfolded state and a fourth surface facing the second direction in the unfolded state, the method comprising:

displaying first information corresponding to a first application in a first area on a first display provided on at least a portion of the first surface and at least a portion of the third surface;

displaying second information corresponding to a second application in a second area on the first display;

acquiring sensor information through a sensor circuit;

identifying whether a user input is detected on the second surface or the fourth surface based on the acquired sensor information;

identifying, based on the user input being detected, a type of the user input and a location at which the user input has been detected;

based on identifying that the type of the user input corresponds to a first user input type and the user input is detected in a first partial area of either the second surface or the fourth surface, displaying, on the first display, at least one of the first information or the second information according to a first display attribute corresponding to the first user input type; and based on identifying that the type of the user input corresponds to the first user input type and the user input is detected in a second partial area of either the second surface or the fourth surface, displaying, on the first display, at least one of the first information or the second information according to a second display attribute corresponding to the first user input type.

11. The method of claim 10, wherein the identifying of the type of the user input and the location of the user input comprises:

correcting sensor data of the detected user input, based on the acquired sensor information; and identifying, based on the corrected sensor data, the type of the user input and the location of the user input.

12. The method of claim 10, wherein the changing of the display attribute of the at least one comprises changing at least one of a size of a window or an arrangement of the window within a display area of the first display for displaying at least one of the first information corresponding to the first application or the second information corresponding to the second application.

13. The method of claim 10, wherein the sensor information is acquired thorough at least one of an inertial sensor or a grip sensor.

14. The method of claim 13, wherein the sensor information comprises at least one of first sensor information acquired through the inertial sensor, second sensor information acquired through the grip sensor, or third sensor information acquired through a touch circuit of a second display provided to be at least partially visible from outside through the fourth surface.

15. The method of claim 14, wherein the first sensor information comprises at least one of sensor information related to a posture of the electronic device or sensor information related to movement of the electronic device; and wherein the second sensor information comprises at least one of a grip state or a grip pattern of the electronic device.

16. The method of claim 14, wherein the third sensor information comprises touch information acquired through the touch circuit of the second display.

17. The method of claim 14, wherein the correcting of the sensor data of the detected user input comprises correcting the sensor data of the detected user input, based on at least one of the first sensor information, the second sensor information, or the third sensor information.

18. The method of claim 10, wherein the identifying of the type of the user input and the location of the user input comprises:

accumulating and storing, in a memory, the sensor information acquired through the sensor circuit, the type of the user input and the location of the user input; generating an artificial intelligence (AI) model, through a learning process, based on the stored sensor information and the stored type of the user input and the location of the user input; and identify, based on the AI model generated by the learning, the type of the user input and the location of the user input.

19. The method of claim 10, wherein the identifying of the type of the user input and the location of the user input comprises:

transmitting the sensor information to a server through a wireless communication circuit;

receiving an artificial intelligence (AI) model, learned through machine learning based on the sensor information, from the server; and identifying the type of the user input and the location of the user input based on the AI model.

20. A non-transitory computer readable storage medium storing one or more programs, the one or more programs comprising instructions, which, when executed by a processor, cause by an electronic device to:

display first information corresponding to a first application in a first area on a first display;

display second information corresponding to a second application in a second area on the first display;

acquire sensor information through a sensor circuit;

identify whether a user input is detected on a second surface or a fourth surface of the electronic device, based on the acquired sensor information;

identify, based on the user input being detected, a type of the user input and a location at which the user input has been detected;

based on identifying that the type of the user input corresponds to a first user input type and the user input is detected in a first partial area of either the second surface or the fourth surface, display, on the first display, at least one of the first information or the second information according to a first display attribute corresponding to the first user input type; and based on identifying that the type of the user input corresponds to the first user input type and the user input is detected in a second partial area of either the second surface or the fourth surface, display, on the first display, at least one of the first information or the second information according to a second display attribute corresponding to the first user input type.

* * * * *